US012189682B2

(12) United States Patent
Reardon et al.

(10) Patent No.: US 12,189,682 B2
(45) Date of Patent: Jan. 7, 2025

(54) SYSTEMS AND METHODS FOR PEER-TO-PEER RECOMMENDATION PROCESSING

(71) Applicant: MUSX, Austin, TX (US)

(72) Inventors: John Reardon, Chagrin Falls, OH (US); Benjamin Godwin, Austin, TX (US); Anthony Broomes, Driftwood, TX (US)

(73) Assignee: MUSX, Austin, TX (US)

( * ) Notice: Subject to any disclaimer, the term of this patent is extended or adjusted under 35 U.S.C. 154(b) by 0 days.

(21) Appl. No.: 17/458,137

(22) Filed: Aug. 26, 2021

(65) Prior Publication Data

US 2022/0067087 A1    Mar. 3, 2022

Related U.S. Application Data

(60) Provisional application No. 63/071,269, filed on Aug. 27, 2020.

(51) Int. Cl.
*G06F 16/00*    (2019.01)
*G06F 7/00*    (2006.01)
*G06F 16/635*    (2019.01)
*G06F 16/638*    (2019.01)

(52) U.S. Cl.
CPC .......... *G06F 16/635* (2019.01); *G06F 16/638* (2019.01)

(58) Field of Classification Search
CPC .............................. G06F 16/635; G06F 16/638
USPC .......................................................... 707/732
See application file for complete search history.

(56) References Cited

U.S. PATENT DOCUMENTS

| 10,216,808 | B1* | 2/2019 | Hampson | G06Q 30/0631 |
|---|---|---|---|---|
| 2002/0120609 | A1* | 8/2002 | Lang | G06F 16/9535 |
| 2003/0191753 | A1* | 10/2003 | Hoch | G11B 27/34 |
| 2009/0125499 | A1* | 5/2009 | Cross | H04L 67/306 |
| | | | | 707/999.005 |
| 2009/0234784 | A1* | 9/2009 | Buriano | G06F 16/437 |
| | | | | 707/999.005 |

(Continued)

OTHER PUBLICATIONS

"Notification of the Transmittal of International Search Report and the Written Opinion of the International Searching Authority, or the Declaration," PCT/US2021/047812, filed Aug. 26, 2021.

*Primary Examiner* — Raquel Perez-Arroyo
(74) *Attorney, Agent, or Firm* — POLSINELLI LLP

(57) ABSTRACT

Disclosed embodiments provide a framework to allow users of a peer-to-peer music recommendation service to generate and transmit music recommendation requests to other users of the service and obtain music recommendations that are relevant to these requests. In response to receiving a request to obtain music recommendations, the service transmits the request to a set of recipients specified in the request and from which music recommendations are to be solicited. The request specifies information that is indicative of the types of music being solicited. A recommendation received from a recipient includes identifying information of a song accessible via another music service and information indicative of a type of music of the song. Any received recommendations are presented in response to the request and feedback with regard to these recommendations is collected. Based on the provided feedback, profiles of the recipients that submitted the recommendations are updated.

24 Claims, 17 Drawing Sheets

(56) References Cited

U.S. PATENT DOCUMENTS

| | | | |
|---|---|---|---|
| 2010/0198767 A1 | 8/2010 | Farrelly | |
| 2012/0054233 A1* | 3/2012 | Svendsen | H04L 67/22 |
| | | | 707/769 |
| 2012/0143956 A1 | 6/2012 | Svendsen | |
| 2013/0325961 A1* | 12/2013 | Golan | H04L 67/306 |
| | | | 709/204 |
| 2015/0067509 A1* | 3/2015 | Alexandersson | G11B 27/34 |
| | | | 715/716 |
| 2015/0088684 A1* | 3/2015 | Nygaard | G06Q 30/0631 |
| | | | 705/26.7 |
| 2015/0269256 A1* | 9/2015 | Hicken | G06F 16/634 |
| | | | 707/767 |
| 2015/0278916 A1* | 10/2015 | Stoll | G06Q 30/0609 |
| | | | 705/26.7 |
| 2018/0241714 A1* | 8/2018 | Green | H04L 65/612 |
| 2018/0253499 A1* | 9/2018 | Arrowood | G06F 16/3329 |
| 2019/0205793 A1* | 7/2019 | Balasubramanian | G06F 7/08 |
| 2019/0370676 A1* | 12/2019 | Pinckney | G06F 16/2457 |
| 2019/0394530 A1* | 12/2019 | Kimble | H04N 21/4668 |

\* cited by examiner

SYSTEMS AND METHODS FOR PEER-TO-PEER RECOMMENDATION PROCESSING

CROSS-REFERENCE TO RELATED APPLICATIONS

The present application claims the priority benefit of U.S. Provisional application Ser. No. 63/071,269, filed Aug. 27, 2020, the disclosure of which is incorporated herein by reference.

FIELD

The present disclosure relates generally to the generation and presentation of recommendations among peers. In one example, the systems and methods described herein may be used to provide recommendation requests to selected peers to solicit recommendations from the selected peers. Further, the systems and methods described herein may be used to generate and provide recommendations in response to requests.

SUMMARY

Disclosed embodiments may provide a framework to allow users of a peer-to-peer music recommendation service to generate and transmit music recommendation requests to other users of the service and obtain music recommendations that are relevant to these requests. The music recommendation requests may include a set of tags that can be used to provide context with regard to the types of music desired by the requesting users. These tags can further be used to generate musical taste profiles of users, as well as of songs shared within the service network, artists, producers, songwriters, and other entities associated with the songs, and of the tags themselves.

According to some embodiments, a computer-implemented method is provided. The method comprises receiving a request to obtain music recommendations. The request specifies information indicative of types of music being solicited. Further, the request specifies a set of recipients from which to solicit the music recommendations. The method further comprises transmitting the request to the set of recipients and receiving one or more music recommendations from a subset of this set of recipients. Each recommendation includes identifying information of a song accessible via a music service and information indicative of a type of music of the song. The method further comprises presenting the one or more music recommendations in response to the request and receiving feedback with regard to the one or more recommendations. The method further comprises updating profiles of the subset of the set of recipients based on the feedback. Each profile indicates a likelihood that a recipient is to provide a relevant response to requests having the information indicative of the types of music being solicited.

According to some embodiments, a computer-program product is provided. The computer-program product is tangibly embodied in a non-transitory machine-readable storage medium, including instructions that, when executed by one or more processors, cause the one or more processors to perform the steps of the above method.

According to some embodiments, a system is provided. The system comprises one or more processors, and one or more non-transitory machine-readable storage media containing instructions that, when executed on the one or more processors, cause the one or more processors to perform operations including the steps of the above method.

This summary is not intended to identify key or essential features of the claimed subject matter, nor is it intended to be used in isolation to determine the scope of the claimed subject matter. The subject matter should be understood by reference to appropriate portions of the entire specification of this patent application, any or all drawings, and each claim.

The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Figure 1:
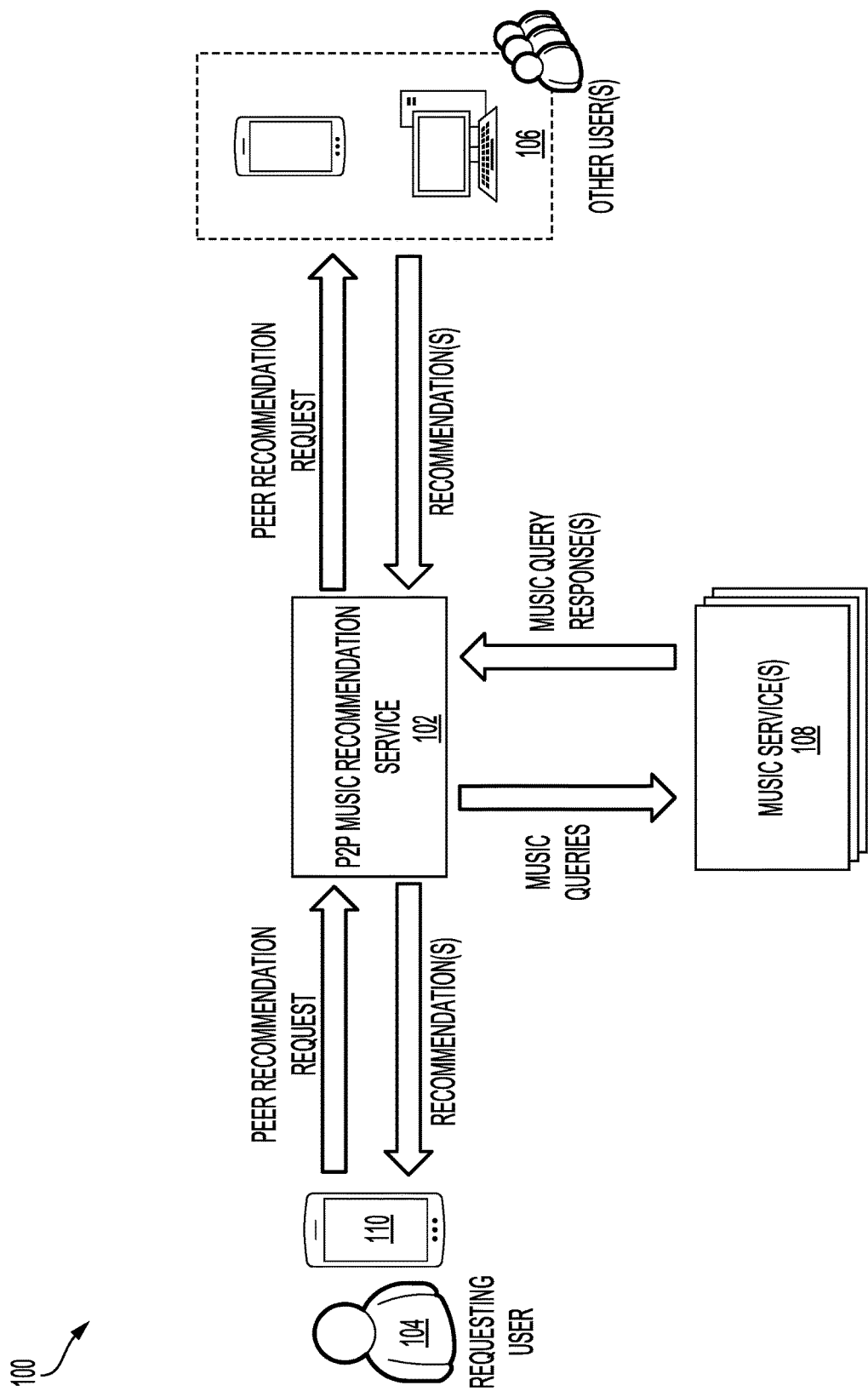
FIG. 1 shows an illustrative example of an environment in which a peer-to-peer (P2P) music recommendation service provides music recommendations to a requesting user and generated by one or more other users via the P2P music recommendation service in accordance with at least one embodiment.

FIG. 1 shows an illustrative example of an environment 100 in which a P2P music recommendation service 102 provides music recommendations to a requesting user 104 and generated by one or more other users 106 via the P2P music recommendation service 102 in accordance with at least one embodiment. In the environment 100, a requesting user 104, via a computing device 110 (e.g., smartphone, computer, laptop, etc.), submits a request to a P2P music recommendation service 102 to obtain a set of music recommendations from one or more other users of the P2P music recommendation service 102. The P2P music recommendation service 102 may provide, to the requesting user 104, an interface through which the requesting user 104 may submit its request. For instance, the P2P music recommendation service 102 may provide, to users of the P2P music recommendation service 102, an application that may be implemented on a computing device (e.g., smartphone, computer, laptop, smart watch, smart television, smart speaker, smart car player, Internet-of-Things (IoT) devices, etc.) that may be used to access the P2P music recommendation service 102. Further, the P2P music recommendation service 102 may provide a website through which a user may access the P2P music recommendation service 102. In some instances, a user may access the P2P music recommendation service 102 using other devices, such as a smart speaker, streaming device, and the like. It should be noted that while music and songs are utilized extensively throughout the present disclosure for the purpose of illustration, the techniques described herein may be applied to other forms of media (e.g., podcasts, films, books, audiobooks, etc.) or elements associated with these other forms of media (e.g., authors, book titles, etc.). Further, the techniques described herein may also be applied to other forms of content unrelated to media (e.g., restaurants, products, recipes, etc.) for which recommendations may be generated and provided.

Through the interface provided by the P2P music recommendation service 102, a requesting user 104 may define one or more parameters of the music recommendation request that is to be transmitted to one or more other users 106 of the P2P music recommendation service 102. For instance, through the interface, a requesting user 104 may select one or more tags that may be used to define, or provide context for, the types of music the requesting user 104 is interested in receiving in music recommendations from other users 106. Tags may correspond to musical genres, musical sub-genres, musical styles, musical instruments, activities, moods, and the like. For instance, when a requesting user 104 submits a request to the P2P music recommendation service 102 to generate a music recommendation request, the P2P music recommendation service 102 may update the interface to provide the requesting user 104 with various options for selecting a set of tags that are to be provided in the music recommendation request. As an example, a requesting user 104, via the interface, may submit a tag query to identify a set of tags that may be included in the request. The P2P music recommendation service 102 may process the tag query from the requesting user 104 and identify any tags that may be of interest to the requesting user 104. These tags may be presented to the requesting user 104 via the interface. Further, the P2P music recommendation service 102 may provide, via the interface, a set of popular tags that may be incorporated into the music recommendation request. This set of popular tags may be commonly used by the requesting user 104 in its music recommendation requests, related to music that the requesting user 104 has interacted with via the P2P music recommendation service 102, related to activities that the requesting user 102 has performed via the P2P music recommendation service 102, and the like. These tags may also be popular among the user base of the P2P music recommendation service 102. The set of popular tags may also be specific to a particular time of day and/or location.

In the music recommendation request, a requesting user 104 may further specify an expiration for the request. For instance, the requesting user 104 may define an expiration date for the request, whereby the responding users may be unable to provide responses to the request past the expiration date of the request. In some instances, the requesting user 104 may define a maximum number of responses per responding user that can be submitted in response to the request. In an embodiment, the P2P music recommendation service 102 can automatically determine a number of responses that may be submitted by each responding user selected by the requesting user 104 or that otherwise are to be provided with the request. For instance, a responding user having a higher feedback score (e.g., is noted as providing favorable responses to similar requests) may be provided with a higher amount of possible responses compared to a responding user having a lower feedback score or no history of providing responses to music recommendation requests.

In an embodiment, the P2P music recommendation service 102 can automatically generate a music recommendation request on behalf of the requesting user 104 based on the requesting user's interaction with a song. For instance, if a requesting user 104, via the P2P music recommendation service 102, listens to a particular song and indicates that it likes the particular song (such as through an approval rating, score, repeated listens, etc.), the P2P music recommendation service 102 may identify, from the requesting user's profile, one or more trusted users to which a music recommendation request may be provided automatically on behalf of the requesting user 104. The music recommendation request may include an indication of the particular song that the requesting user 104 has interacted with. If the one or more trusted users respond to the music recommendation request with one or more music recommendations for the requesting user 104, the P2P music recommendation service 102 may present these music recommendations to the requesting user 104, as described herein.

In an embodiment, the P2P music recommendation service 102 can automatically generate a music recommendation request on behalf of the requesting user 104 based on a combination of the requesting user's location, time of day during which the request is being submitted, a requesting user's recent activity, the weather at the requesting user's location, and the like. For instance, if the requesting user 104 accesses the P2P music recommendation service 102 at a particular location, the P2P music recommendation service 102 may determine the location of the requesting user 102. The requesting user 104 may select an option for the P2P music recommendation service 102 to automatically generate a music recommendation request. The P2P music recommendation service 102 may transmit the automatically generated request to mutual followers of the requesting user 104, along with location information of the requesting user 104 and any other information that may be useful to responding users in providing music recommendations (e.g., information associated with the requesting user 104 such as its mood, preferences, similar tags submitted from similar locations, etc.).

In some instances, the P2P music recommendation service 102 may automatically provide music recommendations to the requesting user 104 based on a combination of the requesting user's location, time of day during which the request is being submitted, a requesting user's recent activity, the weather at the requesting user's location, and the like. For instance, when the requesting user 104 accesses the P2P music recommendation service 102, the P2P music recommendation service 102 may provide the requesting user 104 with music recommendations corresponding to songs that may have been tagged with the requesting user's present location and previously shared and/or saved by other users, including mutual followers and/or users not associated with the requesting user 104.

In addition to providing one or more tags that are indicative of the types of music the requesting user 104 is seeking in the form of music recommendations from other users 106, the requesting user 104, via the interface, may provide an optional comment that may provide additional context with regard to the music recommendation request. In an embodiment, if the requesting user 104 submits an optional comment, the P2P music recommendation service 102 evaluates the comment to identify one or more potential tags that may be added to the request or replace previously selected tags for the request. For example, the P2P music recommendation service 102 may process an optional comment using a machine learning algorithm or artificial intelligence to identify one or more tags that may be germane to the submitted comment. These identified tags may be presented to the user via the interface in addition to any previously selected tags. The requesting user 104 may evaluate these suggested tags and determine whether to incorporate any of the identified tags into its music recommendation request or omit these suggested tags. The optional comment may be provided in the form of text, digital images (e.g., GIFs, JPEGs, BMPs, etc.), recorded video, recorded audio, and the like.

In an embodiment, the requesting user 104 can provide one or more tags to identify songs that may have been saved or shared by its mutual followers that correspond to these one or more tags. In response to this request, the P2P music recommendation service 102 may query the profiles of these mutual followers to identify any songs that correspond to the one or more tags provided by the requesting user 104. The P2P music recommendation service 102 may provide the requesting user 104 with any songs identified in this manner. In some instances, the request user 104 can convert this query into an active music recommendation request. The music recommendation request may, thus, include the requesting user's query and any songs identified by the P2P music recommendation service 102 as corresponding to the query. This may guide responding users in providing relevant responses (e.g., recommendations) for the request.

The P2P music recommendation service 102 may further provide the requesting user 104, via the interface, a listing of other users 106 that may be followers of the requesting user 104. A follower of a particular user may be a user of the P2P music recommendation service 102 that has established a connection with the particular user to obtain notifications (e.g., songs, recommendations, etc.) from the particular user or provided on behalf of the particular user. For instance, a follower may receive new messages including shared songs from the particular user. Similarly, a follower may receive music recommendation requests submitted by the particular user or on behalf of the particular user. These other users 106 and the requesting user 104 may be mutual followers, whereby each of the users 106 may share music with the requesting user 104 and/or submit music recommendation requests to the requesting user 104. Through the interface, the requesting user 104 may select the users that are to be recipients of the music recommendation request. In an embodiment, the P2P music recommendation service 102 provides additional information to the requesting user 104 that can be used by the requesting user 104 to determine which users 106 to select for its music recommendation request. This additional information may include tags associated with the types of music shared by each user, recommendation scores for each user (e.g., scores indicating the quality of a user's recommendations, etc.), and the like.

In addition to providing a listing of users 106 that may be mutual followers of the requesting user 104, the P2P music recommendation service 102 may also provide, via the interface, a listing of tastemakers from which to solicit music recommendations. A tastemaker may be a user of the P2P music recommendation service 102 that is deemed to be qualified to provide relevant music recommendations or otherwise shares music with other users that is of interest to a wide audience. For instance, if a recommendation score (e.g., score representative of the quality of recommendations provided by the user to other users) for a particular user surpasses a minimum score threshold for qualifying as a tastemaker of the P2P music recommendation service 102, the P2P music recommendation service 102 may transmit a notification to the user to indicate that the user has qualified to become a tastemaker. In some instances, the P2P music recommendation service 102 may manually select (e.g., an administrator or other entity that operates the service 102 actively selects users) a particular user to which an invitation may be extended to become a tastemaker. The user may indicate whether to accept or reject the offer of the P2P music recommendation service 102 to assume the role of tastemaker. In some instances, the use of this score is contingent on the user having submitted a minimum number of recommendations to different users of the P2P music recommendation service 102. The requesting user 104 may select, from the listing of tastemakers supplied by the P2P music recommendation service 102, any tastemakers that may be solicited for a music recommendation. The listing of tastemakers may specify one or more tastemakers that are selected based at least in part on the parameters of the music recommendation request. For instance, if the music recommendation request specifies that the requesting user 104 is seeking music recommendations for a particular genre, the P2P music recommendation service 102 may select one or more tastemakers for presentation that are known to provide relevant music recommendations for that genre.

In some instances, the P2P music recommendation service 102 enables the requesting user 104 to include, in the music recommendation request, one or more songs that are indicative of the type of music the requesting user 104 is seeking in the form of music recommendations from the selected users. For instance, via the interface, the requesting user 102 may submit a query for one or more songs that may be included in the request. In response to the query, the P2P music recommendation service 102 may submit the query to one or more music services 108 to obtain responses including network locations of songs that satisfy the query. Through the interface, the P2P music recommendation service 102 may present these songs to the requesting user 104, which may play back any of the presented songs and select one or more songs that are to be included in the request. The P2P music recommendation service 102 may select the one or more music services 108 based on the requesting user's relationship with these one or more music services. For instance, in order for the P2P music recommendation service 102 to query a music service, the requesting user 104 may be required to be a member of the music service or otherwise be able to access songs provided by the music service 108. Further, in some instances, the other users 106, as selected by the requesting user 104 or otherwise selected on behalf of the requesting user 104 (e.g., by the P2P music recommendation service 102, automatically based on an existing relationship with the requesting user 104, automatically based on historical interactions with the requesting user 104, etc.) may also be required to be able to access the selected songs from the one or more music services 108.

In an embodiment, rather than submit a query for one or more songs that may be included in the music recommendation request, the P2P music recommendation service 102 provides the requesting user 104, via the interface, access to their playlists and/or saved songs maintained by another music service (e.g., streaming service, etc.). For instance, if the requesting user 104 has an account with another music service, the requesting user 104 may establish a connection between the P2P music recommendation service 102 and its account with the other music service. Through the interface, the requesting user 104 may select one or more songs that may be included in the music recommendation request as being indicative of the one or more types of music the requesting user 106 is seeking.

Once the requesting user 104 has completed generating the music recommendation request, the P2P music recommendation service 102 may transmit the music recommendation request to the one or more users 106 selected by the requesting user 104 or otherwise selected on behalf of the requesting user 104. For instance, the P2P music recommendation service 102 may transmit a notification to each selected user 106 to indicate that it has received a music recommendation request from the requesting user 104. Each of the selected users 106 may also access the P2P music recommendation service 102 via an interface provided by the P2P music recommendation service 102 (e.g., through an application, through a website, through a smart device, etc.). Through this interface, a user may evaluate the music recommendation request and provide a music recommendation in response to the request.

Each request presented to a responding user via the interface may include various elements of the request. For instance, the presented request may include the one or more tags associated with the request, any comments provided by the requesting user 104 in the request, a location from which the request was made, identifying information of the requesting user 104 (e.g., username or actual name of the requesting user, an image or icon representative of the requesting user, and the like), and any other information that may be germane to the request (e.g., song names associated with music of interest to the requesting user, artist names associated with music of interest to the requesting user, etc.). Additionally, if the requesting user 104 submitted one or more sample songs that are demonstrative of the type(s) of music recommendations that it wishes to receive, the P2P music recommendation service 102 may provide an option, via the interface, for playback of the one or more sample songs. Further, information of the sample song may be presented via the interface (e.g., song title, artist name, music genre, etc.).

In response to a received music recommendation request, a responding user, via the interface, may select a song that can be shared with the requesting user 104 as a music recommendation. For instance, via the interface, the P2P music recommendation service 102 may provide a user with an option to initiate a query for a particular song that may be shared with the requesting user 104. If the responding user submits a song query to the P2P music recommendation service 102 via the interface, the P2P music recommendation service 102 may transmit the query to the one or more music services 108 to identify songs maintained by these one or more music services 108 that correspond to the submitted query and/or the requesting user 104. For instance, these music services 108 may allow users to stream or playback various songs maintained by the music services 108 for their subscribers or users. In some instances, these music services 108 may allow users to stream or playback a portion of songs maintained by the music services 108 for users that may not be subscribed to these music services 108. Thus, in response to the submitted query, the one or more music services 108 may utilize the search terms of the query to identify any songs that correspond to the provided search terms.

The P2P music recommendation service 102 may maintain a cache of previously submitted search terms and corresponding search results provided in response to these search terms. The P2P music recommendation service 102 may query the cache using the search terms submitted by the responding user to determine whether a similar query was previously performed. If so, the P2P music recommendation service 102 may provide the query results to the responding user without submitting the query to the one or more music services 108.

Through the interface provided by the P2P music recommendation service 102, the responding user may be presented with a set of query results provided by one or more music services 108 and/or by the P2P music recommendation service 102 from the cache in response to the song query submitted by the responding user. Each song result may include identifying information of the particular song. For instance, a song result may include the title of the corresponding song, the name of the artist that performed and/or produced the song, the music genre of the song, any cover art associated with the song, and the like. In an embodiment, the song result is presented in the form of a hyperlink or other link that may be used to access the song at a particular network location associated with the P2P music recommendation service 102 or from the music service 108 that provided the song result. This may allow the responding user to select a particular song and initiate playback of the song.

As noted above, the P2P music recommendation service 102 provides the requesting user 104, via the interface, access to their playlists and/or saved songs maintained by another music service (e.g., streaming service, etc.). Similarly, the P2P music recommendation service 102 may provide the responding user, via the interface, access to their playlists and/or saved song maintained by another music service. For instance, if the responding user has an account with another music service, the responding user may establish a connection between the P2P music recommendation service 102 and its account with the other music service. Through the interface, the responding user may select one or more songs that may be included in the music recommendation to be provided to the requesting user 104.

If the responding user selects a particular song from the interface, the P2P music recommendation service 102 may update the interface to provide a summary of the music recommendation that is to be provided to the requesting user. Further, through the interface, the P2P music recommendation service 102 may allow the responding user to provide one or more comments with the music recommendation. These one or more comments may provide additional context with regard to the responding user's selection of a particular song as its music recommendation to the requesting user 104. In an embodiment, if a responding user provides an optional comment via the interface, the P2P music recommendation service 102 may evaluate the optional comment to identify any additional tags that may be associated with the response. For instance, the P2P music recommendation service 102 may process an optional comment using a machine learning algorithm or artificial intelligence to identify one or more tags that may be germane to the response to be submitted by the responding user. These identified tags may be presented to the responding user via the interface, through which the responding user may determine whether to incorporate any of the identified tags into its music recommendation or omit these tags. These additional tags may provide further context to the selection of the song specified in the music recommendation provided by the responding user. Further, the P2P music recommendation service 102 may utilize these identified tags to update a song profile for the selected song, one or more tag profiles associated with the identified tags, an artist profile for the artist associated with the selected song, and a location profile associated with the location from which the music recommendation is being made.

In response to receiving the music recommendation, the P2P music recommendation service 102 may transmit the music recommendation to the requesting user 104. For instance, the P2P music recommendation service 102 may update an interface of an application utilized by the requesting user 104 to access the P2P music recommendation service 102 to provide the music recommendation provided by the responding user. In an embodiment, the music recommendation is further provided to other users that may have received the music recommendation request from the requesting user. This may allow these other users to evaluate the provided music recommendation and supplement this recommendation if so desired. For instance, another user may provide feedback with regard to the music recommendation submitted by the responding user. Further, these other users may be provided with an option to follow the responding user and obtain songs shared by the responding user in response to music recommendation requests or otherwise shared with its followers.

As music recommendations are provided in response to the music recommendation request from the requesting user 104, the P2P music recommendation service 102 may present these music recommendations to the requesting user 104. For instance, via the interface provided by the P2P music recommendation service 102 to the requesting user 104, the requesting user 104 may review any music recommendations received from other users 106 in response to its request. Through the interface, a requesting user 104 may select to initiate playback of each of the provided songs, individually or continuously. Additionally, through the interface the other users 106 may also select to initiate playback of any of the songs provided to the requesting user 104 in response to the music recommendation request. For instance, a user that has submitted a music recommendation in response to the music recommendation request may be presented with any other music recommendations provided by other users in response to this request. The user, via the interface, may select any of these provided songs and initiate playback of one or more of these provided songs.

The requesting user 104 may also perform various operations for each recommended song. For instance, a requesting user 104 may save a provided song to a playlist or library. Alternatively, the requesting user 104 may skip the song, submit a reply to the responding user that submitted the song, and/or re-share the song with other followers of the requesting user 104. In an embodiment, if the requesting user 104 is subscribed to another music service 108 and the requesting user 104 has linked their account with the other music service 108 to their P2P music recommendation service account, and the requesting user 104 has indicated that it wishes to save the song, the P2P music recommendation service 102 may also save the song to an automatically generated playlist maintained by the music service 108 or to specific playlist as specified by the requesting user 104. Thus, the requesting user 104 may access the saved song through this other music service 108. Once the requesting user 104 has interacted with a particular response (e.g., has listened to the provided song, has dismissed the song, etc.), the P2P music recommendation service 102 may update the interface to remove the response from the interface. Further, the response provided by the other user may be added to a heard responses window of the interface for the requesting user 104. In some instances, a response provided within the heard responses window may include any feedback provided by the requesting user 104, such as a score assigned to the provided song, comments regarding the provided song, whether the song has been saved to a requesting user's playlist, recorded audio or video by the requesting user 104 regarding the provided song, and the like.

In some instances, the requesting user 104 may provide one or more responses to its own music recommendation request. For instance, as the requesting user 104 receives one or more recommendations from other users, the requesting user 104 may respond to its own music recommendation request by selecting and submitting one or more songs, comments, or other feedback. The responses submitted by the requesting user 104 may be provided to the responding users 106. This may facilitate the creation of a playlist for the given music recommendation request, collaboration amongst users in providing appropriate music recommendations, and the like.

Figure 2:
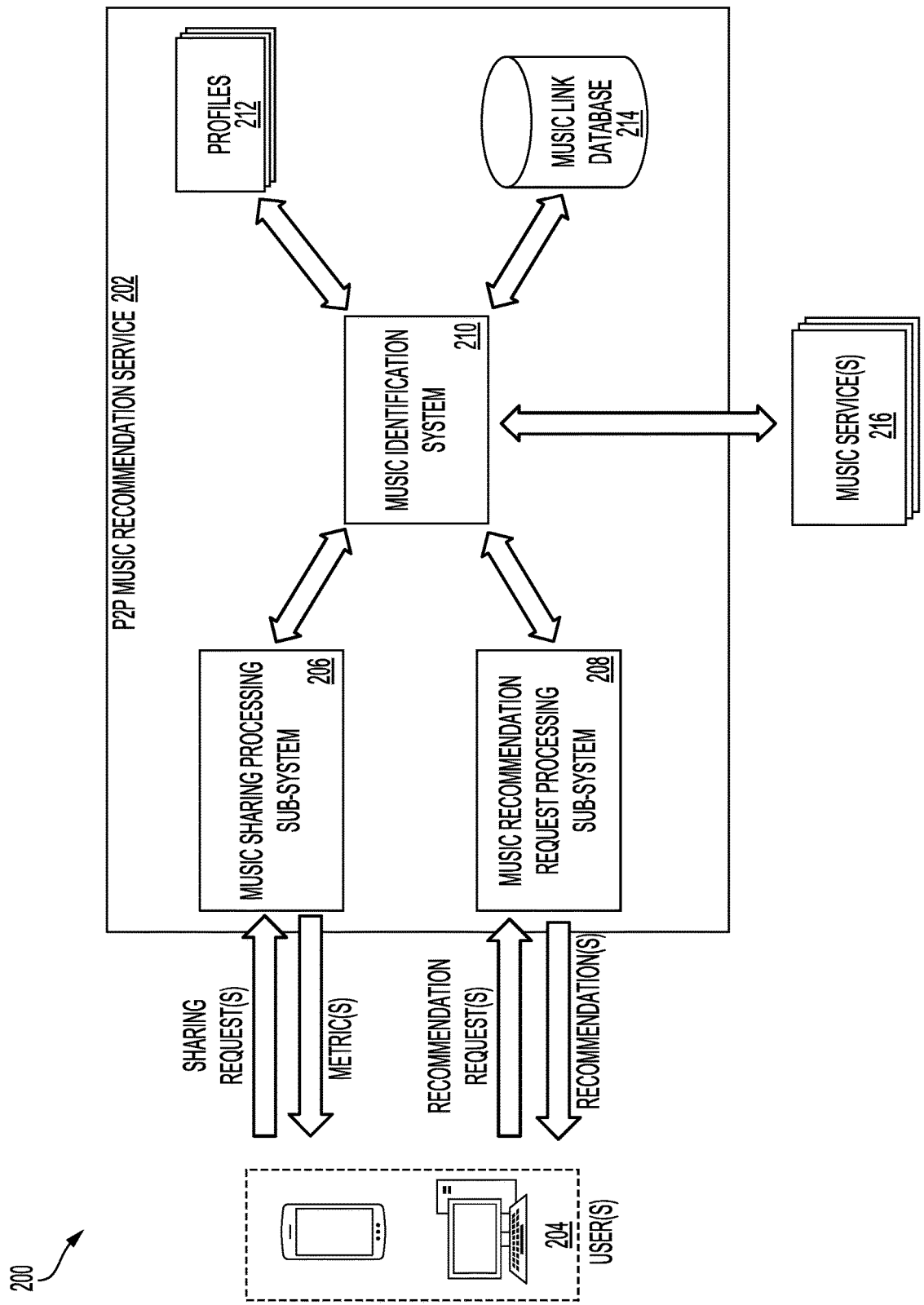
FIG. 2 shows an illustrative example of an environment in which a P2P music recommendation service processes incoming music sharing and music recommendation requests for users of the P2P music recommendation service in accordance with at least one embodiment.

FIG. 2 shows an illustrative example of an environment 200 in which a P2P music recommendation service 202 processes incoming music sharing and music recommendation requests for users 204 of the P2P music recommendation service 202 in accordance with at least one embodiment. In the environment 200, a user 204 of the P2P music recommendation service 202 submits a request to a music sharing processing sub-system 206 to share one or more songs with other users of the P2P music recommendation service 202. A user 204 of the P2P music recommendation service 202 may access the P2P music recommendation service 202 via an application provided by the P2P music recommendation service 202 and installed on a computing device (e.g., smartphone, computer, etc.), through which the user 204 may submit the music sharing request to the music sharing processing sub-system 206. The user 204 may alternatively access the P2P music recommendation service 202 via a website provided by the P2P music recommendation service 202.

In some instances, the P2P music recommendation service 202 may provide access to the service via a smart speaker or other device (e.g. Internet-of-Things (IoT) devices, smart hubs, smartphones, smart watch, smart television, smart car player etc.) through which a user 204 may interact with the P2P music recommendation service 202 via voice commands. For example, a user 204 may issue a voice command to a smart speaker or other device to access the P2P music recommendation service 202. Further, once such access is established via the smart speaker or other device, the user 204 may issue additional voice commands to submit music sharing requests and/or to perform other functions made available to the user 204 by the P2P music recommendation service 202, as described herein. In some instances, a user 204 may issue a voice command to a virtual assistant implemented on a smartphone or other computing device to interact with the P2P music recommendation service 202 via voice commands.

In some instances, the P2P music recommendation service 202 may provide access to the service via a module or application implemented on an alternative service. For instance, an alternative music streaming service may implement a module, application, or other functionality that enables users to access the P2P music recommendation service 202. As an illustrative example, if a user is listening to a particular song via an alternative music streaming service, and the alternative music streaming service provides the user with access to the P2P music recommendation service 202 via a module implemented by the alternative music streaming service (e.g., an icon corresponding to the module presented via an interface of the alternative music streaming service, etc.), the user may utilize the module to access the P2P music recommendation service 202. Through the module, the user may initiate a request to share the particular song with a set of other users or to obtain music recommendations based on the particular song from the set of other users, which may then be transmitted from the alternative music streaming service to the P2P music recommendation service 202. The user may continue to interact with the particular song via the alternative music service while awaiting responses from the set of other users.

The P2P music recommendation service 202, in some instances, provides a user 204 with an interface through which the user 204 may submit a music sharing request to the music sharing processing sub-system 206. For instance, via the interface, a user 204 may select an option to initiate a request to share a song with one or more other users (e.g., followers of the user 204, etc.) of the P2P music recommendation service 202. If the user 204 selects this option, the music sharing processing sub-system 206 of the P2P music recommendation service 202 may detect selection of this option and update the interface to present the user 204 with a song query bar, through which the user 204 may submit a query for a particular song that is to be shared to a selected set of other users of the P2P music recommendation service 202. The music sharing processing sub-system 206 may be implemented using a computer system or utilizing an application implemented using a computer system of the P2P music recommendation service 202.

In an embodiment, the music sharing processing sub-system 206 evaluates, from a set of profiles 212, the user profile of the user 204 to identify a set of followers (e.g., other users of the P2P music recommendation service 202 that may be following the user 204) of the user 204. For each of these followers, the music sharing processing sub-system 206 may identify the types of music that the follower is requesting at a given time. The music sharing processing sub-system 206 may present, via the interface, each of the follower requests and the types of music that each follower is looking for. This may guide the user 204 in identifying what songs to share with the other users of the P2P music recommendation service 202.

If the user 204 submits, via the song query bar, a query for a particular artist or song, the music sharing processing sub-system 206 may transmit the query to a music identification system 210 of the P2P music recommendation service 202 to identify any songs that satisfy the query. The music identification system 210 may be implemented using a computer system or utilizing an application implemented using a computer system of the P2P music recommendation service 202. In an embodiment, in response to the query, the music identification system 210 accesses a music link database 214 of the P2P music recommendation service 202 to determine whether any songs that may satisfy the query have been previously identified by the P2P music recommendation service 202. For instance, the music link database 214 may include a cache of previously submitted queries and corresponding songs identified in response to these queries. Additionally, or alternatively, the music link database 214 may include a library of known artists and songs, each of which may be associated with a set of keywords or expressions that may be used to determine whether an artist or song satisfies a submitted query. If the music identification system 210 identifies, from the music link database 214, any artists or songs responsive to the query, the music identification system 210 may update the interface to specify these artists and songs to the user 204. It should be noted that, in some instances, contemporaneous queries may be conducted as the user 204 enters one or more characters into the song query bar. Thus, as the user 204 enters one or more characters into the song query bar, the P2P music recommendation service 202 may identify any artists and/or songs that may be associated with the entered one or more characters. As the user 204 changes the characters entered into the song query bar, the P2P music recommendation service 202 may update its query results, which are provided to the user 204 via the interface.

In an embodiment, if the music link database 214 does not include any artists or songs corresponding to the submitted query, the music identification system 210 submits the query to one or more music services 216 to identify network locations of the one or more music services 216 that correspond to songs that satisfy the submitted query. For example, the music sharing processing sub-system 206 may present, to the user 204, a song query bar that is specific to a particular music service 216. When the user 204 submits a query via the song query bar, the music sharing processing sub-system 206, via the music identification system 210, may transmit the query to the corresponding music service 216, which may process the query and identify any songs that satisfy the query. The music service 216 may provide, in response to the query, identifying information of the identified songs, as well as a network address for each identified song through which the identified song may be accessed. This may cause the music sharing processing sub-system 206 to present, for each identified song and via the interface, identifying information of the song (e.g., song title, artist name, music genre, etc.) and a method for accessing the song via the music service 216. For example, the music sharing processing sub-system 206 may present a user 204 with an option to press and hold a song to preview the selected song. If the user 204 performs these operations, the music sharing processing sub-system 206 may utilize the network address provided by the music service 216 for the song to provide the user 204 with access to the song.

In an embodiment, the music sharing processing sub-system 206 provides a song query bar for each music service 216 accessible via the P2P music recommendation service 202. Alternatively, a single song query bar may be provided, whereby a query submitted via the song query bar may be transmitted to each music service 216 accessible via the P2P music recommendation service 202. Query results may be presented, via the interface, for each music service 216, whereby the query results may be delineated based on the music service 216 that provided the results. Thus, through the interface, the user 204 may select different results from different music services 216 corresponding to the same song that is to be shared with other users of the P2P music recommendation service 202. In some instances, the user 204 may select which music services 216 may be utilized for obtaining the song that is to be shared with other users. Thus, the user 204 may not be required to submit a query to each available music service 216. Further, in some instances, rather than selecting different results from different music services 216, the user 204 may select a single result. This may cause the music sharing processing sub-system 206 to identify the different results from the different music services 216 corresponding to the single result selected by the user 204.

In some instances, the music sharing processing sub-system 206 allows the user 204 to access its playlists or song libraries from one or more music services 216 via the interface of the P2P music recommendation service 202. The user 204 may select, from its playlists or song libraries, a song that is to be shared with other users of the P2P music recommendation service 202. The music sharing processing sub-system 206 may utilize this selection to identify a network location of the selected song, from which the selected song may be accessed from within the network of a music service.

Once the user 204 has selected a song that is to be shared with other users of the P2P music recommendation service 202 (e.g., selection of different results from different music services 216 for a particular song, etc.), the music sharing processing sub-system 206 may update the interface to present a listing or other ordering of followers to which the selected song may be shared. In some instances, the music sharing processing sub-system 206 may indicate, for each follower, the music services 216 that the follower may be a member of. This may guide the user 204 in determining which followers to select, as the different results selected by the user 204 may be from music services that a particular follower is not a member of. In an embodiment, the music sharing processing sub-system 206 provides additional information for each follower to indicate whether the follower is likely to have a favorable reaction to the selected song. For instance, for each follower, the music sharing processing sub-system 206 may access, from the set of profiles 212, a profile of the follower to identify what types of music the follower is known to enjoy versus other types of music the follower is known to dislike.

In some instances, the music sharing processing sub-system 206 enables the user 204 to record a voice or video caption and/or provide a text comment that can be included with the shared song. This may provide additional context with regard to the user's selection of the song that is being shared with the selected followers. Further, the music sharing processing sub-system 206 enables the user 204 to schedule when the song is to be shared with the selected followers. For instance, via the interface, a user 204 may specify a given time at which the song is to be shared.

In some instances, the user 204 may specify a location from which the song is to be shared. Thus, the music sharing processing sub-system 206 may continuously monitor the user's location (subject to the user's granting of permission to the P2P music recommendation service 202 to monitor the user's location) to determine whether the user 204 is at the specified location and, if so, share the selected song with the followers indicated by the user 204. The selected song may be shared with a follower once it is detected that the follower is at the specified location. For instance, if the P2P music recommendation service 202 obtains, from a follower's computing device (e.g., smart phone, smart watch, laptop computer, tablet, etc.) subject to a follower's granting of permission to track its location, geolocation data corresponding to the location specified by the user 204, the P2P music recommendation service 202 may present the selected song with the follower at the specified location.

In an embodiment, the music sharing processing sub-system 206 enables the user 204 to assign one or more tags to the song that is to be shared with the selected set of followers. These tags may be selected from a set of pre-defined tags generated by the P2P music recommendation service 202. Alternatively, the user 204 may define a unique set of tags for the song that is to be shared with its followers. The selected tags may provide additional context with regard to the song shared by the user 204. In an embodiment, the user's selection of a set of tags for a particular song is used by the music identification system 210 to update, from the set of profiles 212, a song profile of the song to increase the association between the song and the selected tags. Further, the tag profiles for each of the selected tags, from the set of profiles 212, may be updated such that the likelihood of these tags being presented whenever the song is shared or accessed is increased.

In an embodiment, the music sharing processing sub-system 206 further associates the song that is to be shared with the selected set of followers with a location from which the song is being shared from. For instance, if the user 204 has provided the P2P music recommendation service 202 with permission to monitor the user's location when interacting with the service 202, the music sharing processing sub-system 206 may identify the user's location and associate this location with the song that is to be shared. This association may be used to update a location profile specific to the location from which the song is being shared such that the P2P music recommendation service 202 may utilize the location profile to indicate what type of songs and artists are shared from a particular location by users of the P2P music recommendation service 202. The P2P music recommendation service 202 may track which users, artists, songs, and tags each location is associated with, as well as the actions taken by users at the location (e.g., skipping songs, saving songs, feedback provided with regard to songs shared from the location, requests submitted from the location, etc.).

In an embodiment, the music sharing processing sub-system 206 can detect when a user 204 adds a song to a specified playlist on a particular music service 216 and automatically share the song to followers of the user 204 that may also be followers of the specified playlist. For instance, the user 204 may create a playlist within the music service 216 and link this playlist to the P2P music recommendation service 202, which may monitor playlist activity using the music sharing processing sub-system 206. If the music sharing processing sub-system 206 detects that the user 204 has added a new song to the playlist, the music sharing processing sub-system 206 may identify which followers of the user 204 are also followers of the playlist and transmit the added song to these followers. In some instances, the music sharing processing sub-system 206 may prompt the user 204 to determine whether to automatically share the added song with the followers of the playlist. This may enable the user 204 to modify the selection of followers to which the song is to be shared.

Once the user 204 has completed generating the share request (e.g., selected the song to be shared and the set of followers that are to receive the song, selected the tags that are associated with the song, provided any comments to be included with the shared song, etc.), the music sharing processing sub-system 206 may transmit information associated with the selected song to the selected followers. This information may include the name of the song, the artist that performed and/or produced the song, the tags associated with the song, any comments provided by the user 204, the location from which the song was shared, a network location from which the song may be retrieved, and the like. The P2P music recommendation service 202 may notify each follower specified by the user 204 of the shared song. A follower, via an interface of the P2P music recommendation service 202, may access and interact with the shared song as desired. For instance, a follower may initiate playback of the song or save the song to its own playlist or library via the interface. Alternatively, a follower may dismiss or skip the shared song. Further, a follower may re-share the song with other users of the P2P music recommendation service 202 (e.g., its followers) via the music sharing processing sub-system 206 and/or reply to the user 204 by providing feedback with regard to the shared song.

In an embodiment, the music sharing processing sub-system 206 monitors follower interaction with a shared song to generate a set of metrics for the shared song. For instance, based on feedback provided by the followers to which the shared song was provided (e.g., any actions taken with regard to the shared song, comments provided in response to the shared song, etc.), the music sharing processing sub-system 206 may determine whether the shared song was received positively or negatively by the selected followers. Further, the music sharing processing sub-system 206 may indicate to the user 204 which followers have heard the song (e.g., have listened to the song for at least a minimum amount of time, have re-shared the song with other users, have saves the song to a playlist, have replied to the user 204 in response to having received the song, etc.) and which followers have skipped the song (e.g., have dismissed the song, have listened to the song less than the minimum amount of time, etc.). These metrics may be presented to the user 204 via the interface. Further, the metrics may be used to update profiles, from the set of profiles 212, associated with the song, artist that performed and/or produced the song, the followers that received the song, and the tags assigned to the song. For instance, if followers indicate that the specified tags are not relevant to the song, the music identification system 210 may update, from the set of profiles 212, the song profile and any corresponding tag profiles to reduce the association between the song and these tags. The music identification system 210 may further update a follower profile based on the follower's response to the song, whereby a positive reaction of the song may result in the follower profile being updated to indicate a preference for the song and other similar songs (e.g., songs of the same genre, songs by the same artist, etc.).

In an embodiment, a follower can update or add tags to a song shared by the user 204 to the follower. For instance, via an interface provided by the P2P music recommendation service 202, a follower may assign one or more tags to the song. These tags may be selected from a set of pre-defined tags generated by the P2P music recommendation service 202. Alternatively, the follower may define a unique set of tags for the song. The follower's selection of a set of tags for the received song may be used by the music identification system 210 to update, from the set of profiles 212, a song profile of the song to increase the association between the song and the selected tags. Further, the tag profiles for each of the selected tags, from the set of profiles 212, may be updated such that the likelihood of these tags being presented whenever the song is shared or accessed is increased.

The P2P music recommendation service 202 may further include a music recommendation request processing sub-system 208, which may process incoming requests from users 204 of the P2P music recommendation service 202 to obtain music recommendations from other users. The music recommendation request processing sub-system 208, via an interface, may provide users 204 with the option to generate music recommendation requests. For instance, in response to an indication from a user 204 that it wants to generate a new music recommendation request, the music recommendation request processing sub-system 208 may update the interface to provide the user 204 with various options for selecting a set of tags that are to be provided in the music recommendation request. For instance, the music recommendation request processing sub-system 208 may provide a user 204 with a tag query bar, through which the user 204 may submit a query to the music recommendation request processing sub-system 208 for available tags that can be incorporated into the music recommendation request. The music recommendation request processing sub-system 208 may provide this query to the music identification system 210, which evaluate a set of tag profiles from the set of profiles 212 to identify any tags that may satisfy the query. These tags may be presented to the user 204 via the interface. In some instances, the music recommendation request processing sub-system 208 may provide, to the user 204, a set of popular tags that may be incorporated into the music recommendation request. In an embodiment, if the user 204 selects, from the set of popular tags, a first tag that may be incorporated into the music recommendation request, the music recommendation request processing sub-system 208 provides the user 204 with a set of tags that are associated with the first tag. For instance, each tag may be associated with one or more other tags that may be commonly used in conjunction with the tag.

The set of popular tags that may be presented to the user 204 may be selected based on various factors. For instance, the music recommendation request processing sub-system 208 may determine, based on the present location of the user 204, which tags are most commonly selected from the location by users of the P2P music recommendation service 202. Similarly, the music recommendation request processing sub-system 208 may determine, based on the time at which the music recommendation request is being submitted, which tags are most commonly selected at that time. Thus, the set of popular tags presented to the user 204 by the music recommendation request processing sub-system 208 may differ based on these various factors.

In some instances, a user 204 may define or otherwise add new tags and assign these new tags to the request. For example, the music recommendation request processing sub-system 208, via the interface, may provide the user 204 with an option to define new tags that may otherwise not be available or present in the aforementioned tag profiles. If the user 204 defines or otherwise adds new tags to the request, the music recommendation request processing sub-system 208 may generate a set of tag profiles corresponding to the newly defined tags and add this new set of tag profiles to the set of profiles 212. The newly defined tags may further be associated with the request and with any songs shared with the user 204 in response to its music recommendation request, as described herein.

In addition to selecting one or more tags for the music recommendation request, a user 204 may further provide a comment to supplement a request to obtain music recommendations. For instance, the music recommendation request processing sub-system 208 may provide, via the interface, an option (e.g., comment field, etc.) to provide one or more additional comments that may provide context with regard to the music recommendation request. If the user 204 submits a comment via the interface, the music recommendation request processing sub-system 208 may evaluate the comment to identify one or more potential tags that may be added to the request or replace previously selected tags for the request. These identified tags may be presented to the user 204 via the interface in addition to any previously selected tags. The user 204 may evaluate these suggested tags and determine whether to incorporate any of the identified tags into its music recommendation request or omit these suggested tags.

Through the interface provided by the music recommendation request processing sub-system 208, the user 204 may further select one or more followers and/or tastemakers that are to be provided with the music recommendation request in order to solicit music recommendations from these one or more followers and/or tastemakers. For instance, the music recommendation request processing sub-system 208 may access, from the set of profiles 212, a user profile of the user 204 to identify the followers associated with the user 204. Further, the music recommendation request processing sub-system 208 may evaluate the parameters of the request (e.g., selected tags, comments provided by the user 204, etc.) and the set of profiles 212 to identify any tastemakers that may provide relevant recommendations in response to the request. A tastemaker may be a user of the P2P music recommendation service 202 that is deemed to be qualified to provide relevant music recommendations or otherwise shares music with other users that is of interest to a wide audience. In some instances, the music recommendation request processing sub-system 208 may query, based on the selected set of tags, the set of profiles 212 to identify any other users (e.g., followers) and/or tastemakers that are likely to provide a positive recommendation in response to the request. For instance, a user profile may indicate the tags corresponding to requests previously responded to by the corresponding user and any feedback associated with the responses to these requests. Based on this feedback, the music recommendation request processing sub-system 208 may determine whether a user is likely to provide a positive music recommendation to the requesting user 204.

In some instances, through the interface, the user 204 may select an option to make the music recommendation request publicly available, whereby anyone with access to the music recommendation request may provide a music recommendation in response to the request. If the user 204 selects this option, the music recommendation request processing sub-system 208 may provide the user 204 with a unique link or other network address that may be utilized to access the music recommendation request and submit a response to the request. The user 204 may provide this link or other network address to entities that may not be associated with the P2P music recommendation service 202. An entity utilizing the link or other network address may be invited to generate an account with the P2P music recommendation service 202 in order to provide a music recommendation to the user 204 in response to the music recommendation request. Alternatively, the entity may be provided with the ability to generate a music recommendation responsive to the request without need for registering an account with the P2P music recommendation service 202.

Once the user 204 has generated a new music recommendation request, the music recommendation request processing sub-system 208 may transmit the music recommendation request to the selected set of users and/or tastemakers selected by the user 204. Each of the selected users and/or tastemakers may be notified of the music recommendation request by the music recommendation request processing sub-system 208. For instance, as described herein, the music recommendation request processing sub-system 208 may update an interface of the P2P music recommendation service 202 utilized by each of these users and/or tastemakers to present the received music recommendation request. In response to the request, a user may select a song to be shared with the requesting user 204, such as through the process described above for sharing a particular song with other users. However, in some instances, as opposed to the process described above for sharing a particular song with other users, a responding user may not be permitted to modify the tags selected by the requesting user 204. Each of the users and/or tastemakers selected by the requesting user 204 may be notified via a notification provided within the interface of the P2P music recommendation service 202, a push notification, or any other form of notification.

The music recommendation request processing sub-system 208 may provide the requesting user 204 with any music recommendations provided by the selected users and/or tastemakers via its interface. For instance, via the interface, the music recommendation request processing sub-system 208 may notify the user 204 of a newly received music recommendation, along with any additional information that may have been supplied by the responding user (e.g., additional tags for the recommended song, any comments supplied with the song, etc.). Through the interface, the requesting user 204 may interact with the recommended song, such as initiating playback of the song, saving the song to a playlist or library of the P2P music recommendation service 202 or other music service, re-sharing the song with other users, skipping the song, providing feedback with regard to the recommended song, and the like. As the user 204 interacts with the recommended song, the music recommendation request processing sub-system 208 may track these interactions in order to identify the user's response to the music recommendation. This response may be used to determine whether the user has reacted favorably to the song. Further, the response may be used to update corresponding profiles for the song, artist that performed and/or produced the song, any associated tags, the responding user, and the like. As noted herein, these updates may be used to identify and recommend songs that may be positively received by the user, more accurately associate particular tags to particular songs and artists, establish connections between similar artists, and the like.

Figure 3:
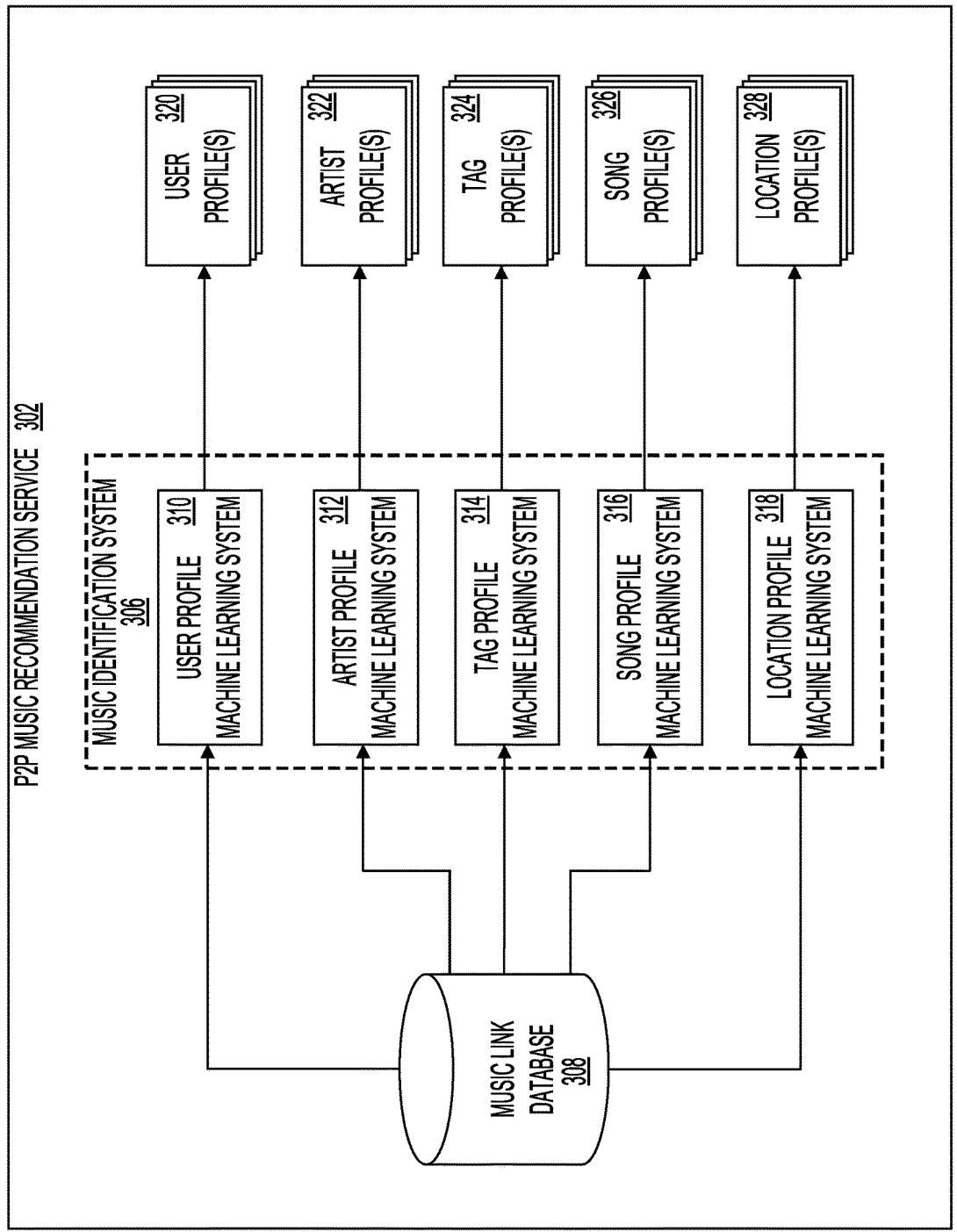
FIG. 3 shows an illustrative example of an environment in which a music identification system of a P2P music recommendation service utilizes a set of machine learning systems to generate and update various profiles used to identify music that can be shared by users of the P2P music recommendation service in accordance with at least one embodiment.

FIG. 3 shows an illustrative example of an environment 300 in which a music identification system 306 of a P2P music recommendation service 302 utilizes a set of machine learning systems 310-318 to generate and update various profiles 320-328 used to identify music that can be shared by users of the P2P music recommendation service 302 in accordance with at least one embodiment. In the environment 300, the P2P music recommendation service 302 maintains a music link database 308, which is used to track interactions amongst users of the P2P music recommendation service 302 as related to the sharing of songs and to the communications related to music recommendation requests submitted by users of the P2P music recommendation service 302 (e.g., feedback submitted by users, any additional tags submitted by users, etc.). For example, the music link database 308 may specify, for a given user action (e.g., sharing of a song, submission of a music recommendation request, etc.), any tags associated with the action (e.g., tags associated with a selected song to be shared, tags associated with a music recommendation request, etc.), any feedback provided with regard to the action (e.g., songs provided in response to a request, user interaction with a shared song, etc.), the targets corresponding to the action (e.g., users receiving a music recommendation request, users receiving a shared song, etc.), any songs and/or artists associated with the action (e.g., sample songs and/or artists specified in the submission of a music recommendation request, etc.), the location associated with the action (e.g., location from which a selected song is being shared from, location from which a music recommendation request is being submitted from, etc.), and the like. Further, the music link database 308 may specify, for a given action, information regarding any shared songs (e.g., songs submitted in a music recommendation request to other users, songs received in response to music recommendation request, songs shared with other users, etc.) including, but not limited to, song titles, artists that performed and/or produced the songs, the music genres of the songs, and the like. The music link database 308 may maintain an association of these songs to tags submitted by the users of the P2P music recommendation service 302 as well.

In an embodiment, the music identification system 306 processes the data in the music link database 308 using a set of machine learning systems 310-318 to generate a set of profiles 320-328 for use by the music identification system 306 to better serve users of the P2P music recommendation service 302, as well as other entities (e.g., artists, other music services, music labels, promoters, brands that utilize music as a core component of their product, etc.) associated with the P2P music recommendation service 302. For example, the music identification system 306 may include a user profile machine learning system 310 that is implemented to generate and update user profiles 320 for each of the users of the P2P music recommendation service 302. The user profile machine learning system 310 may be implemented using a computer system or utilizing an application implemented using a computer system of the P2P music recommendation service 302.

The user profile machine learning system 310 may utilize a machine learning algorithm, trained using supervised learning techniques, to generate and update user profiles 320 for each user of the P2P music recommendation service 302. For instance, a dataset of tags corresponding to songs shared with a user, of user responses to these shared songs may be used to generate a set of sample user profiles that may indicate a user's individual taste in music. Based on a sample user profile, the user profile machine learning system 310 may provide a user with a sample music recommendation based on a sample user profile generated for the user. Based on the user response to the sample music recommendation, the user profile machine learning system 310 may update one or more model coefficients of the machine learning algorithm to either reinforce the algorithm (e.g., if the user responds positively (e.g., the user provides positive comments or feedback, the user shares the song provided in the recommendation, the user saves the song provided in the recommendation to a playlist, etc.) to the sample recommendation) or to revise the algorithm to provide better recommendations (e.g., if the user responds negatively (e.g., the user provides negative comments or feedback, the user skips the song provided in the recommendation, etc.) to the sample recommendation). Through this iterative process, the machine learning algorithm may be trained to provide music recommendations that are likely to be received positively by a user of the P2P music recommendation service 302.

In an embodiment, the user profile machine learning system 310 generates an anonymized taste profile for each user based on the user's lifetime tracking of the artists, songs, shared tags, saved songs, skipped songs, disliked songs, submitted requests, locations from which requests were submitted, time of day during which requests were submitted, and the like specified in the music link database 308. Additionally, the anonymized taste profile may be generated based on user interaction with other users, including the location and time for each interaction. This information from the music link database 308 may be processed using the machine learning algorithm of the user profile machine learning system 310 to generate or update a user profile of a particular user of the P2P music recommendation service 302. Thus, the user profile machine learning system 310 may maintain user profiles 320 for each of the users of the P2P music recommendation service 302. These user profiles 320 may be continuously updated as new data is added to the music link database 308 based on user interaction with the P2P music recommendation service 302 over time. A user profile 320 may thus provide the subjective tastes or a corresponding user for different contexts. For instance, a user profile 320 may define a user's preferences for a particular location, particular time of day, particular tag or combination of tags, moods, and the like.

The P2P music recommendation service 302 may utilize a user profile for various purposes. For instance, if a user of the P2P music recommendation service 302 submits a request to share a particular song with other users of the P2P music recommendation service 302, the P2P music recommendation service 302 may determine, based on user profiles for each of the other users that are followers of the user submitting the request, which users are likely to react positively to the song being shared. For instance, if a user is known to react positively to songs associated with a particular set of tags, the P2P music recommendation service 302 may determine whether the song being shared is associated with this particular set of tags and, if so, indicate to the user sharing the song that this particular user may react positively to the song. As another example, the user profiles 320 may be used for targeted promotion of music by artists and businesses that may rely on the P2P music recommendation service 302 to promote their music. For instance, based on the characteristics of the song or release that is to be promoted, the P2P music recommendation service 302 may evaluate the user profiles 320 to identify a target audience to which the song or release may be promoted to. Similarly, if a user indicates that it is seeking music recommendations from other users of the P2P music recommendation service 302, the P2P music recommendation service 302 may identify any promoted songs that may be received positively by the user and a promoted recommendation may be provided to the user. The user profiles 320 may further be used to identify target audiences for upcoming concerts, events, music streams, streaming services, products, brands, and the like that may be of interest to these target audiences.

In an embodiment, the user profile machine learning system 310 is further utilized to match users of the P2P music recommendation service 302 based on shared appreciation of content (e.g., songs, artists, music genres, etc.). For instance, based on the characteristics of a user profile (e.g., positively received tags, songs, artists, etc.), the user profile machine learning system 310 may identify other user profiles that may have similar characteristics that are indicative of a shared appreciation for particular songs, artists, music genres, and the like. These similarities may be used to determine a likelihood that a relationship between a set of users would result in a positive experience for the set of users. The P2P music recommendation service 302 may utilize this information to recommend other users, tastemakers, artists, music labels, brands, promoters, venues, events, streaming services, and the like to a particular user during their interaction with the P2P music recommendation service 302.

The music identification system 306 may further include an artist profile machine learning system 312 that may be utilized to generate and update artist profiles 322 for each artist associated with the P2P music recommendation service 302 (e.g., artists that perform and/or produce songs shared within the P2P music recommendation service 302 network, artists promoting songs via the P2P music recommendation service 302, etc.). The artist profile machine learning system 312 may be implemented using a computer system or utilizing an application implemented using a computer system of the P2P music recommendation service 302. The artist profile machine learning system 312 may utilize a machine learning algorithm, trained using supervised learning techniques, to generate and update artist profiles 322 for each artist associated with the P2P music recommendation service 302. For instance, a dataset of tags and comments corresponding to songs shared by users of the P2P music recommendation service 302 and of user responses to these shared songs may be used to generate a set of sample artist profiles that may indicate what type of users are likely to react positively to the artist's music and what tags may be associated with the artist. Based on a sample artist profile, the artist profile machine learning system 312 may provide an artist's songs to a user identified as being likely to react positively to the artist's songs or that has submitted a request specifying tags associated with the artist profile for music recommendations. Based on the user response to the artist's songs, the artist profile machine learning system 312 may update one or more model coefficients of the machine learning algorithm to either reinforce the algorithm (e.g., if the user responds positively to the artist's songs) or to revise the algorithm to provide better recommendations (e.g., if the user responds negatively to the artist's songs). Through this iterative process, the machine learning algorithm may be trained to generate a more accurate artist profile.

The artist profile machine learning system 312 may utilize the music link database 308 to track any tags and comments used by users of the P2P music recommendation service 302 when sharing, requesting, and saving songs by an artist. Further, the artist profile machine learning system 312 may track any user actions with regard to songs associated with the artist. For instance, the artist profile machine learning system 312 may track a user's sharing of a song by the artist, a user's act of saving a song by the artist, a user's skipping of a song by the artist, the amount of time between initiation of playback of a song and the user's skipping of the song by the artist, a user's response to a song by the artist (e.g., positive or negative reactions, etc.), and the like. Further, the artist profile machine learning system 312 may determine, for a given action, the context or circumstances surrounding the action (e.g., the request associated with the action, the time of day associated with the action, etc.). In an embodiment, the artist profile machine learning system 312 further maps the relationship between artists associated with the P2P music recommendation service 302. For instance, for a particular artist, the artist profile machine learning system 312 may evaluate the user profiles 320 of users that react positively to the artist's music to identify which other artists these users may also react positively to. This may result in the discovery of possible relationships amongst artists that may be used to group artists for user recommendations, for cross promotional ventures between artists, and the like.

The music identification system 306 may include a tag profile machine learning system 314 that may be utilized to generate and update tag profiles 324 for each tag provided by the P2P music recommendation service 302 for the creation of sharing and music recommendation requests and for the providing of responses to said requests. The tag profile machine learning system 314 may be implemented using a computer system or utilizing an application implemented using a computer system of the P2P music recommendation service 302. The tag profile machine learning system 314 may utilize a machine learning algorithm, trained using supervised learning techniques, to generate and update tag profiles 324 for each tag made available by the P2P music recommendation service 302 for requests and for association with songs shared within the P2P music recommendation service 302 network.

The tag profile machine learning system 314 may utilize a machine learning algorithm, trained using supervised learning techniques, to generate and update tag profiles 324 for each tag made available by the P2P music recommendation service 302 to users. For instance, a dataset of tag interactions amongst users of the P2P music recommendation service 302 may be used as input to identify a set of characteristics of each tag provided by the P2P music recommendation service 302 and to generate a set of sample tag profiles. Based on a sample tag profile, the tag profile machine learning system 314 may assign the corresponding tag to a song or artist submitted by a user, such as via a song sharing request or with a song to be submitted as an example for identifying music recommendations for the user. Based on the user response to the tag identification provided by the machine learning algorithm, the tag profile machine learning system 314 may update one or more model coefficients of the machine learning algorithm to either reinforce the algorithm (e.g., if the user responds positively to the tag selection) or to revise the algorithm to better assign tags to a particular song or request (e.g., if the user responds negatively to the tag selection). Through this iterative process, the machine learning algorithm may be trained to more accurately assign tags to songs, artists, and requests.

The tag profile machine learning system 314 may utilize the music link database 308 to track any which songs, artists, and users are associated with each tag. Further, the tag profile machine learning system 314 may track actions taken by users of the P2P music recommendation service 302, such as skipping songs, saving songs to a playlist, providing feedback (positive or negative) with regard to a particular song, submitting requests to share a song or to obtain music recommendations, and the like. Each of these actions may be associated with a set of tags, whose usage may be monitored by the tag profile machine learning system 314 through evaluation of the music link database 308 and used to generate and update the tag profiles 324. The tag profiles 324 may further be utilized by the aforementioned user profile machine learning system 310 and artist profile machine learning system 312 to provide tag recommendations to users and artists associated with the P2P music recommendation service 302 and to associate these users and artists with particular tags based on their individual interactions with the P2P music recommendation service 302.

The music identification system 306 may further include a song profile machine learning system 316 that may be utilized to generate and update song profiles 326 for each song shared within the P2P music recommendation service 302 network or otherwise made available to users of the P2P music recommendation service 302 (e.g., songs promoted by artists or other entities associated with the P2P music recommendation service 302, songs performed and/or produced by artists associated with the P2P music recommendation service 302, etc.). The song profile machine learning system 316 may be implemented using a computer system or utilizing an application implemented using a computer system of the P2P music recommendation service 302. The song profile machine learning system 316 may utilize a machine learning algorithm, trained using supervised learning techniques, to generate and update song profiles 326 for each song made available by the P2P music recommendation service 302 for sharing amongst users of the P2P music recommendation service 302. For instance, a dataset of tags and comments corresponding to songs shared by users of the P2P music recommendation service 302 and of user responses to these shared songs may be used to generate a set of sample song profiles that may indicate what type of users are likely to react positively to certain songs and what tags may be associated with these songs.

Based on a sample song profile, the song profile machine learning system 316 may provide or recommend the song to a user identified as being likely to react positively to the particular song or that has submitted a request specifying tags associated with the song profile for music recommendations. Based on the user response to the song, the song profile machine learning system 316 may update one or more model coefficients of the machine learning algorithm to either reinforce the algorithm (e.g., if the user responds positively to the song) or to revise the algorithm to provide better recommendations (e.g., if the user responds negatively to the song). Through this iterative process, the machine learning algorithm may be trained to generate a more accurate song profile.

The song profile machine learning system 316 may utilize the music link database 308 to track any tags and comments used by users of the P2P music recommendation service 302 when sharing, requesting, and saving the song. Further, the song profile machine learning system 316 may track any user actions with regard to the song. For instance, the song profile machine learning system 316 may track a user's sharing of the song, a user's act of saving the song, a user's skipping of the song, a user's response to the song (e.g., positive or negative reactions, etc.), and the like. Similar to the artist profile machine learning system 312 described above, the song profile machine learning system 316 may also track which artists the particular song is associated with. For instance, if the song is recommended to a user along with particular songs by other artists, the song profile machine learning system 316 may update the song profile for the song to create an association between the song and these other artists. This interaction may result in improved song recommendations when a user selects a particular artist or tags in a sharing request or in a music recommendation request.

In an embodiment, the song profile machine learning system 316 further maps the relationship between a song and a particular location. For instance, for a particular song, the song profile machine learning system 316 may evaluate location profiles 328 to identify locations where the song may have been shared from and resulted in positive reactions from users. This may result in the discovery of possible relationships between songs and locations, as well as between the song and other songs that may have also been shared from the same location. These relationships may be used to group songs for user recommendations, for generating promotions at the given location, and the like.

The music identification system 306 may further include a location profile machine learning system 318 that may be utilized to generate and update location profiles 328 for different locations where users may be located or from which songs are shared with other users of the P2P music recommendation service 302. The location profile machine learning system 318 may be implemented using a computer system or utilizing an application implemented using a computer system of the P2P music recommendation service 302. The location profile machine learning system 318 may utilize a machine learning algorithm, trained using supervised learning techniques, to generate and update location profiles 328 corresponding to user locations and other locations from which songs may be shared with users of the P2P music recommendation service 302. For instance, a dataset of tags, songs, artists, user responses to shared songs, and location information may be used to generate a set of sample location profiles that may indicate what type of songs and artists are shared from a particular location by users of the P2P music recommendation service 302. The location profile machine learning system 318 may track which users, artists, songs, and tags each location is associated with, as well as the actions taken by users at the location (e.g., skipping songs, saving songs, feedback provided with regard to songs shared from the location, requests submitted from the location, etc.).

Based on a sample location profile, the location profile machine learning system 318 may provide or recommend a song to users at the corresponding location. Based on the user response to the song at the location, the location profile machine learning system 318 may update one or more model coefficients of the machine learning algorithm to either reinforce the algorithm (e.g., if the user responds positively to the song) or to revise the algorithm to provide better recommendations (e.g., if the user responds negatively to the song). Through this iterative process, the machine learning algorithm may be trained to generate a more accurate location profile, which may be used to determine which songs to recommend at a particular location.

A location profile may correspond to a national, regional, local, and/or hyper-local (e.g., a particular venue, etc.) location. Further, a location profile may be associated with different user, artist, tag, and song profiles maintained by the P2P music recommendation service 302. For instance, a location profile may be associated with a set of song profiles corresponding to songs that are frequently shared from the location. Similarly, a location profile may be associated with a set of artist profiles corresponding to the artists whose songs are frequently shared from the location. Tag profiles corresponding to tags included share requests or music recommendation requests submitted from the location may also be associated with a location profile. User profiles of users that frequent the location may also be associated with the location profile for the location. This interconnectivity among profiles may allow the music identification system 306 to utilize a user's location to determine which songs are frequently shared from the location, may be appealing to the user at the location, and the like. Further, a location profile may be used to generate targeted promotions at the location based on the songs and artists that are frequently shared amongst users of the P2P music recommendation service 302 from the location and feedback from these users with regard to the shared songs and artists.

Figure 4:
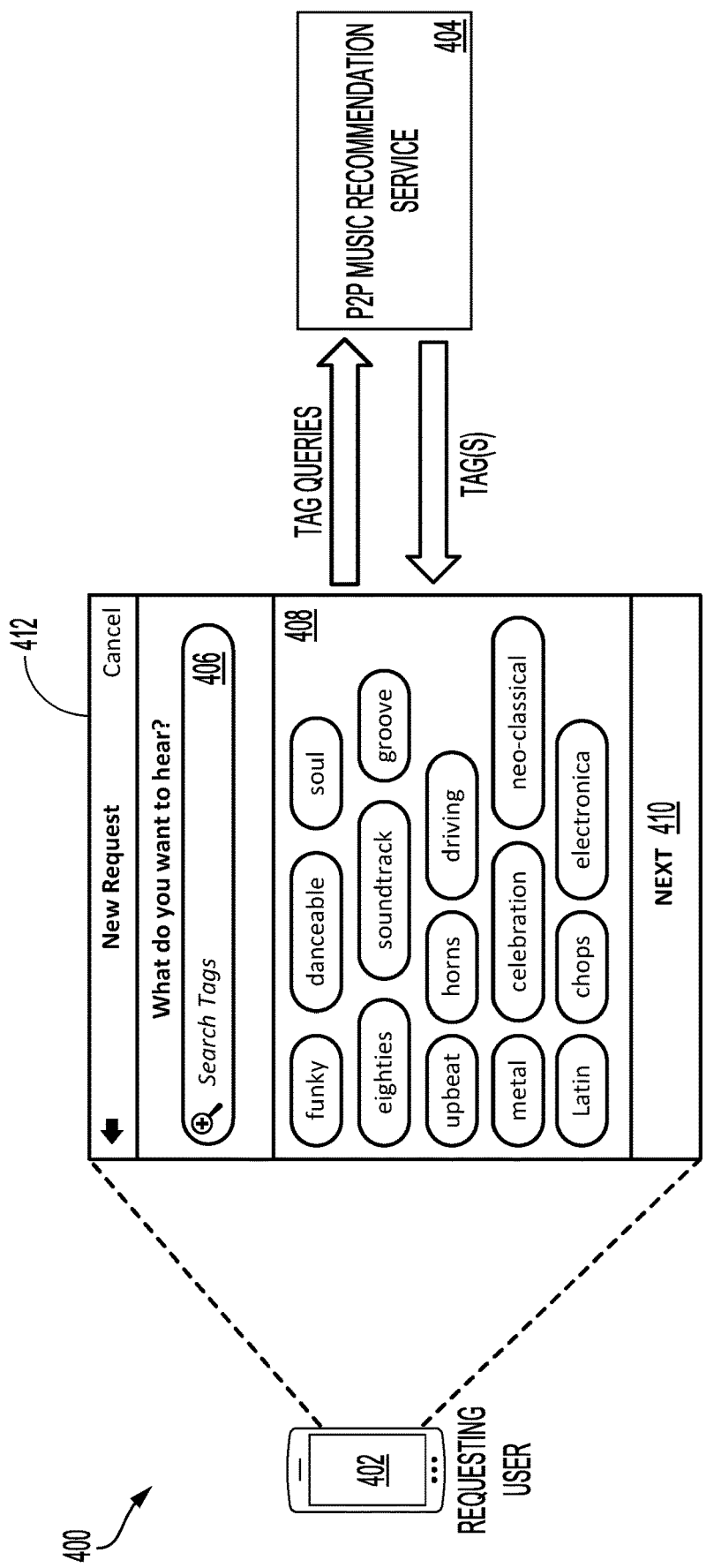
FIG. 4 shows an illustrative example of an environment in which a requesting user, via an interface of the P2P music recommendation service, can select one or more music tags for a request to obtain music recommendations in accordance with at least one embodiment.

FIG. 4 shows an illustrative example of an environment 400 in which a requesting user 402, via an interface 412 of the P2P music recommendation service 404, selects one or more music tags for a request to obtain music recommendations in accordance with at least one embodiment. In the environment 400, when a requesting user 402 submits a request to the P2P music recommendation service 404 to generate a music recommendation request, the P2P music recommendation service 404 may update the interface 412 to provide the requesting user 402 with various options for selecting a set of tags that are to be provided in the music recommendation request. For instance, via the interface 412, the P2P music recommendation service may provide a requesting user 402 with a tag query bar 406, through which the requesting user 402 may submit a query to the P2P music recommendation service 404 for available tags that can be incorporated into the music recommendation request. The P2P music recommendation service 404 may process the tag query from the requesting user 402 and identify any tags that may be of interest to the requesting user 402. These tags may be presented to the requesting user 402 via the interface 412, such as through a tag selection window 408.

In an embodiment, the P2P music recommendation service 404 provides, via the tag selection window 408, a set of popular tags that may be incorporated into the music recommendation request. The P2P music recommendation service 404 may populate the tag selection window 408 with tags commonly used by the requesting user 402 in its music recommendation requests. For instance, the P2P music recommendation service 404 may track which tags the requesting user 402 has selected over time and the frequency in which such tags were selected. Based on the frequency in which the requesting user 402 selects particular tags for its requests, the P2P music recommendation service 404 may identify which tags are commonly or frequently selected by the requesting user 402 and present these tags by default within the tag selection window 408. Additionally, or alternatively, the P2P music recommendation service 404 may provide, within the tag selection window 408, tags that are popular among the user base of the P2P music recommendation service 404. In some instances, if the requesting user 402 submits a query for one or more tags via the tag query bar 406, the P2P music recommendation service 404 may populate the tag selection window 408 with any tags identified in response to the query.

As part of the music recommendation request creation process, the P2P music recommendation service 404 may require the requesting user 402 to select at least one tag for the request. If the requesting user 402 fails to select a tag and proceeds to select the next button 410 to continue the request creation process, the P2P music recommendation service 404 may notify the requesting user 402 that the process cannot continue until at least one tag has been selected. The requesting user 402 may then be prompted to select, from the tag selection window 408, at least one tag to be included in the music recommendation request.

In an embodiment, a tag may be selected as either a positive indicator or as a negative indicator for the music recommendation request. For instance, a requesting user 402 may select a tag as being indicative of a desire to obtain music recommendations corresponding to the tag. Alternatively, the requesting user 402 may select a tag as being indicative of a desire to not obtain music recommendations corresponding to the tag. Thus, a music recommendation request may be constructed with myriad positive and negative tag indications that may be used to steer a responding user towards selecting songs that satisfy the requirements set forth by the requesting user 402 via its selection of tags.

Figure 5:
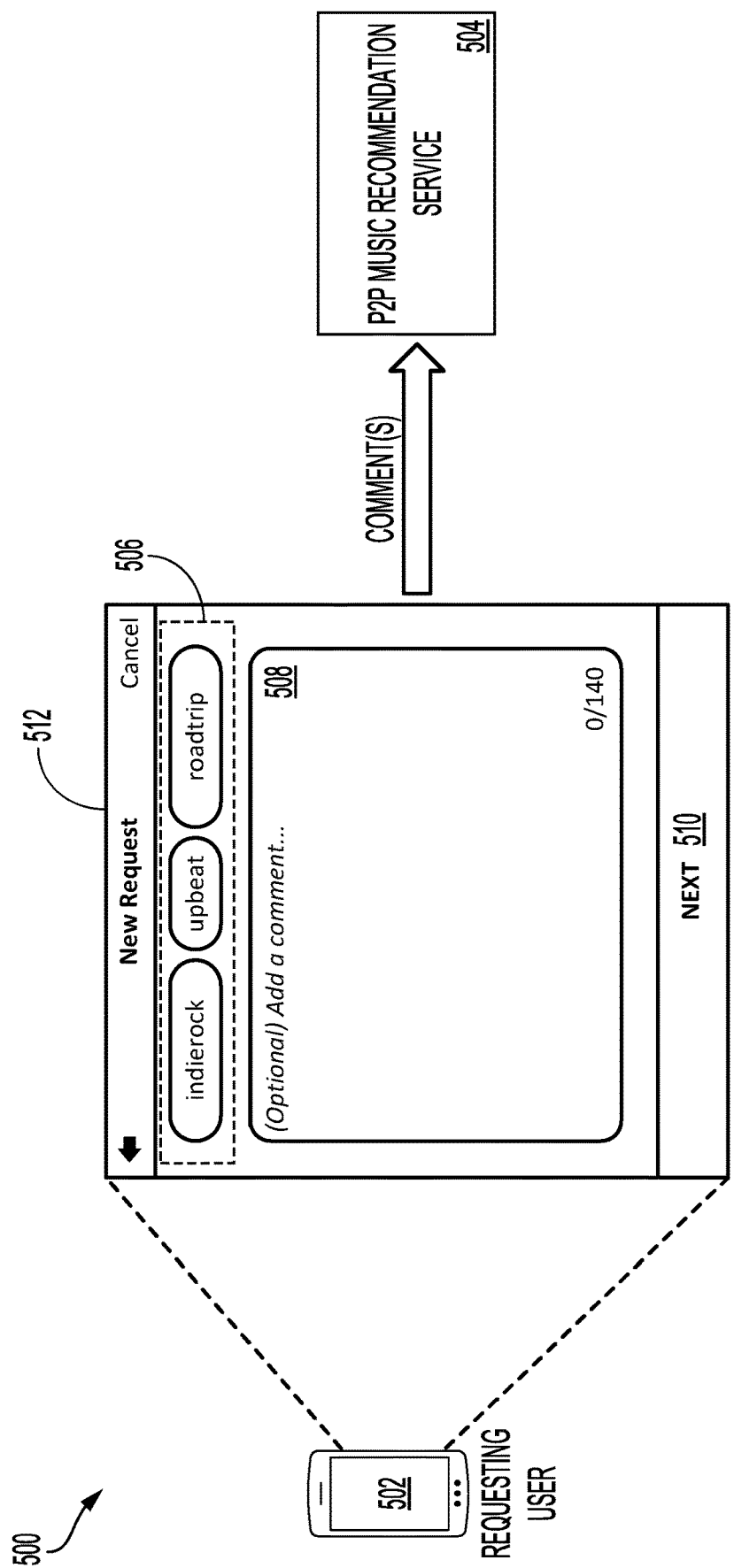
FIG. 5 shows an illustrative example of an environment in which a requesting user, via an interface of the P2P music recommendation service, can provide a comment to supplement a request to obtain music recommendations in accordance with at least one embodiment.

FIG. 5 shows an illustrative example of an environment 500 in which a requesting user 502, via an interface 512 of the P2P music recommendation service 504, can provide a comment to supplement a request to obtain music recommendations in accordance with at least one embodiment. In the environment 500, once the requesting user 502 has selected the one or more tags 506 that are to be provided with the music recommendation request, the P2P music recommendation service 504 updates the interface 512 to provide the requesting user 502 with an option to provide one or more additional comments that may provide context with regard to the music recommendation request. For example, via the interface 512, the P2P music recommendation service 504 may provide an optional comment field 508 through which the requesting user 502 may submit one or more optional comments that may be provided in the music recommendation request.

In an embodiment, if the requesting user 502 submits a comment within the optional comment field 508, the P2P music recommendation service 504 evaluates the comment to identify one or more potential tags that may be added to the request or replace previously selected tags for the request. For example, the P2P music recommendation service 504 may process a comment submitted within the optional comment field 508 using a machine learning algorithm or artificial intelligence (e.g., Natural Language Processing (NLP), etc.), as described above, to identify one or more tags that may be germane to the submitted comment. These identified tags may be presented to the user via the interface 512 in addition to any previously selected tags 506. The requesting user 502 may evaluate these suggested tags and determine whether to incorporate any of the identified tags into its music recommendation request or omit these suggested tags.

The P2P music recommendation service 504 may provide, via the interface 512, a next button 510, which the requesting user 502 may use to submit any optional comments and continue the music recommendation request process. For instance, if the requesting user 502 selects the next button 510, the P2P music recommendation service 504 may obtain any optional comments and any newly added tags for use in the music recommendation request. Further, the P2P music recommendation service 504 may update the interface 512 to present the requesting user 502 with a listing or other ordering of users, tastemakers, and other services to which the music recommendation request may be provided in order to solicit music recommendations from any of these entities.

Figure 6:
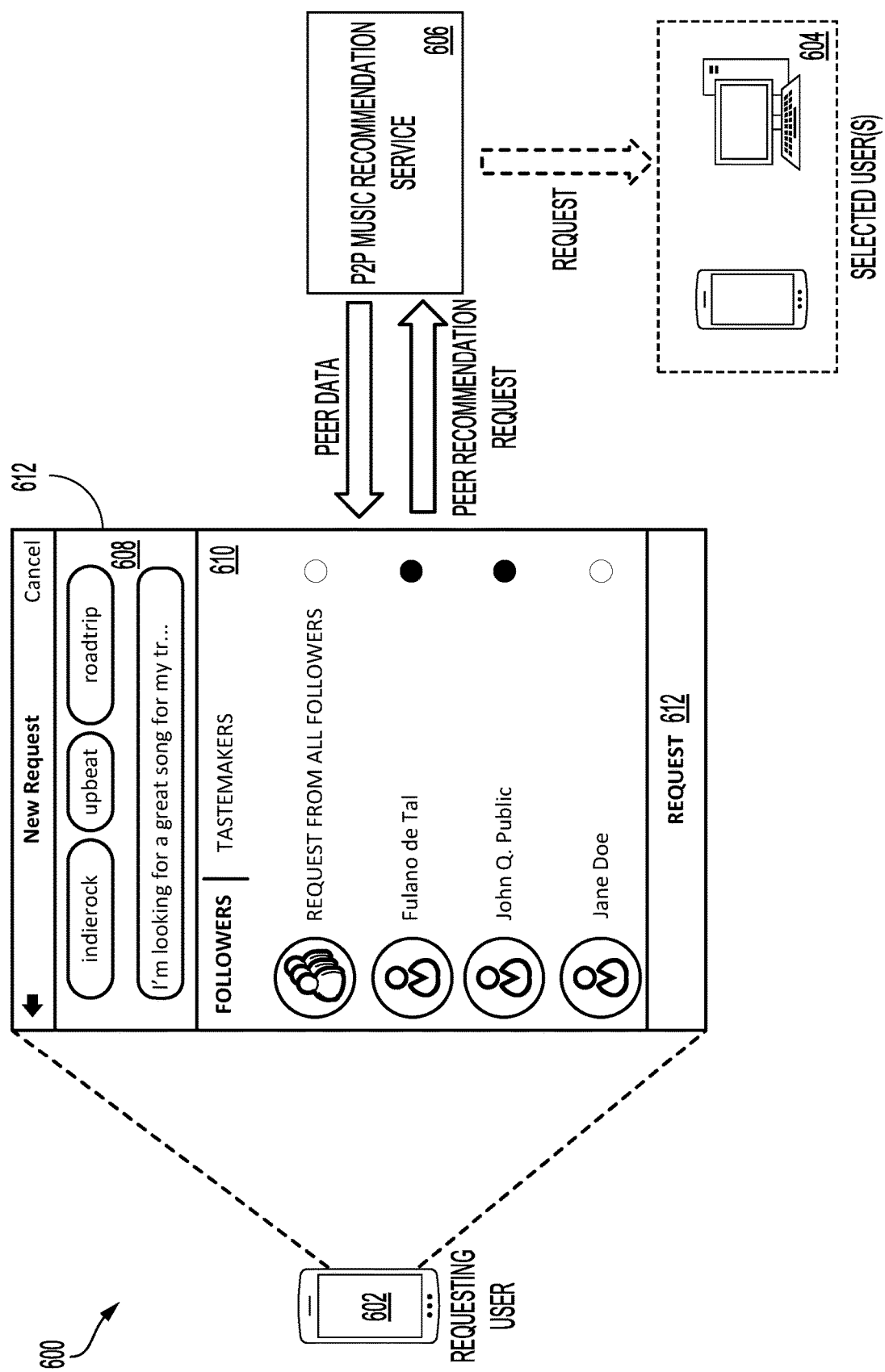
FIG. 6 shows an illustrative example of an environment in which a requesting user, via an interface of the P2P music recommendation service, selects one or more users from which music recommendations are to be solicited in accordance with at least one embodiment.

FIG. 6 shows an illustrative example of an environment 600 in which a requesting user 602, via an interface 612 of the P2P music recommendation service 606, selects one or more users from which music recommendations are to be solicited in accordance with at least one embodiment. In the environment 600, once the requesting user 602 has generated the music recommendation request (e.g., has selected tags to be included in the requested, has provided any optional comments, etc.), the P2P music recommendation service 606, via the interface 612, enables the requesting user 602 to select which users 604 are to receive the music recommendation request in order to solicit music recommendations from these users 604. For instance, as illustrated in FIG. 6, the P2P music recommendation service 606 may present to the requesting user 602 a listing of users that may be followers of the requesting user 602. These users 604 and the requesting users 602 may be mutual followers, whereby each of the users 604 may share music with the requesting user 602 and/or submit music recommendation requests to the requesting user 602.

The listing of users may be presented via a user selection window 610 of the interface 612. Through this user selection window 610, the P2P music recommendation service 602 may provide identifying information of each user 604 (e.g., follower) associated with the requesting user 602. This identifying information may include a username or actual name of the user, an image or icon that represents the user, a location of the user, and the like. Further, for each user presented in the user selection window 610, the P2P music recommendation service 606 may provide the requesting user 602 with an option to select the user as a recipient of the music recommendation request. This may allow the requesting user 602 to select a subset of all followers to which the request is to be provided.

In an embodiment, the P2P music recommendation service 606 provides additional information to the requesting user 602 that can be used by the requesting user 602 to determine which users to select for its music recommendation request. For instance, the P2P music recommendation service 606, via the interface 612 and for each user that is a follower of the requesting user 602, a score that is indicative of the user's performance with regard to the quality of recommendations provided in response to music requests. For instance, a user that has provided unfavorable music recommendations to other users may be assigned a lower score, whereas a user that has provided favorable or well-received music recommendations may be assigned a higher score. This score may assist the requesting user 602 in determining which users to solicit music recommendations from. Further, the score may be tailored specifically to user performance with regard to music recommendation requests similar to the request being submitted by the requesting user 602. For instance, the P2P music recommendation service 606 may determine whether a user has provided a music recommendation for a request similar to that being submitted by the requesting user 602 and generate a score based on the quality of these music recommendations. Thus, the requesting user 602 may be presented with request-specific scores that may serve as an indication as to which users have provided music recommendations for similar requests and the quality of these music recommendations.

In addition to providing a listing of users that may be mutual followers of the requesting user 602, the P2P music recommendation service 606 may also provide, via the interface 612 and within the user selection window 610, a listing of tastemakers from which to solicit music recommendations. A tastemaker may be a user of the P2P music recommendation service 606 that is deemed to be qualified to provide relevant music recommendations or otherwise shares music with other users that is of interest to a wide audience. For instance, if a recommendation score (e.g., score representative of the quality of recommendations provided by the user to other users) for a particular user surpasses a minimum score threshold for qualifying as a tastemaker of the P2P music recommendation service 606, the P2P music recommendation service 606 may transmit a notification to the user to indicate that the user has qualified to become a tastemaker. The user may indicate whether to accept or reject the offer of the P2P music recommendation service 606 to assume the role of tastemaker. In some instances, the use of this score is contingent on the user submitted a minimum number of recommendations to different users of the P2P music recommendation service 606. The requesting user 602 may select, from the listing of tastemakers supplied by the P2P music recommendation service 606, any tastemakers that may be solicited for a music recommendation.

It should be noted that while manual selection of users to which a music recommendation request is to be provided is illustrated and described extensively throughout the present disclosure, the P2P music recommendation service 606, in some instances, allow for automatic selection of users to which a music recommendation request is to be provided. For example, the music recommendation service 606 can automatically provide the music recommendation request to all mutual followers of the requesting user 602. In an embodiment, the music recommendation service 606 can automatically select one or more followers from a set of mutual followers based on the a score that is indicative of each user's performance with regard to the quality of recommendations provided in response to music requests having similar parameters to those of the music recommendation request submitted by the requesting user 602. For instance, the P2P music recommendation service 606 may identify which of the requesting user's followers may have responded to other music recommendation requests similar to that of the requesting user 602 (e.g., have the same or similar tags, correspond to the same or similar mood of the requesting user 602, correspond to the same or similar location from which the request is being made, etc.). The P2P music recommendation service 606 may determine a score for each user based on the quality of the recommendation provided in response to these similar music recommendation requests. The P2P music recommendation service 606 may identify followers that have a score that satisfies a threshold for the music recommendation request and automatically submit the requesting user's music recommendation request to these followers.

In an embodiment, the P2P music recommendation service 606 can automatically identify users to which the music recommendation request is to be provided based on the location of the requesting user 602. For instance, the P2P music recommendation service 606 may identify the requesting user's location or location from which the music recommendation request was submitted and identify any users of the P2P music recommendation service 606 that may be at the location or within proximity (e.g., within a spatial vicinity of the location) of the location. The P2P music recommendation service 606 may automatically submit the music recommendation request to the users identified as being at or within proximity of the location from which the music recommendation request was submitted.

The interface 612 may further include a request summary window 608, which may include various elements of the music recommendation request that is to be submitted to the one or more selected users 604. For instance, the summary of the music recommendation request may include the one or more tags associated with the request and a truncated or abbreviated version of any comments provided by the requesting user 602 for the request. Additionally, if the requesting user 602 has selected a sample song that is demonstrative of the type of music recommendations that it wishes to receive, the P2P music recommendation service 606 may provide an option, via the request summary window 608, for playback of the sample song. Further, information of the sample song may be presented via the request summary window 608 (e.g., song title, artist name, music genre, etc.).

Once the requesting user 602 has selected, from the user selection window 610, the one or more users 604 that are to receive the music recommendation request, the requesting user 602 may select the request button 612 to submit the music recommendation request to the P2P music recommendation service 606. The P2P music recommendation service 606 may evaluate the request to identify the selected users 604 that are to receive the music recommendation request and transmit the request to these selected users 604.

Figure 7:
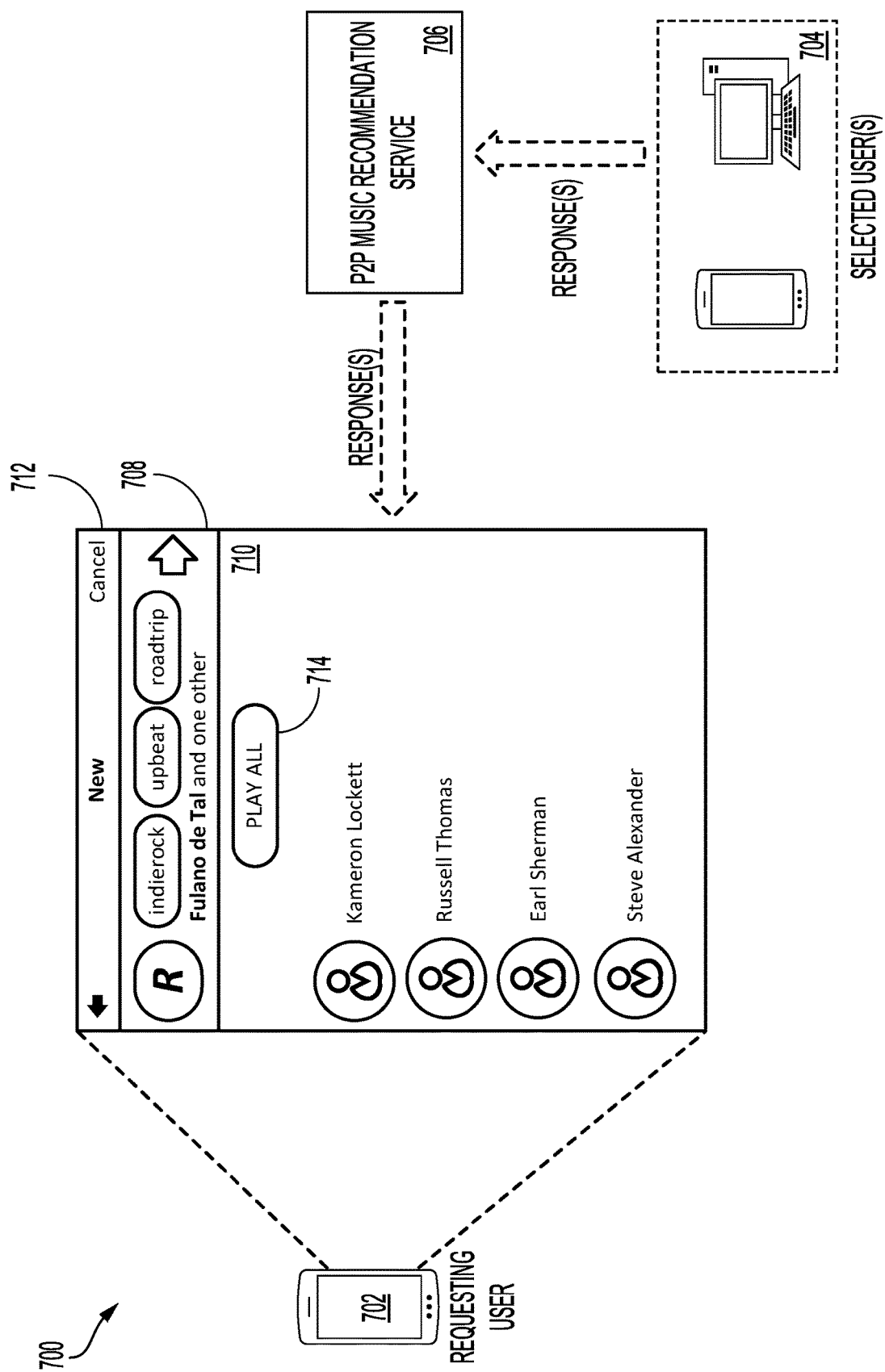
FIG. 7 shows an illustrative example of an environment in which a requesting user, via an interface of the P2P music recommendation service, is presented with responses from one or more selected users to a music recommendation request in accordance with at least one embodiment.

FIG. 7 shows an illustrative example of an environment 700 in which a requesting user 702, via an interface 712 of the P2P music recommendation service 706, is presented with responses from one or more selected users 704 to a music recommendation request in accordance with at least one embodiment. In the environment 700, the P2P music recommendation service 706 updates an interface 712 provided to a requesting user 702 to indicate that one or more responses to a music recommendation request submitted by the requesting user 702 have been received from one or more selected users 704. For example, as illustrated in FIG. 7, for a given music recommendation request, the P2P music recommendation service 706, via a received responses window 710 of the interface 712, may present the requesting user 702 with an indication of received responses from one or more selected users 704.

In an embodiment, the indication of received responses from one or more selected users 704 includes, within the received responses window 710, identifying information of the one or more selected users 704. For instance, for each selected user 704 that has submitted a response to the music recommendation request submitted by the requesting user 702, the P2P music recommendation service 706 may present a username or actual name of the selected user and an image or icon that represents the selected user (e.g., a user profile image, etc.). Through the interface 712, the requesting user 702 may select a particular selected user from the received responses window 710 to submit a request to the P2P music recommendation service 706 to present, via the interface, the music recommendation provided by the selected user.

In addition to providing identifying information of each of the selected users 704 that have provided responses to the music recommendation request submitted by the requesting user 702, the P2P music recommendation service 706 may provide, via the interface 712, a play all button 714. Selection of the play all button 714 may cause the P2P music recommendation service 706 to initiate playback of each of the songs provided by the one or more selected users 704 indicated in the received responses window 710. In some instances, selection of the play all button 714 may cause the P2P music recommendation service 706 to present, to the requesting user 702, a music player application through which the requesting user 702 may interact with the songs recommended by the one or more selected users 704, such as initiating playback of the songs, providing feedback with regard to each of the recommended songs, and the like.

The P2P music recommendation service 706, via the interface 712, may also provide a request summary window 708, through which the requesting user 702 may be presented with one or more elements of the submitted music recommendation request. For instance, via the request summary window 708, the requesting user 702 may be presented with the one or more tags associated with the submitted request, as well as an indication of which users have submitted responses to the request. The requesting user 702 may interact with the request summary window 708 to expand the request summary to present the complete details associated with the submitted request, including which users the requesting user 702 submitted the request to, which users have provided responses, the different songs recommended to the requesting user 702 by the one or more selected users 704 and the like.

Figure 8:
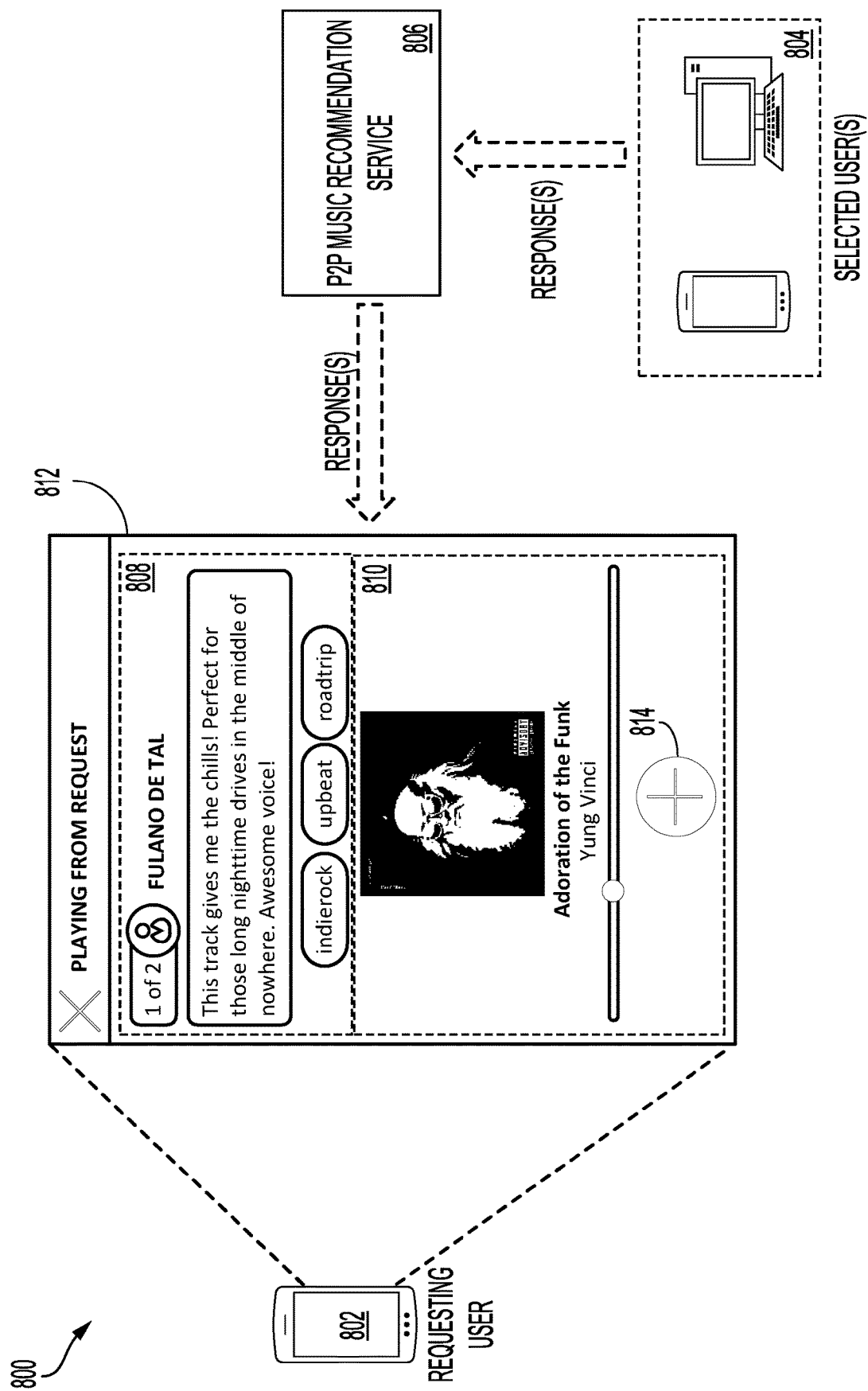
FIG. 8 shows an illustrative example of an environment in which a requesting user, via an interface of the P2P music recommendation service, initiates playback of a particular song identified in a music recommendation provided by a selected user in accordance with at least one embodiment.

FIG. 8 shows an illustrative example of an environment 800 in which a requesting user 802, via an interface 812 of the P2P music recommendation service 806, initiates playback of a particular song identified in a music recommendation provided by a selected user 804 in accordance with at least one embodiment. In the environment 800, a requesting user 802 can initiate playback of a particular song submitted by a selected user 804 in response to a music recommendation request. For instance, if the requesting user 802 selects, from the interface provided by the P2P music recommendation service 806, a particular response provided by a selected user 804, the P2P music recommendation service 806 may update the interface 812 to provide the requesting user 802 with an option to playback the song selected by the selected user 804 as a music recommendation for the requesting user 802.

The interface 812 through which the requesting user 802 may access a selected song submitted by a selected user 804 may include various elements that facilitate playback of the selected song. For instance, as illustrated in FIG. 8, the interface 812 may include a playback window 810 through which elements of the song selected by the selected user 804 may be presented. The playback window 810, for example, may include the name of the song, the name of the artist that performed and/or produced the song, any cover art or other art associated with the song, and the like. Further, through the playback window 810, the P2P music recommendation service 806 may provide a requesting user 802 with an option to initiate playback of the song selected by the selected user 804.

In an embodiment, the P2P music recommendation service 806 monitors user interaction with the particular song within the playback window 810 to determine whether the requesting user 802 has heard the song. For instance, if the requesting user 802 initiates playback of the selected song and ceases playback after a short period of time (e.g., a few seconds, etc.), the P2P music recommendation service 806 may determine that the requesting user 802 is not interested in the particular song or otherwise does not find the song to be suited for the purpose described by the requesting user 802 in its music recommendation request. In some instances, the P2P music recommendation service 806 may evaluate the requesting user's profile to determine whether the requesting user 802 has been previously exposed to the selected song. For instance, if the P2P music recommendation service 806 determines that the requesting user 802 has previously heard the selected song, the requesting user's act of ceasing playback of the song after a short period of time or of skipping the selected song may be reviewed in this context, whereby prior feedback provided by the requesting user 802 with regard to the selected song may be used to determine whether the act of ceasing playback or skipping the song is indicative of a negative impression of the song or of a determination that the song has already been heard.

Once the P2P music recommendation service 806 determines that a particular song has been heard or that an action has been taken whereby the requesting user 802 has evaluated the song (e.g., ceased playback, skipped the song, etc.), the P2P music recommendation service 806 may indicate that the song has been heard by the requesting user 802. Based on the requesting user's response to the selected song, the P2P music recommendation service 806 may calculate a score for the selected user 804, which may be used to determine the quality of recommendations submitted by the selected user 804. For instance, based on feedback provided by the requesting user 802 and other requesting users in response to music recommendations provided by the selected user 804, the P2P music recommendation service 806 may calculate a score that is indicative of the quality of recommendations provided by the selected user 804. In an embodiment, the P2P music recommendation service 806 utilizes this score to determine whether the selected user 804 qualifies to become a tastemaker of the P2P music recommendation service 806, whereby the selected user 804 may be provided with public requests from users for music recommendations and songs shared by the selected user 804 are promoted to users of the P2P music recommendation service 806 that may be interested in these songs. For instance, if the recommendation score for a selected user 804 surpasses a minimum score threshold for qualifying as a tastemaker of the P2P music recommendation service 806, the P2P music recommendation service 806 may transmit a notification to the selected user 804 to indicate that the selected user 804 has qualified to become a tastemaker. The selected user 804, in response to the notification, may indicate whether to accept or reject the offer of the P2P music recommendation service 806 to assume the role of tastemaker. In some instances, the use of this score is contingent on the selected user 804 having submitted a minimum number of recommendations to different users of the P2P music recommendation service 806.

In addition to providing options for initiating playback of the selected song via the interface 812, the P2P music recommendation service 806 may provide the requesting user 802 with a save button 814, which the requesting user 802 may use to save the selected song in a playlist. For instance, if the requesting user 802 selects the save button 814, the P2P music recommendation service 806 may save the song to a playlist of the requesting user 802 maintained by the P2P music recommendation service 806. In some instances, if the song is being presented from a network location associated with another music service of which the requesting user 802 is a member, the P2P music recommendation service 806 may additionally, or alternatively, save the song on to a playlist maintained by the other music service. This playlist may be accessible to the P2P music recommendation service 806 via one or more APIs provided by the music service to the P2P music recommendation service 806 to enable interaction with a requesting user's profile maintained by the other music service.

The P2P music recommendation service 806 may further provide, via the interface 812, a summary of the music recommendation provided by a selected user 804 via a music recommendation window 808. Through the music recommendation window 808, various elements of a received music recommendation may be presented to the requesting user 802. For instance, for a given music recommendation, the music recommendation window 808 may be updated to present identifying information of the selected user 804 that submitted the music recommendation (e.g., username or actual name of the selected user 804, an image or icon representative of the selected user 804, etc.). Further, the P2P music recommendation service 806 may specify, via the music recommendation window 808, the number of music recommendations received (e.g., "1 of 2" as illustrated in FIG. 8, etc.) for the given music recommendation request. The P2P music recommendation service 806 may further present, to the requesting user 802, any comments submitted by the selected user 804 in its response to the music recommendation request. These comments may provide additional context with regard to the selected user's selection of the particular song being presented to the requesting user 802. Additionally, the P2P music recommendation service 806 may present to the requesting user 802 any tags associated with the selected song. These tags may be identical to those submitted by the requesting user 802 in its request. Alternatively, the tags may be specific to the selected song, as determined by the P2P music recommendation service 806 via evaluation of the song or by the selected user 804 in generating the response to the music recommendation request.

Figure 9:
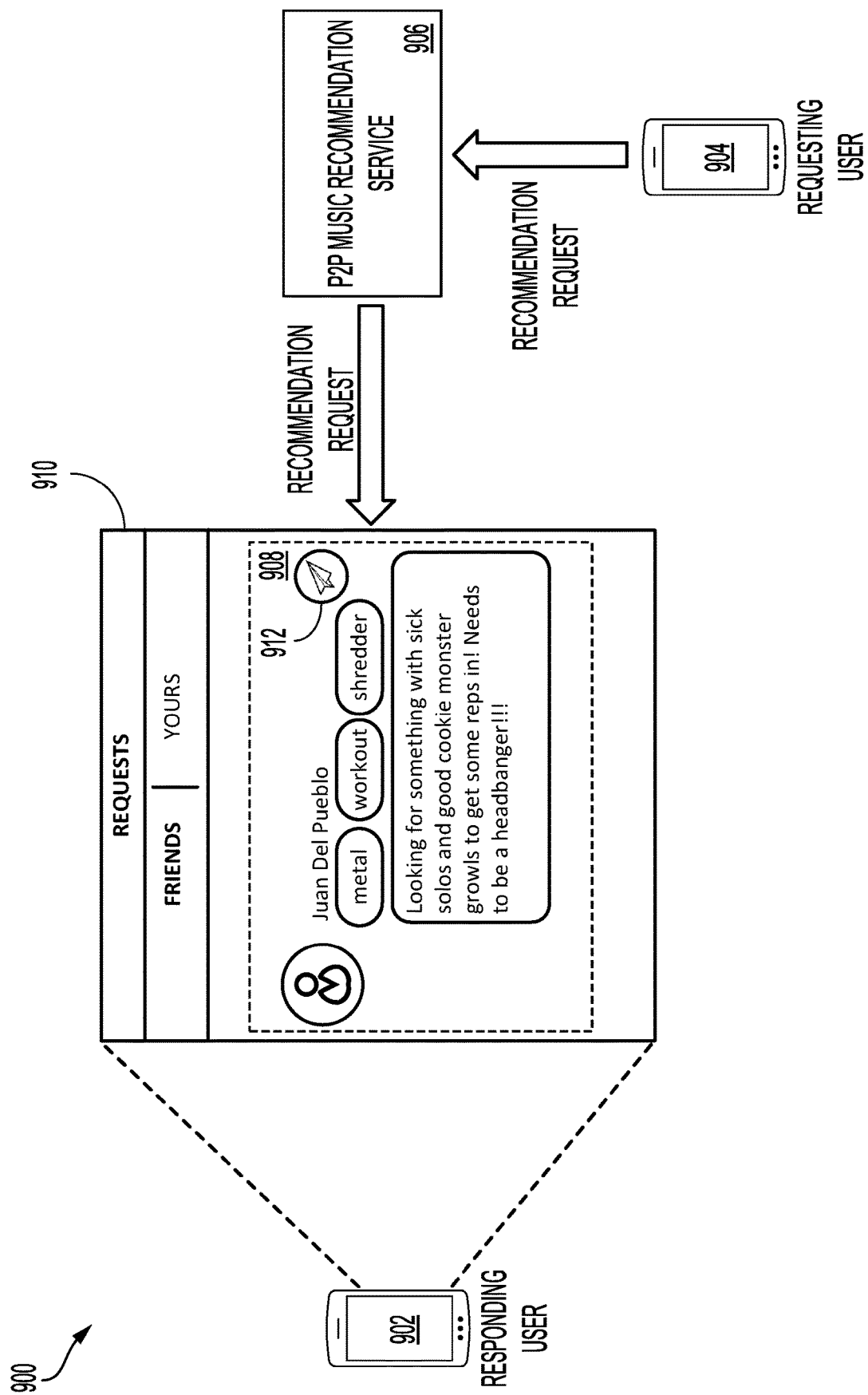
FIG. 9 shows an illustrative example of an environment in which a responding user, via an interface of the P2P music recommendation service, is presented with a music recommendation request from a requesting user in accordance with at least one embodiment.

FIG. 9 shows an illustrative example of an environment 900 in which a responding user 902, via an interface 910 of the P2P music recommendation service 906, is presented with a music recommendation request from a requesting user 904 in accordance with at least one embodiment. In the environment 900, the P2P music recommendation service 906 receives a music recommendation request from a requesting user 904. The requesting user 904 may specify one or more users that are to receive the music recommendation request in order to solicit, from these one or more users, a music recommendation. The music recommendation request submitted by the requesting user 904 may include various elements that may assist a responding user 902 to provide a music recommendation to the requesting user 904. For instance, the music recommendation request may specify one or more tags corresponding to the music recommendations that the requesting user 904 wishes to receive (e.g., tags selected by the requesting user 904, tags identified by the P2P music recommendation service 906 via evaluation of a provided comment, tags identified via evaluation of a sample song provided by the requesting user 904, etc.) and any optional comments provided by the requesting user 904 that may provide additional context with regard to the music recommendations that the requesting user 904 wishes to obtain. Additionally, the set of elements associated with the request may include identifying information of the requesting user 904 (e.g., username and/or actual name of the requesting user 904, image or icon representative of the requesting user 904, location of the requesting user 904, etc.).

In response to receiving the music recommendation request from the requesting user 904, the P2P music recommendation service 906 may evaluate the request to identify which users are to be provided with the request. For instance, the request may specify usernames or other identifying information of the users that are to receive the music recommendation request. Based on the usernames or other identifying information of users supplied in the request, the P2P music recommendation service 906 may transmit the music recommendation request to the specified users to solicit music recommendations from these selected users. In an embodiment, the P2P music recommendation service 906 transmits a notification to each of the selected users to indicate that a music recommendation request has been submitted to these users to solicit a music recommendation for the requesting user 904.

In an embodiment, to provide a submitted request to a responding user 902, the P2P music recommendation service 906 updates an interface 910 utilized by the responding user 902 to present the request from the requesting user 904. For instance, as illustrated in FIG. 9, via a received requests window 908 of the interface 910, the P2P music recommendation service 906 may provide the request submitted by the requesting user 904 to the responding user 902. Each request presented in the received requests window 908 may include various elements of the request. For instance, the presented request may include the one or more tags associated with the request, any comments provided by the requesting user 904 in the request, and identifying information of the requesting user 904 (e.g., username or actual name of the requesting user, an image or icon representative of the requesting user, and the like). Additionally, if the requesting user 904 submitted a sample song that is demonstrative of the type of music recommendations that it wishes to receive, the P2P music recommendation service 906 may provide an option, via the received requests window 908, for playback of the sample song. Further, information of the sample song may be presented via the received requests window 908 (e.g., song title, artist name, music genre, etc.).

In addition to providing the various elements associated with the received request, the P2P music recommendation service 906 provides, within the received requests window 908, a share button 912. The share button 912 may be selected by the responding user 902 to generate a response to the music recommendation request submitted by the requesting user 904. For instance, if the responding user 902 selects the share button 912 from the received requests window 908, the P2P music recommendation service 906 may update the interface 910 to provide the responding user 902 with various options that may be used to search for a song that may be used as a music recommendation responsive to the request and to evaluate responses to the music recommendation request provided by other users of the P2P music recommendation service 906.

Figure 10:
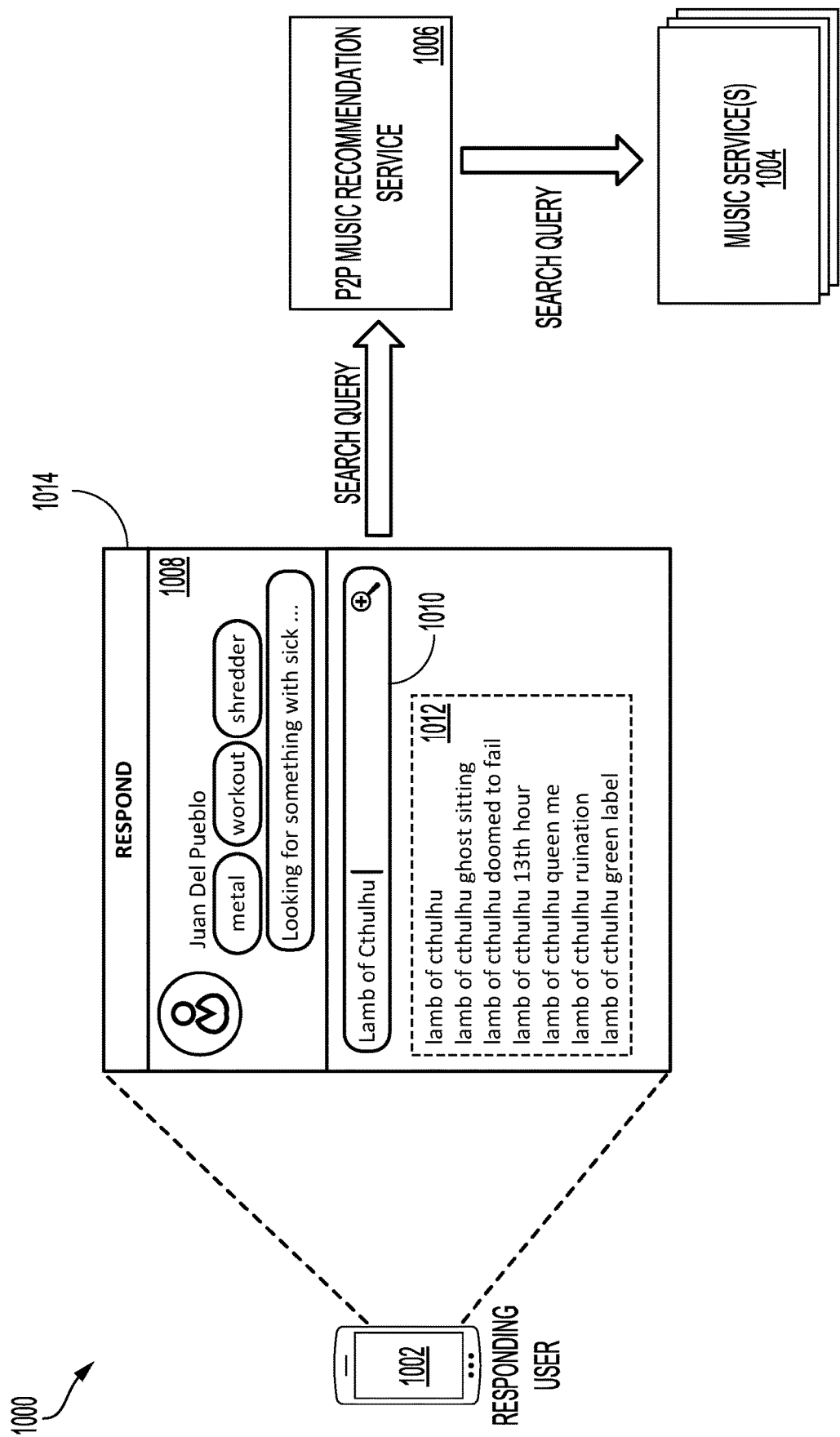
FIG. 10 shows an illustrative example of an environment in which a responding user, via an interface of the P2P music recommendation service, submits a search query for a particular song to one or more music services in accordance with at least one embodiment.

FIG. 10 shows an illustrative example of an environment 1000 in which a responding user 1002, via an interface 1008 of the P2P music recommendation service 1006, submits a search query for a particular song to one or more music services 1004 in accordance with at least one embodiment. In the environment 1000, the P2P music recommendation service 1006 updates the interface 1014 to provide a song query bar 1010 through which the responding user 1002 may input one or more search terms that may be used to identify one or more songs that may be used to generate a music recommendation for a requesting user. As the responding user 1002 enters these search terms into the song query bar 1010, the P2P music recommendation service 1006 may update an auto-completion window 1012 to provide various song search options based on the inputs provided by the responding user 1002. For instance, as the responding user 1002 enters a set of characters into the song query bar 1010, the P2P music recommendation service 1006 may process this set of characters using an auto-completion algorithm to predict which search terms the responding user 1002 is entering into the song query bar 1002 and provide these in the auto-completion window 1012. This algorithm may query a repository or database of known search terms to identify possible search terms that can be presented to the responding user 1002. This repository or database may include at least artist names, song titles, album titles, music genres, and the like.

In an embodiment, the repository or database of known search terms is populated based on search terms previously submitted by other users of the P2P music recommendation service 1006. For instance, using a machine learning algorithm or other artificial intelligence, the P2P music recommendation service 1006 may utilize a user's selection of a particular song for use in its music recommendation or for sharing with other users, along with the search terms submitted by the user, to associate these search terms with various elements of the selected song. Thus, if another user submits similar search terms, the likelihood that the P2P music recommendation service 1006 predicts the search terms that the responding user 1002 is providing in the song query bar 1010 may increase. As an illustrative example, if the responding user 1002 submits the search terms "Lamb of Cthulhu," the P2P music recommendation service 1006 may return, in the auto-completion window 1012, the search terms "lamb of cthulhu" as submitted by the responding user 1002 as well as other search terms that include the terms provided by the responding user 1002 and the names of songs and/or albums associated with the terms "lamb of cthulhu." This may assist the responding user 1002 in identifying the proper search terms for its query.

From the auto-completion window 1012, the responding user 1002 may select a set of search terms for its query. Selection of a set of search terms from the auto-completion window 1012 may cause the P2P music recommendation service 1006 to update the song query bar 1010 to include the selected set of search terms. Through the song query bar 1010, the responding user 1002 may submit its song query to the P2P music recommendation service 1006. In an embodiment, the P2P music recommendation service 1006 submits the provided query to one or more music services 1004 to identify songs maintained by these one or more music services 1004 that correspond to the submitted query. For instance, these music services 1004 may allow users to stream or playback various songs maintained by the music services 1004 for their subscribers or users. Thus, in response to the submitted query, the one or more music services 1004 may utilize the search terms of the query to identify any songs that correspond to the provided search terms.

In an embodiment, the P2P music recommendation service 1006 maintains a cache of previously submitted search terms and corresponding search results provided in response to these search terms. The P2P music recommendation service 1006 may query the cache using the search terms submitted by the responding user 1002 to determine whether a similar query was previously performed. If so, the P2P music recommendation service 1006 may provide the query results to the responding user 1002 without submitting the query to the one or more music services 1004.

In addition to the song query bar 1010 and the auto-completion window 1012, the P2P music recommendation service 1006 may provide, via the interface 1014, a request summary window 1008 through which the responding user 1002 may be presented with a summary of the music recommendation request submitted by the requesting user. The summary of the music recommendation request, as presented via the request summary window 1008, may include various elements of the received music recommendation request. For instance, the summary of the music recommendation request may include the one or more tags associated with the request, a truncated or abbreviated version of any comments provided by the requesting user in the request, and identifying information of the requesting user (e.g., username or actual name of the requesting user, an image or icon representative of the requesting user, and the like). Additionally, if the requesting user submitted a sample song that is demonstrative of the type of music recommendations that it wishes to receive, the P2P music recommendation service 1006 may provide an option, via the request summary window 1008, for playback of the sample song. Further, information of the sample song may be presented via the request summary window 1008 (e.g., song title, artist name, music genre, etc.).

Figure 11:
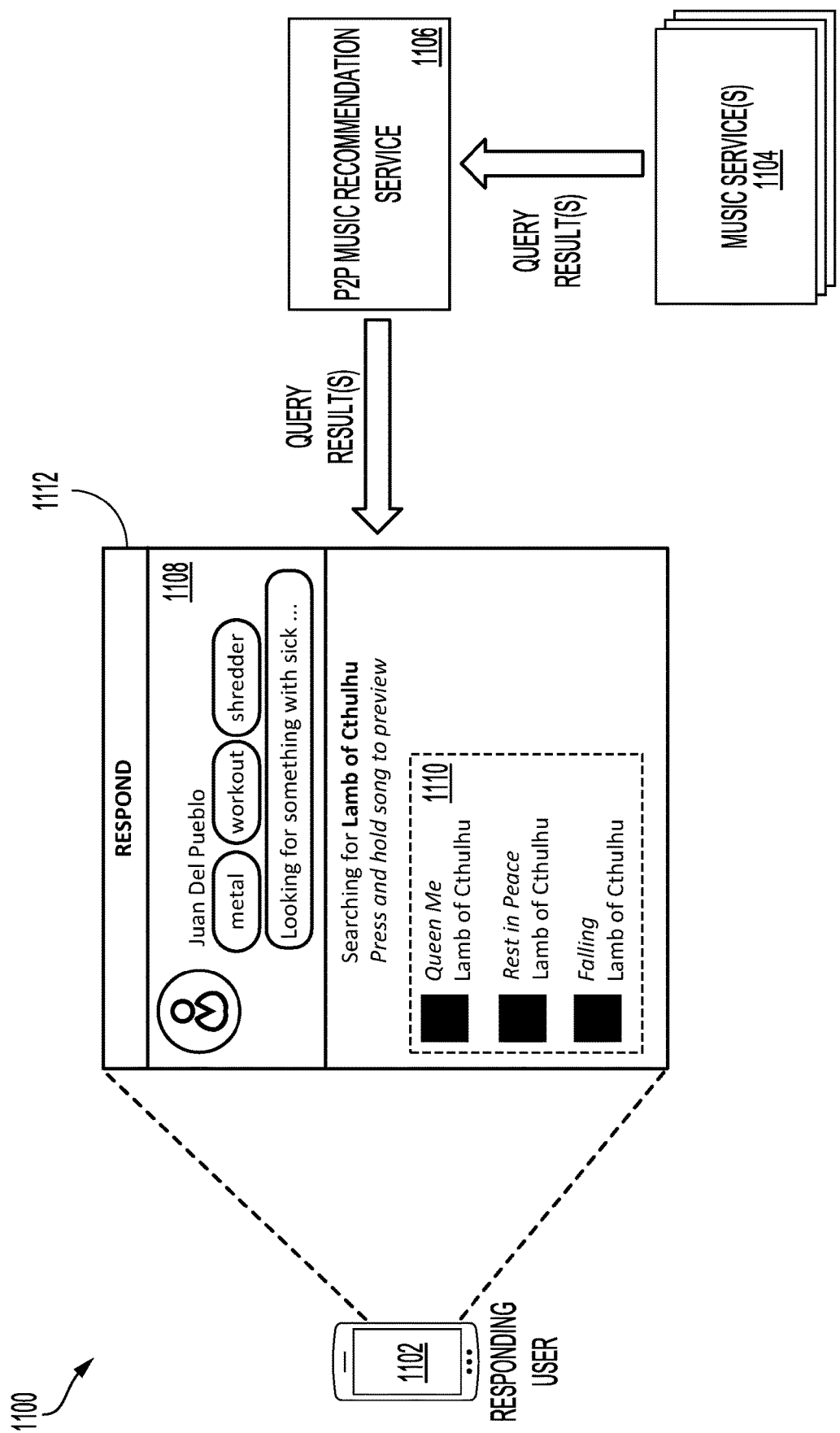
FIG. 11 shows an illustrative example of an environment in which a responding user, via an interface of the P2P music recommendation service, is presented with one or more songs for selection as a music recommendation in accordance with at least one embodiment.

FIG. 11 shows an illustrative example of an environment 1100 in which a responding user 1102, via an interface 1112 of the P2P music recommendation service 1106, is presented with one or more songs for selection as a music recommendation in accordance with at least one embodiment. In the environment 1100, the P2P music recommendation service 1106 updates the interface 1112 to present the responding user 1102 with a set of query results provided by one or more music services 1104 in response to the song query submitted by the responding user 1102. As noted above, a responding user 1102, via a song query bar provided by the P2P music recommendation service 1106, may submit a query to the P2P music recommendation service 1106 to identify one or more songs associated with the query. For instance, if the responding user 1102 submits a query for a particular artist, the P2P music recommendation service 1106 may respond to the query by providing a listing of songs associated with the particular artist. The query submitted by the responding user 1102 may be provided to one or more music services 1104, which may each maintain a variety of songs and may provide users with access to these songs (e.g., playback or streaming of songs, purchasing songs, etc.).

In response to a query to these one or more music services 1104 for songs associated with the search terms provided by the responding user 1102, the one or more music services 1104 may provide, to the P2P music recommendation service 1106, network addresses or other information corresponding to the songs maintained by the one or more music services 1104 that satisfy the query. For instance, if a responding user 1102 submits a query for songs associated with the search terms "In Flames," a music service may provide query results that include network addresses or other information corresponding to songs by the artist "In Flames," songs with the search terms "In Flames" in the title, and the like.

In an embodiment, the P2P music recommendation service 1106 maintains a cache or repository of songs previously identified from the one or more music services 1104 or otherwise maintained by the P2P music recommendation service 1106. For instance, in response to a set of query results from one or more music services 1104, the P2P music recommendation service 1106 may store these results, along with the parameters of the query (e.g., search terms, etc.), within the cache or repository. Thus, if a responding user 1102 submits a query for songs related to a set of search terms submitted in via the song query bar provided by the P2P music recommendation service 1106, the P2P music recommendation service 1106 may process the query using the cache or repository of songs to identify any relevant results in lieu or in addition to submitting the query to the one or more music services 1104.

In an embodiment, the P2P music recommendation service 1106 provides the query results to the responding user 1102 via a song results window 1110 of the interface 1112 provided by the P2P music recommendation service 1106. Each song result may include identifying information of the particular song. For instance, a song result may include the title of the corresponding song, the name of the artist that performed and/or produced the song, the music genre of the song, any cover art associated with the song, and the like. In an embodiment, the song result is presented in the form of a hyperlink or other link that may be used to access the song at a particular network location associated with the P2P music recommendation service 1106 or from the music service 1104 that provided the song result. This may allow the responding user 1102 to select, from the song results window 1110, a particular song and initiate playback of the song. For instance, if the requesting user 1102, using a cursor or touchscreen, presses and holds down a particular song result, the P2P music recommendation service 1106 may access the corresponding network location of the song and initiate playback of the song for the responding user 1102 via the interface 1112.

From the song results window 1110, the responding user 1102 may also select a particular song that is to be submitted as a music recommendation to a requesting user in response to its music recommendation request. For instance, if the responding user 1102 selects a particular song from the song results window 1110, the P2P music recommendation service 1106 may update the interface 1112 to provide a summary of the music recommendation that is to be provided to the requesting user, as described in greater detail in connection with FIG. 12. In some instances, the song results window 1110 may be provided with a song query bar that includes the search terms submitted by the responding user 1102. The responding user 1102 may update, at any time, the search terms within the song query bar to generate a new song query that may be provided to the P2P music recommendation service 1106. This may cause the P2P music recommendation service 1106 to identify, via its cache and/or other music services 1104, additional and/or alternative songs that may be associated with the terms specified in the song query bar. These additional and/or alternative songs may be presented to the responding user 1102 via the song results window 1110 in addition to, or in place of, the previously presented songs.

In addition to the song results window 1110, the P2P music recommendation service 1106 may retain the request summary window 1108 through which the responding user 1102 may be presented with a summary of the music recommendation request submitted by the requesting user. The summary of the music recommendation request, as presented via the request summary window 1108, may include various elements of the received music recommendation request. For instance, the summary of the music recommendation request may include the one or more tags associated with the request, a truncated or abbreviated version of any comments provided by the requesting user in the request, and identifying information of the requesting user (e.g., username or actual name of the requesting user, an image or icon representative of the requesting user, and the like). Additionally, if the requesting user submitted a sample song that is demonstrative of the type of music recommendations that it wishes to receive, the P2P music recommendation service 1106 may provide an option, via the request summary window 1108, for playback of the sample song. Further, information of the sample song may be presented via the request summary window 1108 (e.g., song title, artist name, music genre, etc.).

Figure 12:
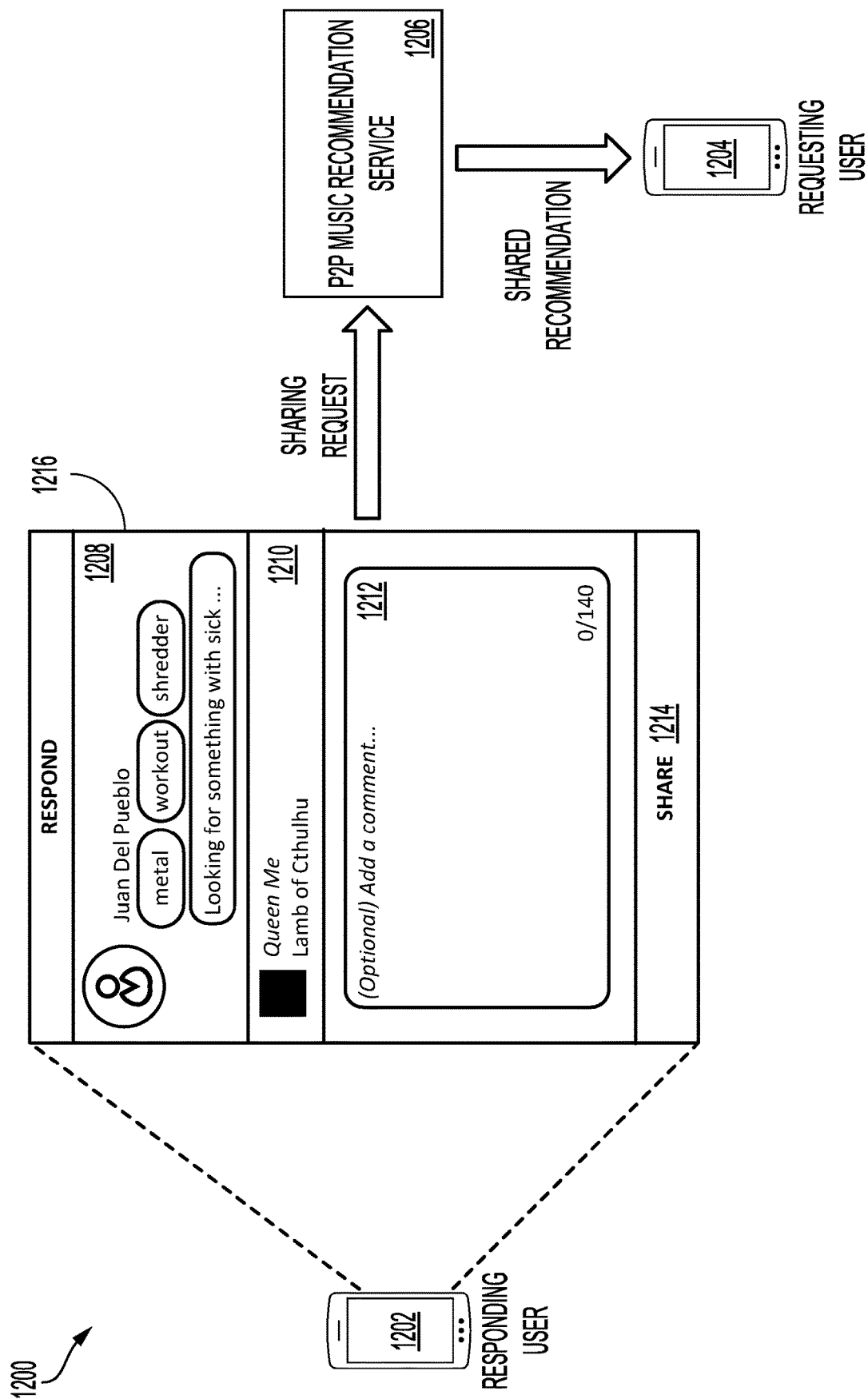
FIG. 12 shows an illustrative example of an environment in which a responding user, via an interface of the P2P music recommendation service, can provide a comment to supplement a music recommendation to be provided to a requesting user in accordance with at least one embodiment.

FIG. 12 shows an illustrative example of an environment 1200 in which a responding user 1202, via an interface 1216 of the P2P music recommendation service 1206, can provide a comment to supplement a music recommendation to be provided to a requesting user 1204 in accordance with at least one embodiment. In the environment 1200, the P2P music recommendation service 1206, in response to detecting selection of a song to be shared with a requesting user 1204 in response to its music recommendation request, updates the interface 1216 to provide the responding user 1202 with an option to provide any comments that may provide additional context with regard to the song selected by the responding user 1202. For instance, via the interface 1216, the P2P music recommendation service 1206 may provide an optional comment text window 1212, through which the responding user 1202 may submit an optional comment that is to be provided in addition to the selected song in the response to the music recommendation request from the requesting user 1204. The P2P music recommendation service 1206 may limit the number of characters that can be used in the optional comment (e.g., 140 characters, as illustrated in FIG. 12) in order to ensure that these optional comments are concise.

In an embodiment, if a responding user 1202 provides an optional comment via the optional comment text window 1212, the P2P music recommendation service 1206 may evaluate the optional comment to identify any additional tags that may be associated with the response. For instance, the P2P music recommendation service may process an optional comment provided in the optional comment text window 1212 using a machine learning algorithm or artificial intelligence (e.g., NLP), as described above, to identify one or more tags that may be germane to the response to be submitted by the responding user 1202. These identified tags may be presented to the responding user 1202 via the interface 1216, through which the responding user 1202 may determine whether to incorporate any of the identified tags into its music recommendation or omit these tags. These additional tags may provide further context to the selection of the song specified in the music recommendation provided by the responding user 1202. Further, the P2P music recommendation service 1206 may utilize these identified tags to update a song profile for the selected song, as well as one or more tag profiles associated with the identified tags.

In addition to providing a responding user 1202 with an option to provide a comment via the optional comment text window 1212, the P2P music recommendation service 1206 may provide, via the interface 1216, a summary of the music recommendation that is to be shared with a requesting user 1204. For instance, through the interface 1216, the P2P music recommendation service 1206 may provide a request summary window 1208 through which the responding user 1202 may be presented with a summary of the music recommendation request submitted by the requesting user 1204. The summary of the music recommendation request, as presented via the request summary window 1208, may include various elements of the received music recommendation request. For instance, as illustrated in FIG. 12, the summary of the music recommendation request may include the one or more tags associated with the request, a truncated or abbreviated version of any comments provided by the requesting user 1204 in the request, and identifying information of the requesting user 1204 (e.g., username or actual name of the requesting user 1204, an image or icon representative of the requesting user 1204, and the like. Additionally, if the requesting user 1204 submitted a sample song that is demonstrative of the type of music recommendations that it wishes to receive, the P2P music recommendation service 1206 may provide an option, via the request summary window 1208, for playback of the sample song. Further, information of the sample song may be presented via the request summary window 1208 (e.g., song title, artist name, music genre, etc.).

Further, via the interface 1216, the P2P music recommendation service 1206 may provide a summary of the song that is to be presented to the requesting user 1204 as part of the music recommendation. This summary may be provided via a song summary window 1210 of the interface 1216. Through the song summary window 1210, the P2P music recommendation service 1206 may present, to the responding user 1202, various elements of the song selected to serve as the music recommendation for the requesting user 1204. These elements may include the title of the selected song, the name of the artist behind the selected song, the music genre of the selected song, any available cover art for the album that includes the selected song, and the like. Further, the P2P music recommendation service 1206, via the song summary window 1210, may provide the responding user 1202 to initiate playback of the selected song. This may allow the responding user 1202 to evaluate the selected song to ensure that the correct song and/or version of the song was selected for the music recommendation.

The P2P music recommendation service 1206 may provide, via the interface 1216, an option to the responding user 1202 to submit the new music recommendation for delivery to the requesting user 1204. For instance, within the interface 1216, the P2P music recommendation service 1206 may provide the responding user 1202 with a share button 1214. Selection of the share button 1214 may cause the P2P music recommendation service 1206 to receive a sharing request from the responding user 1202 to share the music recommendation with the requesting user 1204. For instance, if the interface 1216 is presented on a device of the responding user 1202 via an application provided by the P2P music recommendation service 1206 or other application through which the responding user 1202 accesses the P2P music recommendation service 1206, the application may submit an API call to the P2P music recommendation service 1206 to provide the sharing request. This sharing request may specify the selected song, including any details associated with the song. Further, the sharing request may include identifying information of the requesting user 1204 and of the music recommendation request itself (e.g., request identifier, etc.).

In response to the sharing request, the P2P music recommendation service 1206 may transmit the music recommendation to the requesting user 1204. For instance, the P2P music recommendation service 1206 may update an interface of an application utilized by the requesting user 1204 to access the P2P music recommendation service 1206 to provide the music recommendation provided by the responding user 1202. In an embodiment, the music recommendation is further provided to other users that may have received the music recommendation request from the requesting user 1204. This may allow these other users to evaluate the provided music recommendation and supplement this recommendation if so desired. For instance, another user may provide feedback with regard to the music recommendation submitted by the responding user 1202. Further, these other users may be provided with an option to follow the responding user 1202 and obtain songs shared by the responding user 1202 in response to music recommendation requests or otherwise shared with its followers.

In an embodiment, the P2P music recommendation service 1206 provides the responding user 1202 with an option to generate dynamic music recommendations that may be automatically provided to a requesting user 1204 in the event that a music recommendation request submitted by the requesting user 1204 can be fulfilled by providing a dynamic music recommendation. As noted above, a music sharing processing sub-system of the P2P music recommendation service 1206 (e.g., music sharing processing sub-system 206, as described herein in connection with FIG. 2) may enable the responding user 1202 to assign one or more tags to a song that is to be shared with a requesting user 1204. These tags may be selected from a set of pre-defined tags generated by the P2P music recommendation service 1206. Alternatively, the responding user 1202 may define a unique set of tags for the song that is to be shared. In a similar process, a responding user 1202 can generate a set of dynamic music recommendations that may be shared automatically in response to requests from requesting users. For instance, for a particular song, the responding user 1202 may add one or more pre-defined tags and/or unique tags to the song in addition to those already defined for the song (e.g., tags assigned by other users, tags assigned automatically by the P2P music recommendation service 1206, etc.). Further, the responding user 1202 may add a comment to the particular song to provide some additional context with regard to the responding user's definition of the dynamic music recommendation. In an embodiment, the P2P music recommendation service 1206 may evaluate the comment to identify any additional tags that may be associated with the dynamic music recommendation. For instance, the P2P music recommendation service 1206 may process the comment using a machine learning algorithm or artificial intelligence (e.g., NLP), as described above, to identify one or more tags that may be germane to the dynamic music recommendation. These one or more tags may be presented to the responding user 1202 such that the responding user 1202 may determine whether any of these presented tags may be associated with the song and the dynamic music recommendation.

The creation of dynamic music recommendations may be performed absent a request for music recommendations or to share music with other users. For instance, a user of the P2P music recommendation service 1206 may submit a request to the P2P music recommendation service 1206 at any time to generate a new dynamic music recommendation. The dynamic music recommendation may remain private, whereby only the user may review the dynamic music recommendation, until a relevant music recommendation request is received. For example, any dynamic music recommendations generated by the user may only be viewable by the user until the user explicitly requests that the dynamic music recommendation is to be shared with one or more other users and/or is automatically shared in response to relevant music recommendation requests received by the user.

In an embodiment, the P2P music recommendation service 1206 can automatically determine whether any dynamic music recommendations generated by the user can be used to fulfill a received music recommendation request. For example, in response to a received music recommendation request from a requesting user 1204, the P2P music recommendation service 1206 may automatically review the received music recommendation request to identify the one or more tags associated with the request and any comments provided by the requesting user 1204 in the request. The P2P music recommendation service 1206 may automatically determine whether any of the user's dynamic music recommendations correspond to the one or more tags and/or the comments provided by the requesting user 1204 in its music recommendation request. If so, the P2P music recommendation service 1206 may present the identified dynamic music recommendations to the user in order to allow the user to review these identified dynamic music recommendations and determine whether any of these dynamic music recommendations may be provided in response to the request. If the user selects one or more of these dynamic music recommendations for sharing with a requesting user 1204 in response to the music recommendation request, the P2P music recommendation service 1206 may transmit the music recommendation to the requesting user 1204 and to other users that may have received the music recommendation request from the requesting user 1204.

In some instances, the P2P music recommendation service 1206 can automatically provide any identified dynamic music recommendations to the requesting user 1204 in response to the music recommendation request without need for review by the user that generated the dynamic music recommendations. For instance, the user may maintain the dynamic music recommendations in a queue, whereby if the P2P music recommendation service 1206 determines that a particular dynamic music recommendation may be shared to fulfill the music recommendation request, the P2P music recommendation service 1206 may automatically retrieve this dynamic music recommendation from the queue and share the dynamic music recommendation with the requesting user 1204.

Figure 13:
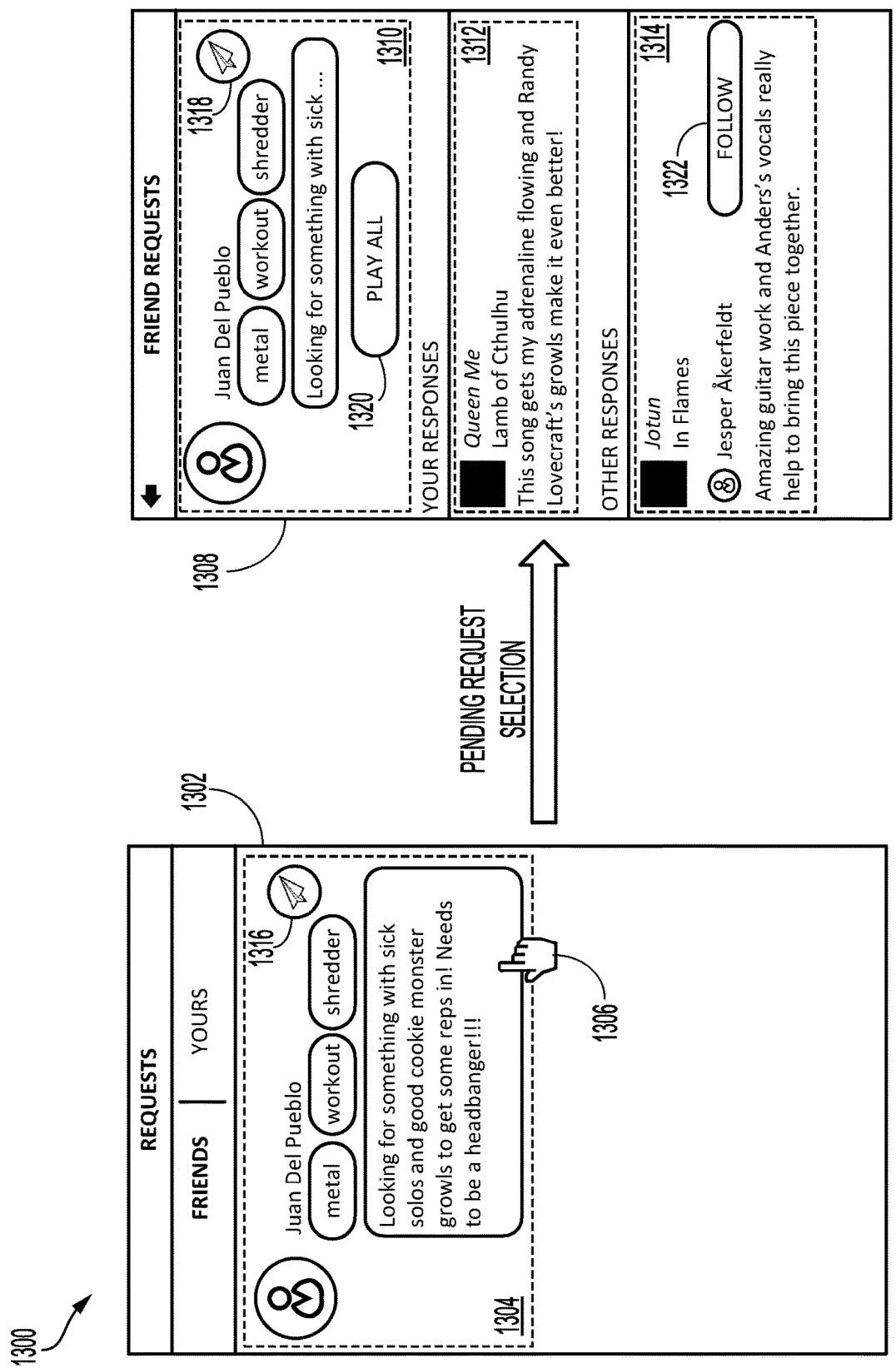
FIG. 13 shows an illustrative example of an environment in which a responding user, via an interface of the P2P music recommendation service, is presented with other responses to a music recommendation request submitted by a requesting user in accordance with at least one embodiment.

FIG. 13 shows an illustrative example of an environment 1300 in which a responding user, via an interface 1308 of the P2P music recommendation service, is presented with other responses to a music recommendation request submitted by a requesting user in accordance with at least one embodiment. In the environment 1300, a responding user, via an interface 1302 provided by the P2P music recommendation service, can evaluate any music recommendation requests received from other users of the P2P music recommendation service. For instance, the interface 1302 may include a received requests window 1304, through which a responding user may be presented with the one or more requests provided to the requesting user from other users of the P2P music recommendation service to solicit a music recommendation from the requesting user.

Each request specified in the received requests window 1304 may include a set of elements associated with the request. For instance, as illustrated in FIG. 13, the presentation of a received request within the received requests window 1304 may include the one or more tags associated with the request (e.g., tags selected by the requesting user, tags identified by the P2P music recommendation service via evaluation of a provided comment, tags identified via evaluation of a sample song provided by the requesting user, etc.) and any optional comments provided by the requesting user that may provide additional context with regard to the music recommendations that the requesting user wishes to obtain. Additionally, the set of elements associated with the request may include identifying information of the requesting user (e.g., username and/or actual name of the requesting user, image or icon representative of the requesting user, location of the requesting user, etc.). The presentation of the received request may further include a share button 1316. Selection of the share button 1316 may cause the P2P music recommendation service to update the interface 1302 to present the responding user with options for generating a response to the request (e.g., selecting a song to share, etc.). The updated interface for generating a response to the request is described above in connection with FIGS. 10-12.

In an embodiment, the P2P music recommendation service enables a responding user to interact with a received music recommendation request to present the responding user with previously submitted responses to the request, as well as any other responses submitted by other users of the P2P music recommendation service. For instance, if the P2P music recommendation service detects user interaction with a request within the received requests window 1304 (e.g., the responding user utilizes a cursor 1306, touches an element of the request via touchscreen, etc.), the P2P music recommendation service may present a new interface 1308 that provides additional detail with regard to the received request. Through this interface 1308, a responding user may be presented with a request summary window 1310, which may include a set of elements of the selected request (e.g., the one or more tags associated with the request, a truncated or summarized version of the comments submitted by the requesting user, identifying information of the requesting user, etc.). Further, through the request summary window 1310, the responding user may be presented with a share button 1318, which may be selected to generate a response to the received request. Additionally, the request summary window 1310 may include a play all button 1320, which, if selected, may cause the P2P music recommendation service to initiate playback of songs (e.g., music recommendations) submitted in response to the request by the responding user and by other users that may have received the music recommendation request and have submitted music recommendations in response to the request.

In addition to the request summary window 1310, the P2P music recommendation service may present, via the interface 1308, a submitted responses window 1312, through which the P2P music recommendation service may present any responses previously submitted by the responding user in response to the music recommendation request. For instance, a response presented in the submitted responses window 1312 may include a set of elements of the song recommended by the responding user (e.g., song title, artist name, cover art, music genre, release date, etc.), as well as any comments provided by the responding user in its response to the music recommendation request. Through the submitted responses window 1312, the responding user may play back the selected song, make edits to the response (e.g., change the recommended song, remove the response, provide additional comments, etc.) that can be transmitted to the requesting user, and the like.

Through the interface 1308, the P2P music recommendation service may further present an other responses window 1314, through which responses submitted by other users to the music recommendation request may be presented to the responding user. Each response presented within the other responses window 1314 may include various elements. For instance, a response presented in the other responses window 1314 may include elements of the song recommended by the other user (e.g., song title, artist name, cover art, music genre, release date, etc.), as well as any comments provided by the other user in its response to the music recommendation request. Additionally, the response may include identifying information of the other user that submitted the response. This may include the username and/or actual name of the other user, an image or icon representative of the other user, the location of the other user, and the like. The P2P music recommendation service may further provide, in the other responses window 1314, a follow button 1322, through which a responding user may opt to follow the other user that submitted the response and obtain music recommendations or other shared music from the other user.

Figure 14:
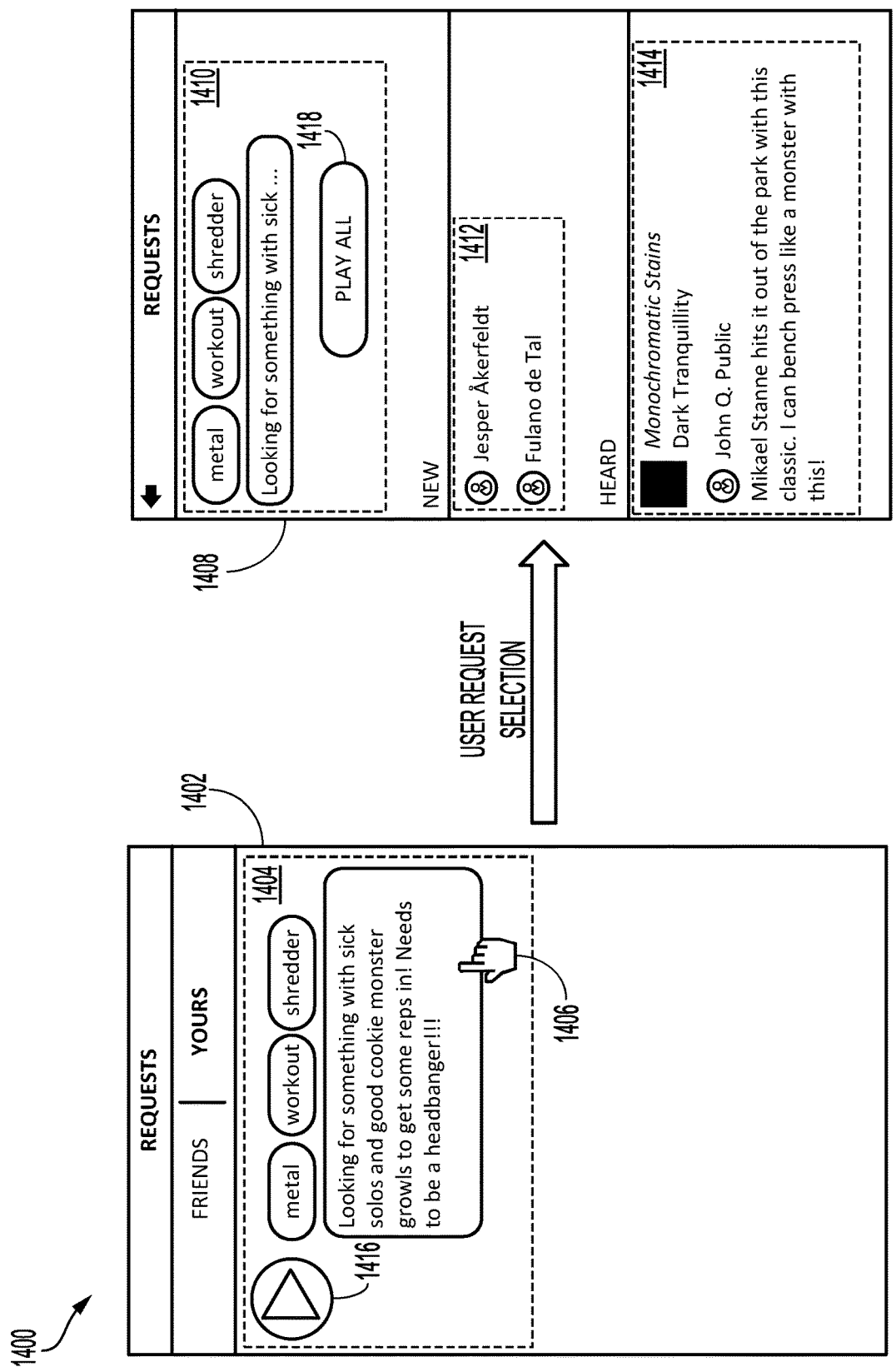
FIG. 14 shows an illustrative example of an environment in which a requesting user, via an interface of the P2P music recommendation service, is presented with newly obtained music recommendations and previously reviewed music recommendations in accordance with at least one embodiment.

FIG. 14 shows an illustrative example of an environment 1400 in which a requesting user, via an interface 1402 of the P2P music recommendation service, is presented with newly obtained music recommendations and previously reviewed music recommendations in accordance with at least one embodiment. In the environment 1400, a requesting user, via an interface 1402 provided by the P2P music recommendation service, can evaluate any music recommendation requests that the requesting user has submitted to the P2P music recommendation service. The music recommendation request may be presented via the interface 1402 within a requests window 1404 of the interface 1402. Within the requests window 1404, the requesting user may be presented with various elements of each of the submitted requests. For instance, as illustrated in FIG. 14, a request presented within the requests window 1404 may include the one or more tags associated with the request and any optional comments supplied by the requesting user in its music recommendation request.

In some instances, the requests window 1404 may include additional elements associated with the request. For example, if the requesting user has selected one or more songs that are representative of the style of music that the requesting user is looking for in a recommendation, the requests window 1404 may include a listing or other representation (e.g., cover art, song title, etc.) of the selected one or more songs. The requests window 1404 may further include, for each request presented therein, a play button 1416 that may be used by the requesting user to play any received songs shared with the requesting user by other users in response to the music recommendation request. Selection of the play button 1416 may cause the P2P music recommendation service to generate a playlist that includes the songs obtained from other users of the P2P music recommendation service in response to the music recommendation request. In some instances, selection of the play button 1416 may cause the P2P music recommendation service to present, via the interface 1402, a media player or other application through which the received songs may be presented to the requesting user.

In an embodiment, the requesting user may select the request within the requests window 1404 to cause the P2P music recommendation service to provide additional detail regarding responses received from other users. For instance, using a cursor 1406 or through any other interaction with any of the elements of a request within the requests window 1404, the requesting user may submit a request to the P2P music recommendation service to present an updated interface 1408 that includes any responses to the selected music recommendation requests. In response to the request (e.g., detection of user interaction with an element of a request in the requests window 1404, etc.), the P2P music recommendation service may provide the updated interface 1408 to the user.

The updated interface 1408 may include various elements associated with the music recommendation request and the responses to the request received from other users. For instance, the updated interface 1408 may include a request summary window 1410 that includes one or more elements associated with the selected request. For instance, the request summary window 1410 may include the one or more tags associated with the request and a truncated version of any optional comments provided by the requesting user in its request. The request summary window 1410 may further include a play all button 1418, which may serve a similar purpose to the play button 1416 described above. For instance, selection of the play all button 1418 may cause the P2P music recommendation service to initiate playback of songs obtained from other users of the P2P music recommendation service in response to the music recommendation request.

The updated interface 1408 may further include a new responses window 1412, through which any new responses to the requesting user's music recommendation request may be presented. For example, as illustrated in FIG. 14, the new responses window 1412 may include the names of users that have supplied responses to the music recommendation request. Interaction with a name within the new responses window 1412 may cause the P2P music recommendation service to present the response generated by the selected user within the updated interface 1408. Presentation of the response may include displaying information associated with the song selected by the responding user (e.g., song title, artist name, cover art, song duration, song genre, etc.) as well as any comments provided by the responding user with regard to the recommended song. The requesting user may select the provided song to initiate playback of the song. In some instances, the P2P music recommendation service provides the requesting user with an option to provide feedback with regard to a recommended song. For instance, through the updated interface 1408, the requesting user may specify whether the song is relevant to the music recommendation, whether the user enjoyed the song (e.g., a song rating, etc.), and the like. Further, the P2P music recommendation service may allow the requesting user to save the song to the requesting user's collection, share the song with other users, add the song to an existing playlist maintained by the P2P music recommendation service or other linked music service, and the like. Once a user has interacted with a particular response (e.g., has listened to the provided song, has dismissed the song, etc.), the P2P music recommendation service may update the new responses window 1412 to remove the name of the user that provided the response. Further, the response provided by the user may be added to a heard responses window 1414.

The heard responses window 1414 may include any responses to the music recommendation request that the requesting user has interacted with from the new responses window 1412. A response presented in the heard responses window 1414 may include various elements. For instance, as illustrated in FIG. 14, a response presented in the heard responses window 1414 may include the name and artist of the song provided in the response, along with any additional information regarding the song (e.g., cover art, song genre, etc.). Further, the response may include information about the responding user (e.g., the name of the responding user, an image or icon representing the responding user, etc.) and any comments provided by the responding user in response to the music recommendation request. In some instances, a response provided within the heard responses window 1414 may include any feedback provided by the requesting user, such as a score assigned to the provided song, comments regarding the provided song, whether the song has been saved to a requesting user's playlist, and the like.

Figure 15:
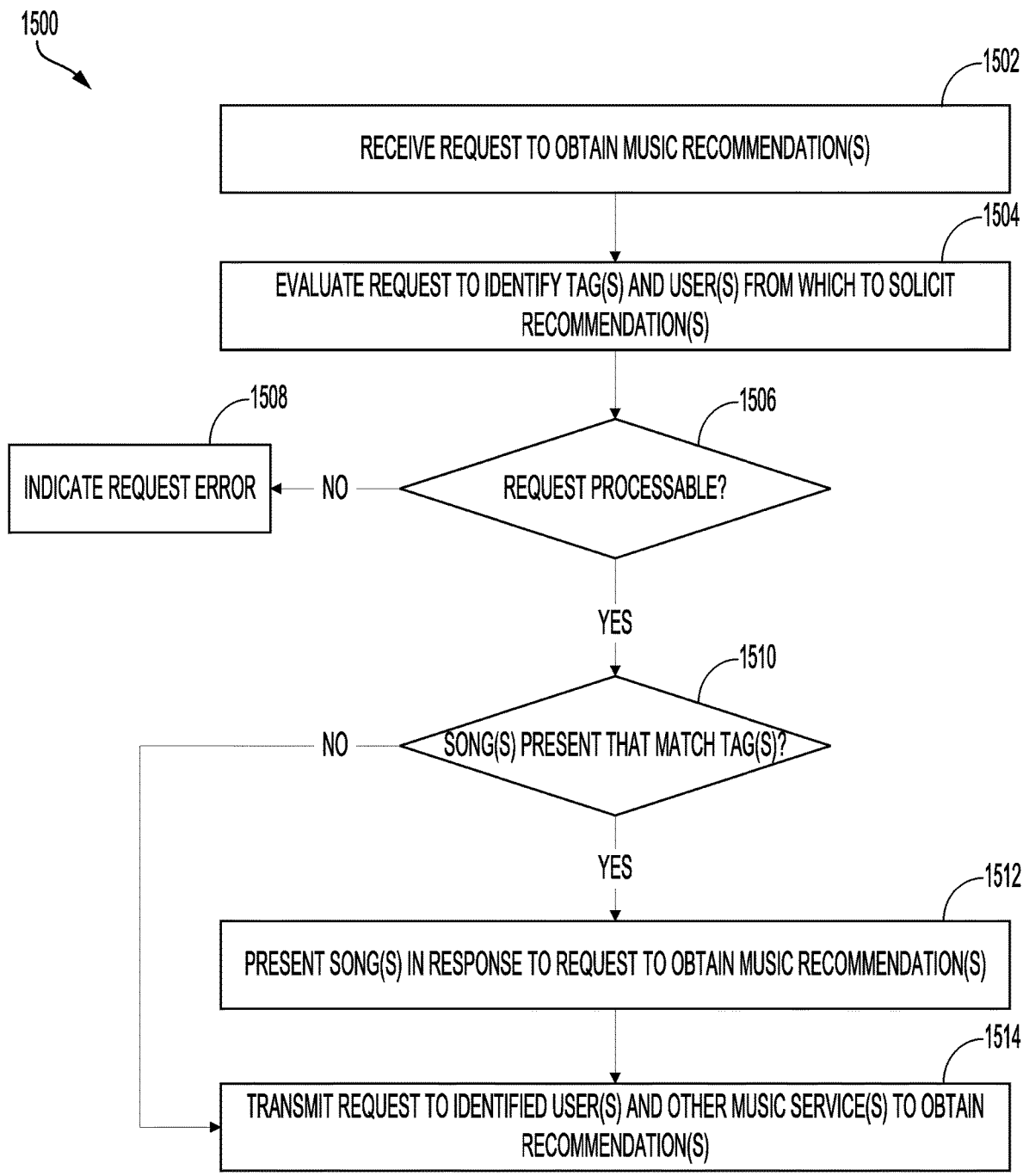
FIG. 15 shows an illustrative example of a process for generating a music recommendation request that is to be transmitted to one or more identified users and music services in order to obtain music recommendations in accordance with at least one embodiment.

FIG. 15 shows an illustrative example of a process 1500 for generating a music recommendation request that is to be transmitted to one or more identified users and music services in order to obtain music recommendations in accordance with at least one embodiment. The process 1500 may be performed by the P2P music recommendation service, which may provide, to users of the P2P music recommendation service, an interface through which these users may define a music recommendation request and select which other users and/or music services are to receive the music recommendation request. Further, the P2P music recommendation service may access a requesting user's profile to identify any songs saved by the requesting user (e.g., shared to the requesting user by other users of the P2P music recommendation service, shared by the requesting user to other users of the P2P music recommendation service, imported from one or more playlists maintained by another music service, etc.).

At step 1502, the P2P music recommendation service receives a request from a requesting user to obtain a set of music recommendations from one or more other users of the P2P music recommendation service and/or from other music services. As noted above, the P2P music recommendation service may provide users with an interface through which these users may define and submit a request to obtain music recommendations. For instance, through the interface, a user may specify one or more tags that may collectively serve as a taste profile for selection of music that may be of interest to the requesting user. Through the interface, the requesting user may query the P2P music recommendation service to identify the one or more tags that are to be included in the request. For instance, as illustrated in FIG. 4, the P2P music recommendation service may provide a tag query bar through which the requesting user may submit queries for particular tags to be included in the request. Further, through the interface, the P2P music recommendation service may provide sample tags that may be of interest to the requesting user, related to prior requests submitted by the requesting user for music recommendations, related to music previously shared by the requesting user to other users, and the like. In an embodiment, the P2P music recommendation service further allows users to select negative tags, which may serve as an indication of what music a requesting user is not interested in.

In an embodiment, the P2P music recommendation service provides users, via the interface, with an option to provide additional comments to a music recommendation request. This option may allow users to provide additional context with regard to the types of music the users may be interested in as part of the request. In some instances, if a requesting user provides a comment via this option, the P2P music recommendation service may evaluate the comment to identify one or more tags that may be relevant to the music recommendation request. For example, the P2P music recommendation service may process an obtained comment using a machine learning algorithm or artificial intelligence, as described above, to identify one or more tags that may be germane to the submitted comment. These identified tags may be presented to the user via the interface, through which the user may determine whether to incorporate any of the identified tags into its music recommendation request or omit these tags.

In addition to providing one or more tags and optional comments in its request, a requesting user may further identify one or more users and other music services that are to be provided with the music recommendation request in order to solicit music recommendations from these one or more users and other music services. For instance, as illustrated in FIG. 6, the P2P music recommendation service, via the interface provided to the requesting user, may present the requesting user with a list of followers (e.g., other users) to which the requesting user may provide the music recommendation request to. Further, the P2P music recommendation service may allow requesting users to solicit different tastemakers for their music recommendations. Tastemakers may be other users of the P2P music recommendation service that have been identified as having provided favorable music recommendations as indicated through feedback of users of the P2P music recommendation service. The tastemakers presented to the requesting user via the interface may be selected based on the tags selected by the requesting user. Alternatively, the tastemakers presented to the requesting user may be selected based on prior interactions between the requesting users and these tastemakers or other criteria (e.g., location, time of day, etc.).

In an embodiment, the requesting user can define in the music recommendation request artists and/or songs that represent the type of music that the requesting user is interested in. For instance, through the interface, the P2P music recommendation service may allow a requesting user to submit a query for a particular song that represents the type of music that the requesting user is interested in. In response to a query for a particular song, the P2P music recommendation service may submit the query to one or more other music services to identify network locations of songs that correspond to the submitted query and obtain information corresponding to these songs. This information (e.g., query results) may be presented to the requesting user via the interface, through which the requesting user may sample and select a particular song that represents the type of music that the requesting user is interested in. The network location of the song may be added to the music recommendation request, through which responding users may access the song.

At step 1504, the P2P music recommendation service evaluates the submitted music recommendation request to identify the one or more tags and one or more users from which to solicit music recommendations from. For instance, the P2P music recommendation service may determine whether the submitted music recommendation request specifies one or more tags to be presented to responding users in order to solicit music recommendations from these responding users. If the request does not specify any tags, the P2P music recommendation service may determine whether the requesting user has provided one or more comments related to its request. As noted above, the P2P music recommendation service may process these one or more comments to identify one or more tags that may be relevant to the request. If the requesting user has not submitted any tags but has provided one or more comments related to the request, the P2P music recommendation service may supplement the request with tags identified via evaluation of the one or more comments.

In addition to evaluating the request to identify the one or more tags that are to be presented to responding users, the P2P music recommendation service may evaluate the request to identify the users to which the request is to be transmitted. For instance, the music recommendation request may specify one or more responding users selected by the requesting user via the interface provided by the P2P music recommendation service. In some instances, in lieu of specifying one or more responding users, the request may specify one or more tastemakers that may be solicited to obtain music recommendations for the requesting user.

At step 1506, the P2P music recommendation service determines, based on its evaluation of the received request, whether the music recommendation request can be processed. For instance, if the P2P music recommendation service determines that the requesting user has not provided one or more tags in its request and has also not provided any optional comments from which tags may be identified, the P2P music recommendation service may determine that the request cannot be processed. Similarly, if the music recommendation request does not specify one or more users and tastemakers to which the request is to be provided, the P2P music recommendation service may determine that the request cannot be processed.

At step 1508, if the P2P music recommendation service determines that the music recommendation request cannot be processed, the P2P music recommendation service indicates, to the requesting user, a request error. For instance, if the request cannot be processed due to a lack of tags and comments that may be used to identify a set of tags for the request, the P2P music recommendation service may present to the requesting user, via the interface, an error message indicating that the request could not be processed as a result of the request missing tags and comments usable to identify tags that could be associated with the request. The requesting user may be afforded an opportunity to revise the request to incorporate one or more tags and/or to provide one or more comments that can be used to identify a set of tags that can be incorporated into the request. Similarly, if the P2P music recommendation service determines that the request cannot be processed as a result of the requesting user having failed to identify one or more users and/or tastemakers in the request, the P2P music recommendation service may present the requesting user with an error message indicating that the request lacks identified users to which the request is to be provided. In some instances, the requesting user may be subject to a request rate limit, whereby the requesting user may be authorized to submit a limited number of requests over a particular time period. If the P2P music recommendation service determines that the requesting user has reached this limit, the P2P music recommendation service may indicate that the music recommendation service cannot be processed until a particular period of time has elapsed from a previously processed request. Thus, the requesting user may be invited to resubmit the music recommendation request at a later time.

If the P2P music recommendation service determines that the music recommendation request submitted by the requesting user can be processed, the P2P music recommendation service, at step 1510, determines whether there are any songs present in the requesting user's profile that match the one or more tags specified in the request. For instance, the requesting user's profile may include one or more saved songs obtained from other users of the P2P music recommendation service. Further, the requesting user's profile may include one or more songs previously shared with other users of the P2P music recommendation service. If the requesting user has linked its user profile with another music service, the P2P music recommendation service may identify songs that the requesting user has interacted with via the other music service (e.g., via playlists maintained by the other music service, previously heard songs via the other music service, etc.).

In an embodiment, for each identified song associated with the requesting user's profile, the P2P music recommendation service identifies one or more tags associated with the song. For instance, the P2P music recommendation service may query a song profile database to determine whether there exists a song profile for the identified song. A song profile may specify one or more tags that are associated with the song, as determined by the P2P music recommendation service via evaluation of music sharing and music recommendation requests submitted by users of the P2P music recommendation service over time. If the P2P music recommendation service is unable to identify a song profile for the identified song, the P2P music recommendation service may query an artist profile database to determine whether there exists an artist profile for the artist that performed and/or produced the identified song. Similar to a song profile, an artist profile may specify one or more tags that are associated with the artist. In some instances, if there is no song or artist profile associated with a particular song, the P2P music recommendation service may analyze the song to determine a set of characteristics of the song that can be used to identify a set of tags that may be relevant to the song. For example, the P2P music recommendation service may utilize one or more music recognition algorithms or artificial intelligence to identify a set of features of the particular song. These features may include the name of the song, the name of the artist, the genre or style of music, and the like. Based on these features, the P2P music recommendation service may identify one or more tags that may be pertinent to the particular song.

Based on the tags associated with a particular song specified in the requesting user's profile, the P2P music recommendation service may determine whether the particular song is relevant to the music recommendation request submitted by the requesting user. For example, the P2P music recommendation service may determine whether the tags associated with the particular song are identical or similar to the tags associated with the music recommendation request. If so, the P2P music recommendation service may determine that the particular song referenced in the requesting user's profile may be relevant to the current request. In an embodiment, the P2P music recommendation service scores each identified song from the requesting user's profile in order to determine whether an existing song associated with the requesting user's profile is relevant to the newly obtained request. For instance, an existing song may be assigned a higher score if the tags associated with the song are similar or identical to those in the newly obtained request. Similarly, an existing song may be assigned a higher score if the artist is associated with one or more tags that are similar or identical to the tags specified in the newly obtained request. Thus, a composite score based on these factors may be computed by the P2P music recommendation service to determine the relevance of an existing song present in the requesting user's profile to the newly obtained request. In some instances, the P2P music recommendation service may determine whether the score for a particular song exceeds a minimum relevancy score threshold. If the P2P music recommendation service determines that the score for an existing song exceeds the minimum relevancy score threshold, the P2P music recommendation service may determine that the song is relevant to the newly obtained request. It should be noted that the factors described above are illustrative and additional and/or alternative factors may be considered in computing a composite score for a particular song (e.g., feedback from other users with regard to the song for different music recommendation requests, interaction with the song by the requesting user and other users, sharing of the song with other users in response to requests with similar or identical tags, etc.).

If the P2P music recommendation service determines that one or more existing songs saved to the requesting user's profile are associated with similar or identical tags to those specified in the request, the P2P music recommendation service, at step 1512, presents these songs to the requesting user in response to the request. For instance, the P2P music recommendation service may update the interface utilized by the requesting user and associated with the newly submitted request to present the one or more existing songs that may be relevant to the request. From the interface, the requesting user may interact with any of the one or more existing songs presented to determine whether any of the one or more existing songs satisfy the user's request for a music recommendation. In some instances, the requesting user may select any of the presented songs to be included in the request to be transmitted to the one or more specified users and tastemakers. These songs may serve as a representation of what the requesting user is looking for in response to its music recommendation request. Thus, a user receiving the request may be able to evaluate the tags specified in the request and any included songs in order to formulate a response.

In addition to presenting any saved or existing songs the requesting user may have interacted with via the P2P music recommendation service, or if no songs were identified, the P2P music recommendation service, at step 1514, transmit the music recommendation request to the one or more users, tastemakers, and/or music services specified in the request. The music recommendation request may be presented to the selected users and/or tastemakers via an interface of the P2P music recommendation service utilized by these users and/or tastemakers. For instance, as illustrated in FIG. 9, a user receiving a music recommendation request may be presented, via the interface, with various elements of the music recommendation request. These elements may include user information of the requesting user (e.g., actual name, username, user image or icon, location, etc.), the time at which the request was received, the one or more tags associated with the request, any optional comments submitted by the requesting user, any songs the requesting user has identified as being relevant to the request, and the like. The responding user may utilize the interface to interact with the request and generate a music recommendation that can be provided to the requesting user.

Figure 16:
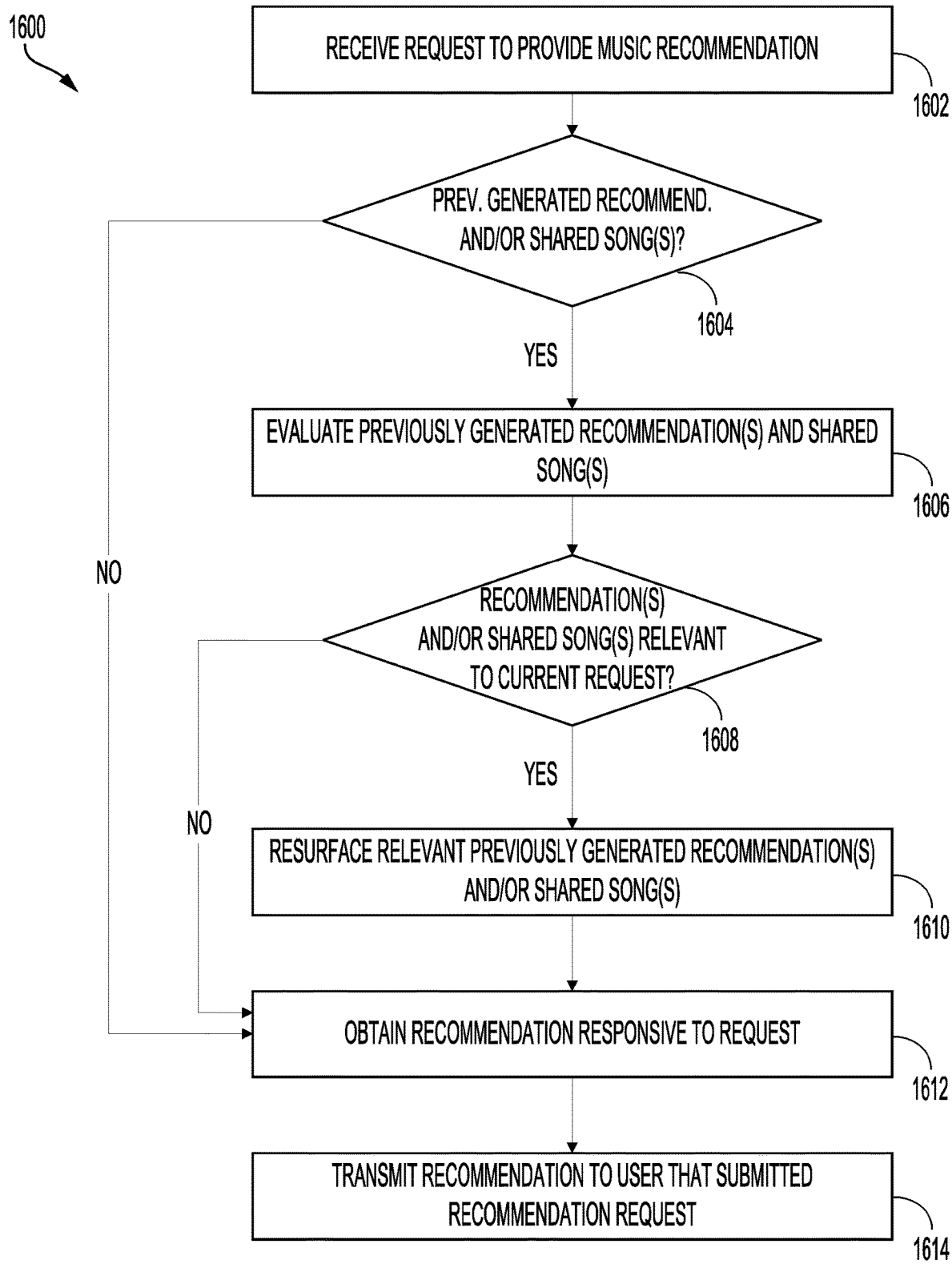
FIG. 16 shows an illustrative example of a process for generating and providing a music recommendation to a requesting user in response to a music recommendation request in accordance with at least one embodiment.

FIG. 16 shows an illustrative example of a process 1600 for generating and providing a music recommendation to a requesting user in response to a music recommendation request in accordance with at least one embodiment. The process 1600 may be performed by a P2P music recommendation service, which may evaluate a requesting user's profile to identify any previously generated recommendations that may be relevant to the music recommendation request. Further, the P2P music recommendation service may provide, to the responding user via an interface, various options for generating a music recommendation that can be provided to the requesting user in response to the music recommendation request. For instance, the P2P music recommendation service, via the interface, may provide a responding user with particular songs that may be of interest to the responding user that can be used to generate a music recommendation that may also be appealing to the requesting user. Further, the P2P music recommendation service may interact with one or more music services in order to provide the responding user with various options for songs that can be provided in a music recommendation to the requesting user.

In some instances, the P2P music recommendation service may automatically identify any queued recommendations (e.g., dynamic music recommendations) previously generated by the responding user and maintained in a private playlist or queue. As noted above, the creation of dynamic music recommendations may be performed absent a request for music recommendations or to share music with other users. For instance, a user of the P2P music recommendation service may submit a request to the P2P music recommendation service at any time to generate a new dynamic music recommendation.

At step 1602, the P2P music recommendation service receives, for a particular responding user, a request to provide a music recommendation to a requesting user. As noted above, a requesting user may select one or more users from which to solicit a music recommendation. These one or more users may be followers of the requesting user (e.g., friends, peers, other users that have opted to follow the requesting user's profile, etc.) or tastemakers that the requesting user has opted to follow or are otherwise verified as providing valuable and/or relevant music recommendations to users of the P2P music recommendation service. In some instances, rather than the one or more users being selected by the requesting user, the P2P music recommendation service may identify the one or more users based on the parameters of the music recommendation request submitted by the requesting user. For example, based on the tags selected by the requesting user or otherwise identified by the P2P music recommendation service (e.g., via evaluation of supplemental comments provided by the requesting user, via selection of a sample song by the requesting user, etc.), the P2P music recommendation service may identify one or more users that are likely to provide relevant responses to the music recommendation request or otherwise have interacted with prior requests with similar tags. As another example, based on the tags selected by the requesting user or otherwise identified by the P2P music recommendation service, the P2P music recommendation service may identify one or more users that have shared songs associated with similar or identical tags with other users of the P2P music recommendation service.

In some instances, in response to receiving the music recommendation request from a requesting user, the P2P music recommendation service may present the request to the responding user via an interface of the P2P music recommendation service. For instance, via the interface, the P2P music recommendation service may present, within a requests tab, one or more elements of the received music recommendation request. These elements may include identifying information of the requesting user that submitted the request (e.g., user name, user profile image, user contact information, user location, etc.), one or more tags corresponding to the request for music recommendations, one or more comments corresponding to the request, and the like. These one or more elements may assist the responding user in identifying which one or more songs to recommend to the requesting user in response to the music recommendation request.

In some instances, the P2P music recommendation service may additionally, or alternatively, evaluate the user's queued recommendations (e.g., any previously generated dynamic music recommendations maintained in the user's private playlist or queue) to automatically identify any queued recommendations that may be provided to fulfill the music recommendation request. For example, the P2P music recommendation service may automatically review the received music recommendation request to identify the one or more tags associated with the request and any comments provided by the requesting user in the request. The P2P music recommendation service may automatically determine whether any of the user's queued music recommendations correspond to the one or more tags and/or the comments provided by the requesting user in its music recommendation request. If so, the P2P music recommendation service may present the identified dynamic music recommendations to the user in order to allow the user to review these identified dynamic music recommendations and determine whether any of these dynamic music recommendations may be provided in response to the request. If the user selects one or more of these queued music recommendations for sharing with a requesting user in response to the music recommendation request, the P2P music recommendation service may transmit the music recommendation to the requesting user and to other users that may have received the music recommendation request from the requesting user.

In an embodiment, the P2P music recommendation service, at step 1604, determines whether the responding user has previously generated recommendations (e.g., queued recommendations, recommendations previously provided to other users, etc.) and/or shared songs with the requesting user or any other user of the P2P music recommendation service. For instance, the P2P music recommendation service may evaluate a user profile of the responding user to identify any responses provided to users of the P2P music recommendation service by the responding user. As noted above, via an interface of the P2P music recommendation service, a user may be presented with various music recommendation requests from different users of the P2P music recommendation service. As the responding user interacts with these requests and provides responses (e.g., music recommendations) to said requests, the P2P music recommendation service may update the responding user's profile to indicate how the responding user responded to these requests. Further, as the requesting users interact with these music recommendations, the P2P music recommendation service may track how these music recommendations were received by the requesting users (e.g., whether the recommended music was saved by the user, the length of time the recommended music was heard by the user, any feedback provided by the user to the music recommendation, etc.).

In addition to evaluating the user profile of the responding user to identify any responses previously provided to users of the P2P music recommendation service by the responding user, the P2P music recommendation service may evaluate the user profile to identify any queued recommendations that may be available through the responding user's private playlist or queue. As noted above, the responding user, absent a music recommendation request, can submit a request to the P2P music recommendation service at any time to generate a new dynamic music recommendation. These dynamic music recommendations may remain private, whereby only the user may review the dynamic music recommendations, until a relevant music recommendation request is received. For example, any dynamic music recommendations generated by the user may only be viewable by the user until the user explicitly requests that the dynamic music recommendation is to be shared with one or more other users and/or is automatically shared in response to relevant music recommendation requests received by the user.

Additionally, the P2P music recommendation service may also evaluate the user profile of the responding user to identify any songs previously shared by the responding user with other users of the P2P music recommendation service. As noted above, via an interface of the P2P music recommendation service, a user may initiate a music sharing request, through which the user may select and share one or more songs with any of the user's followers. If the user shares a song with one or more of its followers, via submission of a music sharing request, the P2P music recommendation service may update the user's profile to indicate which songs have been shared with other users (e.g., followers). If the user has associated the shared song with one or more tags, the P2P music recommendation service may also update the user's profile to associate the one or more tags with the particular music sharing request and the shared song. Further, as the followers interact with the shared song, the P2P music recommendation service may track how the shared song was received by these followers.

If the P2P music recommendation service determines that the responding user has previously generated music recommendations in response to other music recommendation requests, has previously shared one or more songs with the requesting user and/or other followers, and/or has previously added one or more dynamic music recommendations to a private queue or playlist, the P2P music recommendation service, at step 1606, may evaluate these previously generated recommendations and shared songs. For instance, for each previously generated recommendation, the P2P music recommendation service may identify the corresponding request and evaluate the tags associated with the request and any comments submitted by the user that submitted the request. In some instances, the P2P music recommendation service may evaluate each recommendation submitted by the responding user to identify the artist and song provided in the recommendation. Based on the identified artist and song, the P2P music recommendation service may identify any tags that may be associated with the artist and/or song. For instance, the P2P music recommendation service may access an artist profile and a song profile corresponding to the artist and the song, respectively, to identify any tags that may be associated with the artist and song provided in the previously provided recommendation. In some instances, if the received music recommendation request specifies a location of the requesting user, the P2P music recommendation service may evaluate the previous music recommendations submitted by the responding user to identify the location from which each of the previous music recommendations was submitted from.

In an embodiment, if the responding user maintains one or more dynamic music recommendations in a private queue or playlist, the P2P music recommendation service can evaluate these dynamic music recommendations to identify any tags associated with each of these dynamic music recommendations. For example, in response to a received music recommendation request from a requesting user, the P2P music recommendation service may automatically review the received music recommendation request to identify the one or more tags associated with the request and any comments provided by the requesting user in the request. The P2P music recommendation service may automatically determine whether any of the user's dynamic music recommendations correspond to the one or more tags and/or the comments provided by the requesting user in its music recommendation request.

For each previously shared song, the P2P music recommendation service may identify any tags assigned to the shared song by the responding user or by the P2P music recommendation service as part of the music sharing request process. As noted above, the P2P music recommendation service enables users to assign one or more tags to a song that is to be shared with a selected set of followers. These tags may be selected from a set of pre-defined tags generated by the P2P music recommendation service or may be defined by the user. In some instances, the P2P music recommendation service may utilize feedback from the followers to which a shared song was provided to determine the relevance of the assigned one or more tags to the song. For instance, the P2P music recommendation service may monitor follower interaction with a shared song to generate a set of metrics for the shared song. These metrics may serve as an indication of whether the tags assigned to the song by the user or the P2P music recommendation service are relevant to the shared song. Based on this indication, the P2P music recommendation service may maintain an association between the shared song and the assigned tags or disassociate the shared song from the originally assigned tags.

Based on the evaluation of the previously generated music recommendations and previously shared songs, the P2P music recommendation service, at step 1608, determines whether any of these previously generated music recommendations and/or shared songs are relevant to the current music recommendation request. For example, the P2P music recommendation service may determine whether the tags for a previously obtained music recommendation request are identical or similar to the tags associated with the current music recommendation request. If so, the P2P music recommendation service may determine that the corresponding music recommendation submitted by the responding user to the previously obtained music recommendation request may be relevant to the current request. Similarly, the P2P music recommendation service may determine whether the tags for a previously shared song are identical or similar to the tags associated with the current recommendation request. If so, the P2P music recommendation service may determine that the shared song may be relevant to the request.

In an embodiment, the P2P music recommendation service can evaluate any of the responding user's dynamic music recommendations (e.g., queued recommendations) to determine whether any of these queued recommendations are relevant to the current music recommendation request.

For example, the responding user may maintain, within a private queue or playlist, a pre-defined set of music recommendations, whereby a pre-defined music recommendation may specify a particular song and a corresponding set of tags selected or otherwise defined by the responding user. This pre-defined set of music recommendations may be maintained within the responding user's account without any of these music recommendations being shared with other users until indicated by the responding user and/or in response to a relevant music recommendation request from a requesting user.

As another example, based on an evaluation of the artist profile and/or song profile associated with a previously submitted music recommendation, the P2P music recommendation service may identify the one or more tags associated with the previously submitted music recommendation. If these one or more tags are similar or identical to those specified in the obtained music recommendation request, the P2P music recommendation service may determine that the previously submitted music recommendation may be relevant to the obtained request. As yet another example, if the obtained music recommendation request specifies a location from which the request was made, the P2P music recommendation service may determine that a previously provided music recommendation is relevant to the request if the previously provided music recommendation was also submitted from the location.

In an embodiment, the P2P music recommendation service scores each music recommendation or shared song previously provided by the responding user in order to determine whether a previously provided music recommendation or shared song is relevant to the newly obtained request. For instance, a previously provided music recommendation may be assigned a higher score if the request for which the recommendation was provided had similar or identical tags to those in the newly obtained request. Similarly, a previously provided music recommendation or shared song may be assigned a higher score if the artist and/or song is associated with one or more tags that are similar or identical to the tags specified in the newly obtained request. A recommendation or song submitted near to or at same location as that specified in the newly obtained request may also be assigned a higher score. Thus, a composite score based on these factors may be computed by the P2P music recommendation service to determine the relevance of a previously submitted music recommendation or shared song to the newly obtained request. In some instances, the P2P music recommendation service may determine whether the score for a particular music recommendation or shared song exceeds a minimum relevancy score threshold. If the P2P music recommendation service determines that the score for a previously provided music recommendation or shared song exceeds the minimum relevancy score threshold, the P2P music recommendation service may determine that the music recommendation or shared song is relevant to the newly obtained request. It should be noted that the factors described above are illustrative and additional and/or alternative factors may be considered in computing a composite score for a particular music recommendation or shared song (e.g., feedback from other users with regard to music recommendations or songs provided by the responding user, interaction with the music recommendation or shared song provided by the responding user, sharing of the music recommendation or shared song with other users by the user receiving the music recommendation or shared song for similar or identical tags, etc.).

If the P2P music recommendation service identifies one or more previously generated music recommendations (e.g., dynamic music recommendations maintained in a queue and/or music recommendations previously provided to other users) or shared songs that may be relevant to the current music recommendation request, the P2P music recommendation service, at step 1610, resurfaces these previously generated music recommendations or shared songs to the responding user. For instance, via the interface provided by the P2P music recommendation service to the responding user, the P2P music recommendation service may present to the responding user the identified music recommendations or shared songs that the responding user has previously submitted and/or are maintained in the private queue and that are relevant to the newly obtained request. The P2P music recommendation service may indicate, for each identified music recommendation or shared song that may be relevant to the current request, a particular rationale detailing why the previously generated music recommendation or shared song is being presented for the current request (e.g., tag similarity, location similarity, association between artist or song with tags specified in the request, the computed score for the recommendation, etc.). In an embodiment, rather than resurfacing these previously generated music recommendations and/or shared songs that may be relevant to the current music recommendation request to the responding user, the P2P music recommendation service can automatically generate new music recommendations that include the songs previously recommended to other users or that were otherwise shared with other users.

As noted above, the P2P music recommendation service may provide, via the interface, a song query bar through which the responding user may submit a query for a particular artist and/or song to provide as a music recommendation to a requesting user. If the responding user submits a query via the song query bar, the P2P music recommendation service may query one or more music services to identify one or more songs responsive to the query. For example, if the responding user submits a query for "Lamb of Cthulhu," the P2P music recommendation service submit a query to the one or more music services for songs associated with the query for "Lamb of Cthulhu." The one or more music services may provide, in response to the query, network addresses corresponding to locations of songs associated with the query. For instance, a music service may provide a Uniform Resource Identifier (URI) of a network location where a particular song may be accessed. The one or more music services may also provide additional information that may be used to uniquely identify each song, such as an image of an album cover, the name of the song, the name of the artist, and the like. The responses from the one or more music services may be provided to the responding user via the interface of the P2P music recommendation service. From the interface, the responding user may select any of the responses from the one or more music services to serve as the music recommendation to be provided to the requesting user.

In an embodiment, the responding user is presented, via the interface, with responses to the music recommendation request provided by other users to which the music recommendation request was provided. For instance, the P2P music recommendation service may provide the responding user with the song title and artist name for each song recommended by other users to the requesting user in response to the music recommendation request. Further, the P2P music recommendation service may provide any comments submitted by these other users to the requesting user regarding their song selection. The responding user may, via the interface, provide additional feedback with regard to any provided responses to the music recommendation request. The P2P music recommendation service may also provide the responding user with an option to follow any of the other users that have responded to the music recommendation request. For instance, if the responding user likes a particular song recommended to the requesting user, the responding user may submit a request to follow the user that submitted the particular song.

In addition to selecting a particular song that is to be recommended to the requesting user in response to the music recommendation request, the responding user may optionally provide a comment regarding its selection of the particular song. For instance, the responding user may supply an additional regarding its selection of the particular song to provide context with regard to its selection, which may be helpful to the requesting user. In an embodiment, if the responding user submits a comment with its music recommendation, the P2P music recommendation service can evaluate the comment to identify one or more tags that can be associated with the music recommendation. For instance, the P2P music recommendation service may process the comment and the selected song using a machine learning algorithm to obtain, as output, one or more tags corresponding to the comment and that may be applicable to the song. This output may be used to update a song profile for the song, as well as one or more tag profiles associated with the identified tags.

In an embodiment, if the responding user has selected a particular song that is to be recommended to the requesting user, the P2P music recommendation service determines whether the requesting user has already heard, received, or otherwise interacted with the selected song. For instance, when a responding user selects a particular song that is to serve as its recommendation to the requesting user, the P2P music recommendation service may access the requesting user's profile and determine whether the requesting user has saved this particular song or has previously interacted with the song (e.g., provided feedback, recommended the song to others, shared the song with others, skipped the song, etc.). If so, the P2P music recommendation service may indicate, to the responding user, that the requesting user has previously saved or otherwise interacted with the selected song. This may provide the responding user with additional information that may be used to determine whether to select an alternative song, provide additional information with regard to the selected song, and the like.

Once the responding user has generated a music recommendation via the interface, the P2P music recommendation service, at step 1612, obtains the music recommendation. In response to obtaining the music recommendation from the responding user, the P2P music recommendation service may evaluate the music recommendation to determine whether the music recommendation is relevant to the request. For instance, the P2P music recommendation service may determine whether the music recommendation is associated with the tags submitted in the request or with similar tags. If the P2P music recommendation service determines that the music recommendation is not relevant to the request, the P2P music recommendation service may reject the music recommendation, provide the responding user with feedback with regard to its music recommendation, and/or solicit the responding user to provide an alternative music recommendation. It should be noted that the P2P music recommendation service may forego evaluation of the music recommendation and process the music recommendation upon receipt.

At step 1614, the P2P music recommendation service transmits the music recommendation provided by the responding user to the requesting user. The P2P music recommendation service may alert the requesting user as to the receipt of a new recommendation responsive to its music recommendation request and present the new recommendation to the requesting user via the interface. Additionally, the P2P music recommendation may provide the newly obtained music recommendation to all other users to which the music recommendation request was provided. This may allow these other users to evaluate the music recommendation, provide feedback with regard to the music recommendation, and to follow the responding user if so desired. Through the interface, the requesting user may evaluate the music recommendation and provide feedback to the responding user with regard to its recommendation. This feedback may be used to update a song profile corresponding to the selected song provided in the music recommendation. For instance, if the requesting user indicates that the selected song is not one that the requesting user likes for the particular tags associated with the request, the P2P music recommendation service may update the song profile to decrease the association between the song and the combination of tags submitted by the requesting user. This may make it less likely that the song is recommended for the combination of tags for other requests. Alternatively, if the requesting user provides positive feedback with regard to the song provided in the music recommendation, the P2P music recommendation service may update the song profile to strengthen the association between the song and the combination of tags submitted by the requesting user.

Figure 17:
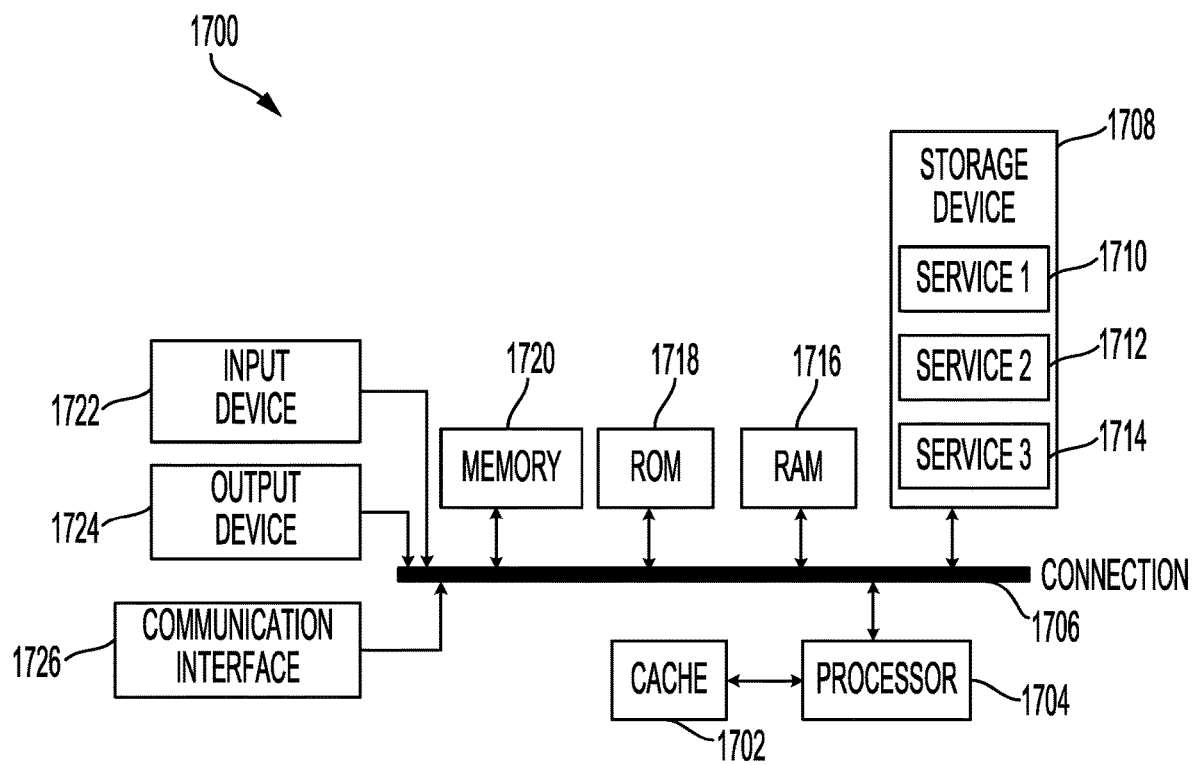
FIG. 17 shows a computing system architecture including various components in electrical communication with each other using a connection in accordance with various embodiments.

FIG. 17 illustrates a computing system architecture 1700 including various components in electrical communication with each other using a connection 1706, such as a bus, in accordance with some implementations. Example system architecture 1700 includes a processing unit (CPU or processor) 1704 and a system connection 1706 that couples various system components including the system memory 1720, such as ROM 1718 and RAM 1716, to the processor 1704.

The system architecture 1700 can include a cache 1702 of high-speed memory connected directly with, in close proximity to, or integrated as part of the processor 1704. The system architecture 1700 can copy data from the memory 1720 and/or the storage device 1708 to the cache 1702 for quick access by the processor 1704. In this way, the cache can provide a performance boost that avoids processor 1704 delays while waiting for data. These and other modules can control or be configured to control the processor 1704 to perform various actions.

Other system memory 1720 may be available for use as well. The memory 1720 can include multiple different types of memory with different performance characteristics. The processor 1704 can include any general purpose processor and a hardware or software service, such as service 1 1710, service 2 1712, and service 3 1714 stored in storage device 1708, configured to control the processor 1704 as well as a special-purpose processor where software instructions are incorporated into the actual processor design. The processor 1704 may be a completely self-contained computing system, containing multiple cores or processors, a bus, memory controller, cache, etc. A multi-core processor may be symmetric or asymmetric.

To enable user interaction with the computing system architecture 1700, an input device 1722 can represent any number of input mechanisms, such as a microphone for speech, a touch-sensitive screen for gesture or graphical input, keyboard, mouse, motion input, speech and so forth. An output device 1724 can also be one or more of a number of output mechanisms known to those of skill in the art. In some instances, multimodal systems can enable a user to provide multiple types of input to communicate with the computing system architecture 1700. The communications interface 1726 can generally govern and manage the user input and system output. There is no restriction on operating on any particular hardware arrangement and therefore the basic features here may easily be substituted for improved hardware or firmware arrangements as they are developed.

Storage device 1708 is a non-volatile memory and can be a hard disk or other types of computer readable media which can store data that are accessible by a computer, such as magnetic cassettes, flash memory cards, solid state memory devices, digital versatile disks, cartridges, RAMs 1716, ROM 1718, and hybrids thereof.

The storage device 1708 can include services 1710, 1712, 1714 for controlling the processor 1704. Other hardware or software modules are contemplated. The storage device 1708 can be connected to the system connection 1706. In one aspect, a hardware module that performs a particular function can include the software component stored in a computer-readable medium in connection with the necessary hardware components, such as the processor 1704, connection 1706, output device 1724, and so forth, to carry out the function.

The disclosed gift selection, attribution, and distribution system can be performed using a computing system. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device. The processor may be configured to carry out all or part of methods described herein for example by executing code for example stored in memory. One or more of a user device or computer, a provider server or system, or a suspended database update system may include the components of the computing system or variations on such a system.

This disclosure contemplates the computer system taking any suitable physical form, including, but not limited to a Point-of-Sale system ("POS"). As example and not by way of limitation, the computer system may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud, which may include one or more cloud components in one or more networks. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor may be, for example, be a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory can be coupled to the processor by, for example, a bus. The memory can include, by way of example but not limitation, random access memory (RAM), such as dynamic RAM (DRAM) and static RAM (SRAM). The memory can be local, remote, or distributed.

The bus can also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software can be stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The bus can also couples the processor to the network interface device. The interface can include one or more of a modem or network interface. It will be appreciated that a modem or network interface can be considered to be part of the computer system. The interface can include an analog modem, Integrated Services Digital network (ISDN0 modem, cable modem, token ring interface, satellite transmission interface (e.g., "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device.

In operation, the computer system can be controlled by operating system software that includes a file management system, such as a disk operating system. One example of operating system software with associated file management system software is the family of operating systems known as Windows® from Microsoft Corporation of Redmond, WA, and their associated file management systems. Another example of operating system software with its associated file management system software is the Linux™ operating system and its associated file management system. The file management system can be stored in the non-volatile memory and/or drive unit and can cause the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any system capable of executing a set of instructions (sequential or otherwise) that specify actions to be taken by that system.

While the machine-readable medium or machine-readable storage medium is shown, by way of example, to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the subject matter to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Client devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things. The input devices can include, for example, a keyboard, a mouse, a key pad, a touch interface, a microphone, a camera, and/or other types of input devices. The output devices can include, for example, a display screen, a speaker, a haptic feedback system, a printer, and/or other types of output devices. A data storage device, such as a hard drive or flash memory, can enable the computing device to temporarily or permanently store data. A network interface, such as a wireless or wired interface, can enable the computing device to communicate with a network. Examples of computing devices include desktop computers, laptop computers, server computers, hand-held computers, tablets, smart phones, personal digital assistants, digital home assistants, as well as machines and apparatuses in which a computing device has been incorporated.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments). A processor(s), implemented in an integrated circuit, may perform the necessary tasks.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A computer-implemented method comprising:
receiving a request to solicit a set of users for new music recommendations, wherein the request specifies information indicative of types of music being solicited, and wherein the request is associated with a user;
dynamically training a machine learning algorithm to continuously update a set of profiles corresponding to different users as songs are shared amongst the different users and as feedback corresponding to the songs is received;
automatically and continuously updating tastes in music for the different users as the feedback is received, wherein the tastes in music are associated with the set of profiles corresponding to the different users;
determining a set of respondent profiles corresponding to a set of respondent users by using a user profile corresponding to the user as input to the machine learning algorithm;
transmitting the request, wherein when the request is received at the set of respondent users, a subset of the set of respondent users provides newly generated responses, and wherein a newly generated response includes a new song selected by a respondent user;
evaluating the newly generated responses to identify one or more relevant new songs newly provided by one or more respondent users from the subset, wherein the newly generated responses are evaluated according to the request and different song profiles corresponding to different songs provided in the newly generated responses;
presenting the one or more relevant new songs when the one or more relevant new songs are received at the user and the set of respondent users;
receiving new feedback from one or more recipients of the one or more relevant new songs, wherein the new feedback includes different interactions with the one or more relevant new songs by the one or more recipients;
automatically updating the machine learning algorithm as the set of profiles are continuously updated and as the new feedback is received, wherein the machine learning algorithm is automatically updated using the request, the one or more relevant new songs, and the new feedback as the new feedback is received;
updating a set of song profiles corresponding to the one or more relevant new songs as the new feedback is received, wherein the set of song profiles are updated to create associations amongst the one or more relevant new songs, the set of profiles, and requests for different music recommendations; and
automatically generating updated tastes in music for the user and the set of respondent users, wherein the updated tastes in music are automatically generated by the machine learning algorithm as the new feedback is received.

2. The computer-implemented method of claim 1, wherein the request includes a song representative of the types of music being solicited.

3. The computer-implemented method of claim 1, wherein the information indicative of the types of music being solicited includes a set of tags defining attributes associated with the types of music.

4. The computer-implemented method of claim 1, wherein the new feedback includes an indication that playback of a song from the one or more relevant new songs was performed over at least a minimum period of time.

5. The computer-implemented method of claim 1, wherein the newly generated responses include identifying information of different songs accessible via a music service and information indicative of one or more types of music associated with the different songs.

6. The computer-implemented method of claim 1, wherein the new feedback includes an indication that a song from the one or more relevant songs was saved to a playlist.

7. The computer-implemented method of claim 1, further comprising:
 resurfacing previously provided songs associated with the set of respondent users, wherein the previously provided songs are resurfaced as a result of the previously provided songs being relevant to the request.

8. The computer-implemented method of claim 1, wherein the one or more relevant songs are accessible through one or more music services, and wherein when the one or more relevant new songs are received at the user and the set of respondent users, access to the one or more relevant new songs is facilitated through the one or more music services.

9. A system, including:
 one or more processors; and
 memory including instructions that, as a result of being executed by the one or more processors, cause the system to:
  receive a request to solicit a set of users for new music recommendations, wherein the request specifies information indicative of types of music being solicited, and wherein the request is associated with a user;
  dynamically train a machine learning algorithm to continuously update a set of profiles corresponding to different users as songs are shared amongst the different users and as feedback corresponding to the songs is received;
  automatically and continuously update tastes in music for the different users as the feedback is received, wherein the tastes in music are associated with the set of profiles corresponding to the different users;
  determine a set of respondent profiles corresponding to a set of respondent users by using a user profile corresponding to the user as input to the machine learning algorithm;
  transmit the request, wherein when the request is received at the set of respondent users, a subset of the set of respondent users provides newly generated responses, and wherein a newly generated response includes a new song selected by a respondent user;
  evaluate the newly generated responses to identify one or more relevant new songs newly provided by one or more respondent users from the subset, wherein the newly generated responses are evaluated according to the request and different song profiles corresponding to different songs provided in the newly generated responses;
  present the one or more relevant new songs when the one or more relevant new songs are received at the user and the set of respondent users;
  receive new feedback from one or more recipients of the one or more relevant new songs, wherein the new feedback includes different interactions with the one or more relevant new songs by the one or more recipients;
  automatically update the machine learning algorithm as the set of profiles are continuously updated and as the new feedback is received, wherein the machine learning algorithm is automatically updated using the request, the one or more relevant new songs, and the new feedback as the new feedback is received;
  update a set of song profiles corresponding to the one or more relevant new songs as the new feedback is received, wherein the set of song profiles are updated to create associations amongst the one or more relevant new songs, the set of profiles, and requests for different music recommendations; and
  automatically generate updated tastes in music for the user and the set of respondent users, wherein the updated tastes in music are automatically generated by the machine learning algorithm as the new feedback is received.

10. The system of claim 9, wherein the new feedback includes an indication that a song from the one or more relevant new songs was saved to a playlist.

11. The system of claim 9, wherein the instructions further cause the system to:
 resurface previously provided songs associated with the set of respondent users, wherein the previously provided songs are resurfaced as a result of the previously provided songs being relevant to the request.

12. The system of claim 9, wherein the newly generated responses include identifying information of different songs accessible via a music service and information indicative of one or more types of music associated with the different songs.

13. The system of claim 9, wherein the new feedback includes an indication that playback of a song from the one or more relevant new songs was performed over at least a minimum period of time.

14. The system of claim 9, wherein the request includes a song representative of the types of music being solicited.

15. The system of claim 9, wherein the information indicative of the types of music being solicited includes a set of tags defining attributes associated with the types of music.

16. The system of claim 9, wherein the one or more relevant new songs are accessible through one or more music services, and wherein when the one or more relevant new songs are received at the user and the set of respondent users, access to the one or more relevant new songs is facilitated through the one or more music services.

17. A non-transitory computer-readable storage medium storing thereon executable instructions that, as a result of being executed by one or more processors of a computer system, cause the computer system to:
 receive a request to solicit a set of users for new music recommendations, wherein the request specifies information indicative of types of music being solicited, and wherein the request is associated with a user;
 dynamically train a machine learning algorithm to continuously update a set of profiles corresponding to different users as songs are shared amongst the different users and as feedback corresponding to the songs is received;

automatically and continuously update tastes in music for the different users as the feedback is received, wherein the tastes in music are associated with the set of profiles corresponding to the different users;

determine a set of respondent profiles corresponding to a set of respondent users by using a user profile corresponding to the user as input to the machine learning algorithm;

transmit the request, wherein when the request is received at the set of respondent users, a subset of the set of respondent users provides newly generated responses, and wherein a newly generated response includes a new song selected by a respondent user;

evaluate the newly generated responses to identify one or more relevant songs newly provided by one or more respondent users from the subset, wherein the newly generated responses are evaluated according to the request and different song profiles corresponding to different songs provided in the newly generated responses;

present the one or more relevant songs to when the one or more relevant new songs are received at the user and the set of respondent users;

receive new feedback from one or more recipients of the one or more relevant new songs, wherein the new feedback includes different interactions with the one or more relevant new songs by the one or more recipients;

automatically update the machine learning algorithm as the set of profiles are continuously updated and as the new feedback is received, wherein the machine learning algorithm is automatically updated using the request, the one or more relevant new songs, and the new feedback as the new feedback is received;

update a set of song profiles corresponding to the one or more relevant new songs as the new feedback is received, wherein the set of song profiles are updated to create associations amongst the one or more relevant new songs, the set of profiles, and requests for different music recommendations; and automatically generate updated tastes in music for the user and the set of respondent users, wherein the updated tastes in music are automatically generated by the machine learning algorithm as the new feedback is received.

18. The non-transitory computer-readable storage medium of claim 17, wherein the newly generated responses include identifying information of information of different songs accessible via a music service and information indicative of one or more types of music associated with the different songs.

19. The non-transitory computer-readable storage medium of claim 17, wherein the new feedback includes an indication that playback of a song from the one or more relevant new songs was performed over at least a minimum period of time.

20. The non-transitory computer-readable storage medium of claim 17, wherein the request includes a song representative of the types of music being solicited.

21. The non-transitory computer-readable storage medium of claim 17, wherein the information indicative of the types of music being solicited includes a set of tags defining attributes associated with the types of music.

22. The non-transitory computer-readable storage medium of claim 17, wherein the new feedback includes an indication that a song from the one or more relevant new songs was saved to a playlist.

23. The non-transitory computer-readable storage medium of claim 17, wherein the executable instructions further cause the computer system to:
resurface previously provided songs associated with the set of respondent users, wherein the previously provided songs are resurfaced as a result of the previously provided songs being relevant to the request.

24. The non-transitory computer-readable storage medium of claim 17, wherein the one or more relevant new songs are accessible through one or more music services, and wherein when the one or more relevant new songs are received at the user and the set of respondent users, access to the one or more relevant new songs is facilitated through the one or more music services.

\* \* \* \* \*